US009027121B2

(12) United States Patent
Hammer et al.

(10) Patent No.: US 9,027,121 B2
(45) Date of Patent: May 5, 2015

(54) METHOD AND SYSTEM FOR CREATING A RECORD FOR ONE OR MORE COMPUTER SECURITY INCIDENTS

(75) Inventors: John M. Hammer, Atlanta, GA (US); Rixin Ge, Atlanta, GA (US); Charles D. Burke, Atlanta, GA (US); Charles Hubbard, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 2405 days.

(21) Appl. No.: 11/777,489

(22) Filed: Jul. 13, 2007

(65) Prior Publication Data
US 2008/0016569 A1   Jan. 17, 2008

Related U.S. Application Data

(63) Continuation of application No. 09/685,285, filed on Oct. 10, 2000, now abandoned.

(51) Int. Cl.
*H04L 9/32* (2006.01)
*G06F 21/55* (2013.01)

(52) U.S. Cl.
CPC .................................. *G06F 21/554* (2013.01)

(58) Field of Classification Search
USPC .............. 726/3, 5, 6, 13, 18, 22–25; 709/201, 709/203, 223, 224, 250, 318; 711/202, 205, 711/207, 217; 713/167, 178, 154, 155; 707/687, 694, 705, 706, 732, 751, 752, 707/758; 380/202, 230, 234
See application file for complete search history.

(56) References Cited

U.S. PATENT DOCUMENTS 4,223,380 A   9/1980   Antonaccio et al.
4,400,769 A   8/1983   Kaneda et al.
(Continued)

FOREIGN PATENT DOCUMENTS

EP    0 636 977    5/2001
EP    0 985 995    8/2003
(Continued)

OTHER PUBLICATIONS

Koilpillai et al., Recon-A Tool for Incident Detection, Tracking and Response, Darpa Information Survivability Conference and Exposition, 2000, pp. 199-206.
(Continued)

*Primary Examiner* — Joseph P Hirl
*Assistant Examiner* — Leynna Truvan
(74) *Attorney, Agent, or Firm* — King & Spalding

(57) ABSTRACT

A security management system can log, investigate, respond, and track computer security incidents that can occur in a networked computer system. In other words, the security management system can produce a security record of information related to the tracking of suspicious computer activity or actual computer security threats, such as denial of service attacks or other similar compromises to computers or computer networks. The security record can include, but is not limited to, date and times of computer security incidents, a name for a particular security incident, a security management system user, and a potential source of the computer security incident. The security record can be designed as a running log that saves or records all activity of a computer incident source as well as the activity of the security team responding to the computer incident source. To produce the security record, all data that relates to a computer incident and all data that relates to a computer incident response can be sent to a separate protected database, where data is protected by digital signature algorithms (DSAs).

19 Claims, 30 Drawing Sheets

(56) References Cited

U.S. PATENT DOCUMENTS

| | | |
|---|---|---|
| 4,672,609 A | 6/1987 | Humphrey et al. |
| 4,773,028 A | 9/1988 | Tallman |
| 4,819,234 A | 4/1989 | Huber |
| 4,975,950 A | 12/1990 | Lentz |
| 5,032,979 A | 7/1991 | Hecht et al. |
| 5,121,345 A | 6/1992 | Lentz |
| 5,204,966 A | 4/1993 | Wittenberg et al. |
| 5,210,704 A | 5/1993 | Husseiny |
| 5,274,824 A | 12/1993 | Howarth |
| 5,278,901 A | 1/1994 | Shieh et al. |
| 5,309,562 A | 5/1994 | Li |
| 5,311,593 A | 5/1994 | Carmi |
| 5,345,595 A | 9/1994 | Johnson et al. |
| 5,347,450 A | 9/1994 | Nugent |
| 5,353,393 A | 10/1994 | Bennett et al. |
| 5,359,659 A | 10/1994 | Rosenthal |
| 5,371,852 A | 12/1994 | Attanasio et al. |
| 5,398,196 A | 3/1995 | Chambers |
| 5,414,833 A | 5/1995 | Hershey et al. |
| 5,440,723 A | 8/1995 | Arnold et al. |
| 5,452,442 A | 9/1995 | Kephart |
| 5,454,074 A | 9/1995 | Hartel et al. |
| 5,475,839 A | 12/1995 | Watson et al. |
| 5,511,184 A | 4/1996 | Lin |
| 5,515,508 A | 5/1996 | Pettus et al. |
| 5,522,026 A | 5/1996 | Records et al. |
| 5,539,659 A | 7/1996 | McKee et al. |
| 5,557,742 A | 9/1996 | Smaha et al. |
| 5,586,260 A | 12/1996 | Hu |
| 5,590,331 A | 12/1996 | Lewis et al. |
| 5,606,668 A | 2/1997 | Shwed |
| 5,623,600 A | 4/1997 | Ji et al. |
| 5,623,601 A | 4/1997 | Vu |
| 5,630,061 A | 5/1997 | Richter et al. |
| 5,636,344 A | 6/1997 | Lewis ............... 709/224 |
| 5,649,095 A | 7/1997 | Cozza |
| 5,649,185 A | 7/1997 | Antognini et al. |
| 5,675,711 A | 10/1997 | Kephart et al. |
| 5,696,486 A | 12/1997 | Poliquin et al. |
| 5,696,822 A | 12/1997 | Nachenberg |
| 5,706,210 A | 1/1998 | Kumano et al. |
| 5,715,395 A | 2/1998 | Brabson et al. |
| 5,734,697 A | 3/1998 | Jabbarnezhad |
| 5,745,692 A | 4/1998 | Lohmann, II et al. |
| 5,748,098 A | 5/1998 | Grace |
| 5,761,504 A | 6/1998 | Corrigan et al. |
| 5,764,887 A | 6/1998 | Kells et al. |
| 5,764,890 A | 6/1998 | Glasser et al. |
| 5,765,030 A | 6/1998 | Nachenberg et al. |
| 5,774,727 A | 6/1998 | Walsh et al. |
| 5,787,177 A | 7/1998 | Leppek |
| 5,790,799 A | 8/1998 | Mogul |
| 5,796,942 A | 8/1998 | Esbensen |
| 5,798,706 A | 8/1998 | Kraemer et al. |
| 5,802,277 A | 9/1998 | Cowlard ............ 713/200 |
| 5,812,763 A | 9/1998 | Teng |
| 5,815,574 A | 9/1998 | Fortinsky |
| 5,822,517 A | 10/1998 | Dotan |
| 5,826,013 A | 10/1998 | Nachenberg |
| 5,827,070 A | 10/1998 | Kershaw et al. ......... 434/322 |
| 5,828,833 A | 10/1998 | Belville et al. |
| 5,832,208 A | 11/1998 | Chen et al. |
| 5,832,211 A | 11/1998 | Blakley, III et al. |
| 5,835,726 A | 11/1998 | Shwed et al. |
| 5,838,903 A | 11/1998 | Blakely, III et al. |
| 5,842,002 A | 11/1998 | Schnurer et al. |
| 5,845,067 A | 12/1998 | Porter et al. |
| 5,848,233 A | 12/1998 | Radia et al. |
| 5,854,916 A | 12/1998 | Nachenberg |
| 5,857,191 A | 1/1999 | Blackwell, Jr. et al. |
| 5,864,665 A | 1/1999 | Tran |
| 5,864,803 A | 1/1999 | Nussbaum |
| 5,872,915 A | 2/1999 | Dykes et al. |
| 5,872,978 A | 2/1999 | Hoskins |
| 5,875,296 A | 2/1999 | Shi et al. |
| 5,878,420 A | 3/1999 | de la Salle |
| 5,881,236 A | 3/1999 | Dickey |
| 5,884,033 A | 3/1999 | Duvall et al. |
| 5,892,903 A | 4/1999 | Klaus |
| 5,899,999 A | 5/1999 | De Bonet |
| 5,905,859 A | 5/1999 | Holloway et al. |
| 5,907,834 A | 5/1999 | Kephart et al. |
| 5,919,257 A | 7/1999 | Trostle |
| 5,919,258 A | 7/1999 | Kayashima et al. |
| 5,922,051 A | 7/1999 | Sidey |
| 5,925,126 A | 7/1999 | Hsieh |
| 5,931,946 A | 8/1999 | Terada et al. |
| 5,940,591 A | 8/1999 | Boyle et al. |
| 5,950,012 A | 9/1999 | Shiell et al. |
| 5,961,644 A | 10/1999 | Kurtzberg et al. |
| 5,964,839 A | 10/1999 | Johnson et al. |
| 5,964,889 A | 10/1999 | Nachenberg |
| 5,974,237 A | 10/1999 | Shurmer et al. |
| 5,974,457 A | 10/1999 | Waclawsky et al. |
| 5,978,917 A | 11/1999 | Chi |
| 5,983,270 A | 11/1999 | Abraham et al. |
| 5,983,348 A | 11/1999 | Ji |
| 5,983,350 A | 11/1999 | Minear et al. |
| 5,987,606 A | 11/1999 | Cirasole et al. |
| 5,987,610 A | 11/1999 | Franczek et al. |
| 5,987,611 A | 11/1999 | Freund |
| 5,991,856 A | 11/1999 | Spilo et al. |
| 5,991,881 A | 11/1999 | Conklin et al. |
| 5,999,711 A | 12/1999 | Misra et al. |
| 5,999,723 A | 12/1999 | Nachenberg |
| 6,003,132 A | 12/1999 | Mann |
| 6,006,016 A | 12/1999 | Faigon et al. |
| 6,009,467 A | 12/1999 | Ratcliff et al. |
| 6,014,645 A | 1/2000 | Cunningham |
| 6,016,553 A | 1/2000 | Schneider et al. |
| 6,021,510 A | 2/2000 | Nachenberg |
| 6,026,442 A | 2/2000 | Lewis et al. |
| 6,029,256 A | 2/2000 | Kouznetsov |
| 6,035,323 A | 3/2000 | Narayen et al. |
| 6,035,423 A | 3/2000 | Hodges et al. |
| 6,041,347 A | 3/2000 | Harsham et al. |
| 6,052,709 A | 4/2000 | Paul |
| 6,061,795 A | 5/2000 | Dircks et al. |
| 6,067,410 A | 5/2000 | Nachenberg |
| 6,070,190 A | 5/2000 | Reps et al. ............. 709/224 |
| 6,070,244 A | 5/2000 | Orchier et al. |
| 6,073,172 A | 6/2000 | Frailong et al. |
| 6,081,894 A | 6/2000 | Mann |
| 6,085,224 A | 7/2000 | Wagner |
| 6,088,803 A | 7/2000 | Tso et al. |
| 6,088,804 A | 7/2000 | Hill et al. |
| 6,092,194 A | 7/2000 | Touboul |
| 6,094,731 A | 7/2000 | Waldin et al. |
| 6,098,173 A | 8/2000 | Elgressy et al. |
| 6,104,783 A | 8/2000 | DeFino ............... 379/38 |
| 6,108,799 A | 8/2000 | Boulay et al. |
| 6,118,940 A | 9/2000 | Alexander, III et al. |
| 6,119,165 A | 9/2000 | Li et al. |
| 6,119,234 A | 9/2000 | Aziz et al. |
| 6,122,738 A | 9/2000 | Millard |
| 6,144,961 A | 11/2000 | de la Salle |
| 6,154,844 A | 11/2000 | Touboul et al. |
| 6,161,109 A | 12/2000 | Matamoros et al. |
| 6,167,520 A | 12/2000 | Touboul |
| 6,173,413 B1 | 1/2001 | Slaughter et al. |
| 6,185,689 B1 | 2/2001 | Todd, Sr. et al. |
| 6,195,687 B1 | 2/2001 | Greaves et al. |
| 6,199,181 B1 | 3/2001 | Rechef et al. |
| 6,205,552 B1 | 3/2001 | Fudge |
| 6,220,768 B1 | 4/2001 | Barroux |
| 6,226,372 B1 | 5/2001 | Beebe et al. |
| 6,230,288 B1 | 5/2001 | Kuo et al. |
| 6,266,773 B1 | 7/2001 | Kisor et al. |
| 6,266,774 B1 | 7/2001 | Sampath et al. |
| 6,271,840 B1 | 8/2001 | Finseth et al. |
| 6,272,641 B1 | 8/2001 | Ji |
| 6,275,938 B1 | 8/2001 | Bond et al. |
| 6,275,942 B1 | 8/2001 | Bernhard et al. |
| 6,278,886 B1 | 8/2001 | Hwang |

(56) References Cited

U.S. PATENT DOCUMENTS

| | | |
|---|---|---|
| 6,279,113 B1 | 8/2001 | Vaidya |
| 6,282,546 B1 | 8/2001 | Gleichauf et al. |
| 6,289,457 B1 | 9/2001 | Bishop et al. ............... 713/200 |
| 6,298,445 B1 * | 10/2001 | Shostack et al. ............... 726/25 |
| 6,301,668 B1 | 10/2001 | Gleichauf et al. |
| 6,314,520 B1 | 11/2001 | Schell et al. |
| 6,314,525 B1 | 11/2001 | Mahalingham et al. |
| 6,321,338 B1 | 11/2001 | Porras et al. |
| 6,324,627 B1 | 11/2001 | Kricheff et al. |
| 6,324,647 B1 | 11/2001 | Bowman-Amuah .......... 713/201 |
| 6,324,656 B1 | 11/2001 | Gleichauf et al. |
| 6,338,141 B1 | 1/2002 | Wells |
| 6,347,374 B1 | 2/2002 | Drake et al. |
| 6,353,385 B1 | 3/2002 | Molini et al. |
| 6,357,008 B1 | 3/2002 | Nachenberg |
| 6,377,994 B1 | 4/2002 | Ault et al. |
| 6,396,845 B1 | 5/2002 | Sugita |
| 6,397,242 B1 | 5/2002 | Devine et al. |
| 6,397,245 B1 | 5/2002 | Johnson, II et al. |
| 6,405,318 B1 | 6/2002 | Rowland |
| 6,405,364 B1 | 6/2002 | Bowman-Amuah |
| 6,408,391 B1 | 6/2002 | Huff et al. |
| 6,415,321 B1 | 7/2002 | Gleichauf et al. |
| 6,429,952 B1 | 8/2002 | Olbricht |
| 6,434,615 B1 | 8/2002 | Dinh et al. |
| 6,438,600 B1 | 8/2002 | Greenfield et al. |
| 6,445,822 B1 | 9/2002 | Crill et al. |
| 6,446,123 B1 | 9/2002 | Ballantine et al. ............ 709/224 |
| 6,453,345 B2 * | 9/2002 | Trcka et al. ................... 709/224 |
| 6,453,346 B1 | 9/2002 | Garg et al. |
| 6,460,141 B1 | 10/2002 | Olden |
| 6,463,426 B1 | 10/2002 | Lipson et al. |
| 6,463,441 B1 | 10/2002 | Paradies ....................... 707/102 |
| 6,467,002 B1 | 10/2002 | Yang |
| 6,470,449 B1 | 10/2002 | Blandford .................... 713/178 |
| 6,477,585 B1 | 11/2002 | Cohen et al. ................. 719/318 |
| 6,484,203 B1 | 11/2002 | Porras et al. |
| 6,487,666 B1 | 11/2002 | Shanklin et al. |
| 6,493,752 B1 | 12/2002 | Lee et al. |
| 6,496,858 B1 | 12/2002 | Frailong et al. |
| 6,499,107 B1 | 12/2002 | Gleichauf et al. |
| 6,510,523 B1 | 1/2003 | Perlman et al. |
| 6,517,587 B2 | 2/2003 | Satyavolu et al. |
| 6,519,647 B1 | 2/2003 | Howard et al. |
| 6,519,703 B1 | 2/2003 | Joyce |
| 6,530,024 B1 | 3/2003 | Proctor |
| 6,535,227 B1 | 3/2003 | Fox et al. |
| 6,546,493 B1 | 4/2003 | Magdych et al. |
| 6,563,959 B1 | 5/2003 | Troyanker |
| 6,574,737 B1 | 6/2003 | Kingsford et al. |
| 6,578,147 B1 | 6/2003 | Shanklin et al. |
| 6,584,454 B1 | 6/2003 | Hummel, Jr. et al. |
| 6,601,190 B1 | 7/2003 | Meyer et al. .................. 714/37 |
| 6,606,744 B1 | 8/2003 | Mikurak |
| 6,618,501 B1 | 9/2003 | Osawa et al. |
| 6,628,824 B1 | 9/2003 | Belanger |
| 6,647,139 B1 | 11/2003 | Kunii et al. |
| 6,647,400 B1 | 11/2003 | Moran .......................... 707/205 |
| 6,661,904 B1 | 12/2003 | Sasich et al. |
| 6,668,082 B1 | 12/2003 | Davison et al. |
| 6,668,084 B1 | 12/2003 | Minami |
| 6,681,331 B1 | 1/2004 | Munson et al. |
| 6,691,232 B1 | 2/2004 | Wood et al. |
| 6,704,874 B1 | 3/2004 | Porras et al. |
| 6,708,212 B2 | 3/2004 | Porras et al. |
| 6,711,127 B1 | 3/2004 | Gorman et al. ............... 370/230 |
| 6,711,615 B2 | 3/2004 | Porras et al. |
| 6,718,383 B1 | 4/2004 | Hebert |
| 6,721,806 B2 | 4/2004 | Boyd et al. |
| 6,725,377 B1 | 4/2004 | Kouznetsov |
| 6,725,378 B1 | 4/2004 | Schuba et al. |
| 6,775,780 B1 | 8/2004 | Muttik |
| 6,792,144 B1 | 9/2004 | Yan et al. |
| 6,792,546 B1 | 9/2004 | Shanklin et al. |
| 6,813,712 B1 | 11/2004 | Luke ............................ 713/200 |
| 6,816,973 B1 | 11/2004 | Gleichauf et al. |
| 6,839,850 B1 | 1/2005 | Campbell et al. |
| 6,851,057 B1 | 2/2005 | Nachenberg |
| 6,871,284 B2 | 3/2005 | Cooper et al. |
| 6,886,102 B1 | 4/2005 | Lyle |
| 6,889,168 B2 | 5/2005 | Hartley et al. |
| 6,910,135 B1 | 6/2005 | Grainger |
| 6,912,676 B1 | 6/2005 | Gusler et al. |
| 6,990,591 B1 | 1/2006 | Pearson ........................ 726/22 |
| 6,999,990 B1 | 2/2006 | Sullivan et al. ............... 709/205 |
| 7,020,697 B1 | 3/2006 | Goodman et al. ............ 709/223 |
| 7,069,234 B1 | 6/2006 | Cornelius et al. ............. 705/26 |
| 7,167,844 B1 | 1/2007 | Leong et al. .................. 705/80 |
| 2001/0034847 A1 | 10/2001 | Gaul, Jr. |
| 2002/0032717 A1 | 3/2002 | Malan et al. |
| 2002/0032793 A1 | 3/2002 | Malan et al. |
| 2002/0032880 A1 | 3/2002 | Poletto et al. |
| 2002/0035698 A1 | 3/2002 | Malan et al. |
| 2002/0083331 A1 | 6/2002 | Krumel |
| 2002/0083334 A1 | 6/2002 | Rogers et al. |
| 2002/0138753 A1 | 9/2002 | Munson |
| 2002/0144156 A1 | 10/2002 | Copeland, III |
| 2003/0037136 A1 | 2/2003 | Labovitz et al. |
| 2003/0088791 A1 | 5/2003 | Porras et al. |
| 2003/0212903 A1 | 11/2003 | Porras et al. |
| 2004/0010718 A1 | 1/2004 | Porras et al. |
| 2007/0157315 A1 | 7/2007 | Moran |

FOREIGN PATENT DOCUMENTS

| | | |
|---|---|---|
| WO | WO 93/25024 | 12/1993 |
| WO | WO 98/41919 | 9/1998 |
| WO | WO 99/00720 | 1/1999 |
| WO | WO 99/13427 | 3/1999 |
| WO | WO 99/15966 | 4/1999 |
| WO | WO 99/50734 | 10/1999 |
| WO | WO 99/53391 | 10/1999 |
| WO | WO 99/57626 | 11/1999 |
| WO | WO 00/02115 | 1/2000 |
| WO | WO 00/10278 | 2/2000 |
| WO | WO 00/25214 | 5/2000 |
| WO | WO 00/25527 | 5/2000 |
| WO | WO 00/34867 | 6/2000 |
| WO | WO 00/54458 | 9/2000 |
| WO | WO 01/84285 | 11/2001 |
| WO | WO 02/06928 | 1/2002 |
| WO | WO 02/056152 | 7/2002 |
| WO | WO 02/101516 | 12/2002 |

OTHER PUBLICATIONS

Alves-Foss, J., An Overview of SNIF: A Tool for Surveying Network Information Flow, Network and Distributed System Security, 1995, pp. 94-101.

Mansouri-Samani et al., A Configurable Event Service for Distributed Systems Configurable Distributed Systems, 1996, pp. 210-217.

International Search Report for PCT/US01/13769 of Mar. 8, 2002.

Jagannathan et al., System Design Document: Next-Generation Intrusion Detection Expert Systems (NIDES), Internet Citation, Mar. 9, 1993, XP002136082, pp. 1-66.

Koilpillai, Adaptive Network Security Management, DARPA NGI PI Conference, Oct. 1998, pp. 1-27.

Hiverworld Continuous Adaptive Risk Management, Hiverworld, Inc., 1999-2000, pp. 1-14.

International Search Report for PCT/US02/04989 of Sep. 19, 2002.

International Search Report for PCT/US02/02917 of Aug. 8, 2002.

International Search Report for PCT/S03/00155 of May 15, 2003.

NXI Communications, Inc., White Paper, NTS Security Issues, Oct. 15, 2001, pp. 1-12.

Mounji et al., Distributed Audit Trail Analysis, Proceedings of the Symposium of Network and Distributed System Security, San Diego, CA, Feb. 16-17, 1995, pp. 102-112.

Wobber et al., Authentication in the Taos Operating System, ACM Transactions on Computer Systems, vol. 12, No. 1, Feb. 1994, pp. 3-32.

Mayer et al., The Design of the Trusted Workstation: A True Infosec Product, 13th National Computer Security Conference, Washing, DC, Oct. 1-4, 1990, pp. 827-839.

(56) References Cited

OTHER PUBLICATIONS

Process Software Technical Support Page, found on http://www.process.com/techsupport/whitesec.html, printed off of the Process Software website on Feb. 26, 2003, pp. 1-5.
Ganesan, BAfirewall: A Modern Firewall Design, Proceedings InternetSociety Symposium on Network and Distributed System Security 1994, Internet Soc., 1994, pp. 99-108.
Lee, Trusted Systems, Chapter II-1-6 of Handbook of Information Security Management, Ed. Zella G. Ruthberg and Harold F. Tipton, Auerbach, Boston and New York, 1993, pp. 345-362.
Lunt, Automated Intrusion Detection, Chapter II-4-4 of Handbook of Information Security Management, Ed. Zella G. Ruthberg and Harold F. Tipton, Auerbach, Boston and New York, 1993, pp. 551-563.
Guha et al., Network Security via Reverse Engineering of TCP Code: Vulnerability Analysis and Proposed Solution, IEEE, Mar. 1996, pp. 603-610.
Garg et al., High Level Communication Primitives for Concurrent Systems, IEEE, 1988, pp. 92-99.
Hastings et al., TCP/IP Spoofing Fundamentals, IEEE, May 1996, pp. 218-224.
Snapp, Signature Analysis and Communication Issues in a Distributed Intrusion Detection System, Master Thesis, University of California, Davis, California, 1991, pp. 1-40.
Guha et al., Network Security via Reverse Engineering of TCP Code: Vulnerability Analysis and Proposed Solutions, IEEE, Jul. 1997, pp. 40-48.
Djahandari et al., An MBone for an Application Gateway Firewall, IEEE, Nov. 1997, pp. 72-81.
Kim et al., Implementing a Secure Login Environment: A Case Study of Using a Secure Network Layer Protocol, Department of Computer Science, University of Alabama, Jun. 1995, pp. 1-9.
Satyanarayanan, Integrating Security in a Large Distributed System, ACM Transaction on Computer Systems, vol. 7, No. 3, Aug. 1989, pp. 47-280.
Sammons, Nathaniel, "Multi-platform Interrogation and Reporting with Rscan," The Ninth Systems Administration Conference, LISA 1995, Monterrey,California, Sep. 17-22, 1995, pp. 75-87.
Dean et al., "Java Security: From HotJava to Netscape and Beyond," Proceedings of the 1996 IEEE Symposium on Security and Privacy, May 6-8, 1996, Oakland, California, pp. 190-200.
Fisch et al., "The Design of an Audit Trail Analysis Tool," Proceedings of the 10th Annual Computer Security Applications Conference, Dec. 5-9, 1994, Orlando, Florida, pp. 126-132.
Safford et al., "The TAMU Security Package: An Ongoing Response to Internet Intruders in an Academic Environment," USENIX Symposium Proceedings, UNIX Security IV, Oct. 4-6, 1993, Santa Clara, California, pp. 91-118.
Sugawara, Toshiharu, "A Cooperative LAN Diagnostic and Observation Expert System," Ninth Annual Phoenix Conference on Computers and Communications, 1990 Conference Proceedings, Mar. 21-23, 1990, Scottsdale, Arizona, pp. 667-674.
Casella, Karen A., "Security Administration in an Open Networking Environment," The Ninth Systems Administration Conference, LISA 1995, Monterrey, California, Sep. 17-22, 1995, pp. 67-73.
Burchell, Jonathan, "Vi-SPY: Universal NIM?" Virus Bulletin, Jan. 1995, pp. 20-22.
Benzel et al., "Identification of Subjects and Objects in a Trusted Extensible Client Server Architecture," 18th National Information Systems Security Conference, Oct. 10-13, 1995, Baltimore, Maryland, pp. 83-99.
Epstein et al., "Component Architectures for Trusted Netware," 18th National Information Systems Security Conference, Oct. 10-13, 1995, Baltimore, Maryland, pp. 455-463.
Varadharajan, Vijay, "Design and Management of a Secure Networked Administration System: A Practical Approach," 19th National Information Systems Security Conference, Oct. 22-25, 1996, Baltimore, Maryland, pp. 570-580.

Snapp et al., "DIDS (Distributed Intrusion Detection System)—Motivation, Architecture, and an Early Prototype," 14th National Computer Security Conference, Oct. 1-4, 1991, Washington, DC, pp. 167-176.
Broner et al., "IntelligentI/O Rule-Based Input/Output Processing for Operating Systems," Operating Systems Review, vol. 25, No. 3, Jul. 1991, pp. 10-26.
Drews et al., "Special Delivery—Automatic Software Distribution Can Make You a Hero," Network Computing, Aug. 1, 1994, pp. 80, 82-86, 89, 91-95.
Morrissey, Peter, "Walls," Network Computing, Feb. 15, 1996, pp. 55-59, 65-67.
Harlander, Dr. Magnus, "Central System Administration in a Heterogenous Unix Environment: GeNUAdmin," , Proceedings of the Eighth Systems Administration Conference (LISA VIII), Sep. 19-23, 1994, San Diego, California, pp. 1-8.
Shaddock et al., "How to Upgrade 1500 Workstations on Saturday, and Still Have Time to Mow the Yard on Sunday," The Ninth Systems Administration Conference LISA '95, Sep. 17-22, 1995, Monterrey, California, pp. 59-65.
Anderson, Paul, "Towards a High-Level Machine Configuration System," Proceedings of the Eighth Systems Administration Conference (LISA VIII), Sep. 19-23, 1994, San Diego, California, pp. 19-26.
Cooper, Michael A., "Overhauling Rdist for the '90s," Proceedings of the Sixth Systems Administration Conference (LISA VI), Oct. 19-23, 1992, Long Beach, California, pp. 175-188.
Vangala et al., "Software Distribution and Management in a Networked Environment," Proceedings of the Sixth Systems Administration Conference, Oct. 19-23, 1992, Long Beach, California, pp. 163-170.
Kim et al., "The Design and Implementation of Tripwire: A File System Integrity Checker," 2nd ACM Conference on Computer and Communications Security, Nov. 2-4, 1994, Fairfax, Virginia, pp. 18-29.
Winn Schwartau, "e.Security™—Solving 'Dumb Days' With Security Visualization," e-Security, Inc., Naples, FL 34103, 2000.
Anita D'Amico, Ph.D., "Assessment of Open e-Security Platform™: Vendor-Independent Central Management of Computer Security Resources," Applied Visions, Inc., 1999.
"e.Security™—Open Enterprise Security Management: Delivering an integrated, automated, centrally Managed Solution You Can Leverage Today and Tomorrow," e-Security, Inc., Naples, FL 34102, 1999.
"e.Security™—Vision," e-Security, Inc., Naples, FL, 1999.
"e.Security™—Administrator Workbench™," e-Security, Inc. Naples, FL, 1999.
"e.Security™—Fact Sheet," e-Security, Inc., Naples, FL, 1999.
"e.Security™—Open e-Security Platform™," e-Security, Inc. Naples, FL, 1999.
Babcock, "E-Security Tackles the Enterprise," Jul. 28, 1999; Inter@ctive Week, www.Zdnet.com.
Kay Blough, "In Search of More-Secure Extranets," Nov. 1, 1999, www.InformationWeek.com.
Paul H. Desmond, "Making Sense of Your Security Tools," Software Magazine and Wiesner Publishing, www.softwaremag.com, 1999.
Kay Blough, "Extra Steps Can Protect Extranets," Nov. 1, 1999, www. InformationWeek.com.
Sean Hao, "Software protects e-commerce—e-Security's product alerts networks when hackers attack," Florida Today, Florida.
Scott Weiss, "Security Strategies—E-Security, Inc.," product brief, Hurwitz Group, Inc., Mar. 24, 2000.
Sean Adee, CISA, "Managed Risk, Enhanced Response—The Positive Impact of Real-Time Security Awareness," Information Systems Control Journal, vol. 2, 2000.
"Reprint Review—The Information Security Portal—Open e-Security Platform Version 1.0", Feb. 2000, West Coast Publishing, SC Magazine, 1999.
e.Security—"Introducing the First Integrated, Automated, and Centralized Enterprise Security Management System," white paper, e-Security, Inc., Naples, FL 34102, 1999.
Ann Harrison, "Computerworld—Integrated Security Helps Zap Bugs," Feb. 21, 2000, Computerworld, vol. 34, No. 8, Framingham, MA.

(56) References Cited

OTHER PUBLICATIONS

Shruti Daté, "Justice Department Will Centrally Monitor Its Systems For Intrusions," Apr. 3, 2000, Post-Newsweek Business Information, Inc., www.gcn.com.
e.Security™, website pages (pp. 1-83), www.esecurityinc.com, e-Security, Inc., Naples, FL 34103, Sep. 14, 2000.
Peter Sommer, "Intrusion Detection Systems as Evidence," Computer Security Research Centre, United Kingdom.
Musman et al., System or Security Managers Adaptive Response Tool, DARPA Information Survivability Conference and Exposition, Jan. 25, 2000, pp. 56-68.
Gibson Research Corporation Web Pages, Shields Up!—Internet Connection Security Analysis, grc.com/default.htm, Laguna Hills, California, 2000.
Rouse et al., Design and Evaluation of an Onboard Computer-Based Information System fro Aircraft, IEEE Transactions of Systems, Man, and Cybernetics, vol. SMC-12, No. 4, Jul./Aug. 1982, pp. 451-463.
Hammer, An Intelligent Flight-Management Aid for Procedure Execution, IEEE Transactions on Systems, and Cybernetics, vol. SMC-14, No. 6, Nov./Dec. 1984, pp. 885-888.
Mann et al., Analysis of User Procedural Compliance in Controlling a Simulated Process, IEEE Transactions on Systems, Man, and Cybernetics, vol. SMC-16, No. 4, Jul./Aug. 1986.
Todd, Signed and Delivered: An Introduction to Security and Authentication, Find Out Howthe Jave Security API Can Help you Secure your Code, Javaworld, Web Publishing, Inc., San Francisco, Dec. 1, 1998, pp. 1-5.
Arvind, Secure This. Inform, Association for Information and Image Management, Silver Spring, Sep./Oct. 1999, pp. 1-4.
Stevens, TCP/IP Illustrated, vol. 1, 1994, pp. 247.
Lee et al., A Generic Virus Detection Agent on the Internet, IEEE, 30 $^{th}$ Annual Hawaii International Conference on System Sciences, 1997, vol. 4.
Cutler, Inside Windows NT, 1993, Microsoft Press.
Duncan, Advanced MS-Dos, 1986, Microsoft Press.
McDaniel, IBM Dictionary of Computing, 1994, International Business Machines Corporation.
Burd, Systems Architecture, 1998, Course Technology, Second Edition.
Programmer's Guide PowerJ, 1997, Sybase.
Swimmer et al., Dynamic detection and classification of computer viruses using general behavior patterns, 1995, Proceedings of the Fifth International Virus Bulletin Conference, Boston.
Advanced Virus Detection Technology for the Next Millennium, Aug. 1999, Network Associates, A Network Associates Executive White Paper, pp. 1-14.
Enterprise-Grade Anti-Virus Automation in the 21$^{st}$ Century, Jun. 2000, Symantec, Technology Brief, pp. 1-17.
Kephart et al., Blueprint for a Computer Immune System, 1997, Retrieved from Internet, URL:http//www.research.ibm.com/antivirus/scipapers/kephart/VB97, pp. 1-15.
Richardson, Enterprise Antivirus Software, Feb. 2000, Retrieved from Internet, URL:http://www.networkmagazine.com/article/nmg20000426S0006, pp. 1-6.
Understanding and Managing Polymorphic Viruses, 1996, Symaltec, The Symantec Enterprise Papers, vol. XXX, pp. 1-13.
Gong, JavaTM Security Architecture (JDK1.2), Oct. 2, 1998, Sun Microsystems, Inc., Version 1.0, pp. i-iv, 1-62.
Softworks Limited VBVM Whitepaper, Nov. 3, 1998, Retrieved from the Internet, URL: http://web.archive.org/web/19981203105455/http://softworksltd.com/vbvm.html, pp. 1-4.
Kephart, A Biologically Inspired Immune System for Computers, 1994, Artificial Life IV, pp. 130-139.
International Search Report for PCT/US01/26804 of Mar. 21, 2002.
Kosoresow et al., Intrusion Detection via System Call Traces, IEEE Software, pp. 35-42, Sep./Oct. 1997.
Veldman, Heuristic Anti-Virus Technology, Proceedings, 3$^{rd}$ International Virus Bulletin Conference, pp. 67-76, Sep. 1993.

Symantec, Understanding Heuristics: Symantec's Bloodhound Technology, Symantec White Paper Series, vol. XXXIV, pp. 1-14, Sep. 1997.
Nachenberg, A New Technique for Detecting Polymorphic Computer Viruses, A thesis submitted in partial satisfaction of the requirements for the degree Master of Science in Computer Science, University of California Los Angeles, pp. 1-127, 1995.
Microsoft P-Code Technology, http://msdn.microsoft.com/archive/default.asp?url=/archive/en-us/dnarvc/html/msdn_c7pcode2.asp, pp. 1-6, Apr. 1992.
DJGPP COFF Spec, http://delorie.com/djgpp/doc/coff/, pp. 1-15, Oct. 1996.
Natvig, Sandbox Technology Inside AV Scanners, Virus Bulletin Conference, Sep. 2001, pp. 475-488.
Norman introduces a new technique for eliminating new computer viruses, found on Norman's website, file://c:/documents%20and%20settings\7489\local%20settings\temporary%20internet%20files\olk, pp. 1-2, published Oct. 25, 2001, printed from website Dec. 27, 2002.
International Search Report for PCT/US01/19142 of Jan. 17, 2003.
Using the CamNet BBS FAQ, http://www.cam.net.uk/manuals/bbsfaq/bbsfaq.htm, Jan. 17, 1997.
Express Storehouse Ordering System, "Accessing ESOS through the Network",http://www-bfs.ucsd.edu/mss/esos/man3.htm, Sep. 3, 1996.
NASIRE, NASIRC Bulletin #94-10, http://cs-www.ncsl.nist.gov/secalert/nasa/nasa9410.txt, Mar. 29, 1994.
Packages in the net directory, http://linux4u.jinr.ru/usoft/WWW/www_debian.org/FTP/net.html, Mar. 20, 1997.
Sundaram, An Introduction to Intrusion Detection, Copyright 1996, published at www.acm.org/crossroads/xrds2-4/intrus.html, pp. 1-12.
Samfat, IDAMN: An Intrusion Detection Architecture for Mobile Networks, IEEE Journal on Selected Areas in Communications, vol. 15, No. 7, Sep. 1997, pp. 1373-1380.
Info: Visual Basic Supports P-Code and Native Code Compilation (Q229415), http://support.micorsoft.com/support/kb/articles/Q229/4/15.ASP, pp. 1-2, Apr. 28, 1999.
International Search Report for PCT/US99/29117 of May 2, 2000.
Nordin, U of MN OIT Security and Assurance, Feb. 9, 2000.
Internet Security Systems, RealSecure SiteProtector, SAFEsuite Decisions to SiteProtector Migration, Aug. 8, 2003, pp. 1-42.
Internet Security Systems, SAFEsuite Enterprise, SAFEsuite Decisions, 1998.
Internet Security Systems, SAFEsuite Enterprise, Recognizing the Need for Enterprise Security: An Introduction to SAFEsuite Decisions, Aug. 1998, pp. 1-9.
Internet Security Systems, SAFEsuite Decisions 2.6, Frequently AskedQuestions, Feb. 21, 2001, pp. 1-10.
Internet Security Systems, SAFEsuite Decisions Version 1.0, User's Guide, 1998, pp. 1-78.
Porras et al., Emerald: Event Monitoring Enabling Responses to Anomalous Live Disturbances, Computer Science Laboratory, SRI International, Menlo Park, CA, Oct. 1997, pp. 353-365.
Cisco Systems, Empowering the Internet Generation, 1998.
Messmer, Start-Up Puts Hackers on BlackICE, Network World Fusion, http://www.nwfusion.com/cgi-bin/mailto/x/cgi, Apr. 21, 1999, p. 1-2.
NeworkICE Corporation, Can You Explain How Your Product Can Protect a Remote User with a VPN Client?, 1998-1999, pp. 1-2, http://www.webarchive.org/web/20000304071415/advice.networkice.com/advice/support/kb/q000003/default.
Yasin, Start-Up Puts Network Intruders on Ice, http://www.internetweek.com/story/INW19990505S0001, May 5, 1999, pp. 1-2.
Morency, NetworkWorldFusion, http://nwfusion.com/cgi-bin/mailto/x.cgi, Jun. 28, 1999, pp. 1-2.
Rogers, Network ICE Touts Security Wares, Apr. 23, 1999, San Mateo, California, http://www.crn.com/showArticle.jhtml?articleID=18829106&flatPage=true, pp. 1-2.
Rogers, Network ICE Signs Resellers, May 26, 1999, San Mateo, California, http://www.crn.com/showArticle.jhtml?articleID=18805302&flatPage=true, pp. 1-2.
Internet Security Systems, I've Been Attacked! Now What?, Aug. 27, 1999, http://www.iss.net/security_center/advice/Support/KB/q000033/default.htm, pp. 1-2.

(56) References Cited

OTHER PUBLICATIONS

Internet Security Systems, What is the Format of "Attack-List. CSV"?, Aug. 21, 1999, http://www.iss.net/security_center/advice/Support/KB/q000018/default.htm, pp. 1-2.

Neumann et al., Experience with Emerald to Date, Apr. 11-12, 1999, 1st USENIX Workshop on Intrusion Detection and Network Monitoring, Santa Clara, California, pp. 1-9.

Lindqvist et al., Detecting Computer and Network Misuse Through the Production-Based Expert System Toolset (P-BEST), May 9-12, 1999, Proceedings of the 1999 IEEE Symposium on Security and Privacy, Oakland, California, pp. 1-16.

Kendall, A Database of Computer Attacks for the Evaluation of Intrusion Detection Systems, Jun. 1999, Department of Defense Advanced Research Projects Agency, pp. 1-124.

Neumann, Computer Security and the U.S. Infrastructure, Nov. 6, 1997, Congressional Testimony, pp. 1-11.

Porras et al., Life Traffic Analysis of TCP/IP Gateways, Nov. 10, 1997, Internet Society's Networks and Distributed Systems Security Systems Symposium, Mar. 1998,http://www.sdl.sri.com/projects/emerald/live-traffic.html, pp. 1-16.

Raynaud et al., Integrated Network Management IV, 1995, Proceedings of the 4th International Symposium on Integrated Network Management, pp. 1-2 and 5-16.

Heberlein et al., A Method to Detect Intrusive Activity in a Networked Environment, Oct. 1-4, 1991, 14th National Computer Security Conference, Washington, D.C., pp. 362-363 and 365-371.

Ko et al., Execution Monitoring of Security-Critical Programs in Distributed Systems: A Specification-Based Approach, 1997, Proceedings of the 1997 IEEE Symposium on Security and Privacy, pp. 175-187.

Crosbie et al., Active Defense of a Computer System Using Autonomous Agents, Technical Report No. 95-008, Feb. 15, 1995, Purdue University, West Lafayette, Indiana, pp. 1-14.

Mansouri-Samani et al., Monitoring Distributed Systems, Nov. 1993, IEEE Network, pp. 20-30.

Jakobson et al., Alarm Correlation, Nov. 1993, IEEE Network, pp. 52-59.

Anderson et al., Next-Generation Intrusion Detection Expert (NIDES), A Summary, May 1995, SRI International, pp. 1-37.

Veritas Software, Press Release, Robust Enhancements in Version 6.0 Maintain Seagate WI as the De Facto Standard for Software Distribution, Oct. 6, 1997, Press Releases, pp. 1-4, http://216.239.39.104/search?q=cache:HS9kmKlm2QoJ:www.veritas.com/us/aboutus/pressroom/199 . . . .

Yasin, Network-Based IDS are About to Stop Crying Wolf, Security Mandate: Silence False Alarms, Apr. 9, 1999, http://lists.jammed.com/ISN/1999/04/0021.html, pp. 1-3.

Internet Security Systems, Press Release, ISS Reports Record Revenues and Net Income for Second Quarter, Jul. 19, 1999, http://bvlive01.iss.net/issEn/delivery/prdetailjsp?type—Financial &oid=14515, pp. 1-5.

LaPadula, State of the Art in CyberSecurity Monitoring, A Supplement, Sep. 2001, Mitre Corporation, pp. 1-15.

Balasubramaniyan et al., An Architecture for Intrusion Detection Using Autonomous Agents, Jun. 11, 1998, Purdue University, West Lafayette, Indiana, pp. 1-4, http://gunther.smeal.psu.edu/images/b9/f3/bb/9e/ba7f39c3871dcedeb9abd0f70cb84607/1.png.

Crosbie et al., Active Defense of a Computer System Using Autonomous Agents, Feb. 15, 1995, Technical Report No. 95-008, Purdue University, West Lafayette, Indiana, pp. 1-14.

Crosbie et al., Defending a Computer System Using Autonomous Agents, Mar. 11, 1994, Technical Report No. 95-022, Purdue University, West Lafayette, Indiana, pp. 1-11.

Denning, An Intrusion-Detection Model, Feb. 1987, IEEE Transactions on Software Engineering, vol. SE-13, No. 2, pp. 1-17.

Lunt, A Survey of Intrusion Detection Techniques, 1993, Computers & Security, 12 (1993), pp. 405-418.

Porras et al., Penetration State Transition Analysis A Rule-Based Intrusion Detection Approach, 1992, pp. 220-229.

Javitz et al., The NIDES Statistical Component: Description and Justification, SRI International, Menlo Park, California, SRI Project 3131, Mar. 7, 1994.

Lindqvist et al., Detecting Computer and Network Misuses Through the Production-Based Expert System Toolset (P-BEST), Oct. 25, 1998, pp. 1-20.

Javitz et al., The SRI IDES Statistical Anomaly Detector, SRI Internationa, Menlo Park, California, May 1991, IEEE Symposium on Security and Privacy, pp. 1-11.

Porras et al., Live Traffic Analysis of TCP/IP Gateways, Nov. 10, 1997, SRI International, Menlo Park, California, pp. 1-16.

Porras et al., Live Traffic Analysis of TCP/IP Gateways, Dec. 12, 1997, SRI International, Menlo Park, California, Proceedings of the 1998 ISOC Symposium on Network and Distributed Systems Security, pp. 1-13.

Information & Computing Sciences: System Design Laboratory: Programs: Intrusion Detection, SRI International, http://www.sdl.sri.com/programs/intrusion/, Jun. 17, 2004, pp. 1-2.

Lindqvist et al., eXpert-BSM: A Host-based Intrusion Detection Solution for Sun Solaris, SRI International, Menlo Park, California, Dec. 10-14, 2001, Proceedings of the 17th Annual Computer Security Applications Conference, pp. 1-12.

Almgren et al., Application-Integrated Data Collection for Security Monitoring, Oct. 10-12, 2001, SRI International, Menlo Park, California, pp. 1-15.

Debar et al., Research Report: A Revised Taxonomy for Intrusion-Detection Systems, Oct. 25, 1999, IBM Research, Switzerland, pp. 1-23.

Porras et al., Emerald: Event Monitoring Enabling Responses to Anomalous Live Disturbances, Computer Science Laboratory, SRI International, Menlo Park, CA, Dec. 18, 1996, pp. 1-3.

Frequently-Asked Questions about RealSecure, pp. 1-14, http://web.archive.org/web/19970721183227/iss.net/prod/rs_faq.html, May 30, 1997.

Cisco Systems, Inc., Empowering the Internet Generation, 1998.

Internet Security Systems, Inc., RealSecure Release 1.2 for UNIX, A User Guide and Reference Manual, 1997.

Internet Security Systems, Inc., Real-time attack recognition and response: A solution for tightening network security, Jan. 1997, pp. 1-13.

NetworkICE Corporation, ICEcap Administrator's Guide, Version 1.0 BETA, 1999, pp. 1-142.

Debar, Herve et al., A Neural Network Component for an Intrusion Detection System, 1992, pp. 240-250.

SRI International, A Prototype IDES: A Real-Time Intrusion-Detection Expert System, Aug. 1987, p. 1-63.

SRI International, Requirements and Model for IDES—A Real-Time Intrusion-Detection Expert System, Aug. 1985, pp. 1-70.

SRI International, An Intrusion-Detection Model, Nov. 1985, pp. 1-29.

Dowell et al., The ComputerWatch Data Reduction Tool, Proc. of the 13th National Computer Security Conference, Washington, D.C., Oct. 1990, pp. 99-108.

Fox et al., A Neural Network Approach Towards Intrusion Detection, Jul. 2, 1990, pp. 125-134.

Garvey et al., Model-Based Intrusion Detection, Oct. 1991, pp. 1-14.

Ilgun et al., State Transition Analysis: A Rule-Based Intrusion Detection Approach, Mar. 1995, pp. 181-199.

Javitz et al., The SRI IDES Statistical Anomaly Detector, May 1991, pp. 1-11.

SRI International, The NIDES Statistical Component Description and Justification, Mar. 7, 1994, pp. 1-46.

Karen, Oliver, PC Magazine, The Digital Doorman, Nov. 16, 1999, p. 68.

Liepins et al., Anomaly Detection: Purpose and Frameowrk, 1989, pp. 495-504.

Lindqvist et al., Detecting Computer and Network Misuse Through the Production-Bases Expert System Toolset (P-BEST), Oct. 25, 1998, pp. 1-20.

Lunt, Teresa, A survey of intrusion detection techniques, 1993, pp. 405-418.

Lunt, Teresa, Automated Audit Trail Analysis and Intrusion Detection: A Survey, Oct. 1988, pp. 1-8.

(56) References Cited

OTHER PUBLICATIONS

Sebring et al., Expert Systems in Intrusion Detection: A Case Study, Oct. 1988, pp. 74-81.
Shieh et al., A Pattern-Oriented Intrusion-Detection Model and Its Applications, 1991, pp. 327-342.
Smaha, Stephen, Haystack: An Intrusion Detection System, 1988.
Snapp, Steven Ray, Signature Analysis and Communication Issues in a Distributed Intruion Detection System, 1991, pp. 1-40.
Porras et al., EMERALD: Event Monitoring Enabling Responses to Anomalous Live Disturbances, Oct. 1997, pp. 353-365.
Lunt et al., Knowledge-Based Intrusion Detection, Mar. 1989, pp. 102-107.
Lunt et al., An Expert System to Classify and Sanitize Text, Dec. 1987, pp. 1-5.
Tener, William, Computer Security in the Age of Information, AI & 4GL: Automated Detection and Investigation Tools, 1989, pp. 23-29.
Teng et al., Adaptive Real-time Anomaly Detection Using Inductively Generated Sequential Patterns, 1990, pp. 278-284.
Vaccaro et al., Detection of Anomalous Computer Session Activity, 1989, pp. 280-289.
Winkler, J.R., A UNIX Prototype for Intrusion and Anomaly Detection in Secure Networks, 1990, pp. 115-124.
Boyen et al. Tractable Inference for Complex Stochastic Process, Jul. 24-26, 1998.
Copeland, Observing Network Traffic—Techniques to Sort Out the Good, the Bad, and the Ugly, 2000, pp. 1-7.
Goan, Terrance, Communications of the ACM, A Cop on the Beat Collecting and Appraising Intrusion Evidence, Jul. 1999, pp. 47-52.
Heberlein et al., A network Security Monitor, 1990, pp. 296-304.
Jackson et al., An Expert System Applications for Network Intrusion Detection, Oct. 1991, pp. 1-8.
Lankewicz et al., Real-Time Anomaly Detection Using a Nonparametric Pattern Recognition Approach, 1991, pp. 80-89.
Lippmann et al., Evaluating Intrusion Detection Systems: The 1998 DARPA Off-line Intrusion Detection Evaluation, 1999.
Munson et al., Watcher: The Missing Piece of the Security Puzzle, Dec. 2001.
Pearl, Judea, Probabilistic Reasoning in Intelligent Systems: Networks of Plausible Inference, Sep. 1988.
Porras et al., Live Traffic Analysis of TCP/IP Gateways, Dec. 12, 1997, pp. 1-13.
Emerald TCP Statitical Analyzer 1998 Evaluation Results, http://www.sdl.sri.com/projects/emerald/98-eval-estat/index.html, Jul. 9, 1999, pp. 1-15.
Staniford-Chen, GrIDS-A Graph Based Intrusion Detection System for Large Networks, Oct. 1996.
Tener, William, Discovery: An Expert System in the Commercial Data Security Environment, Dec. 1986, pp. 45-53.
Valdes et al., Adaptive, Model-Based Monitoring for Cyber Attack Detection, 2000, pp. 1-19.
SRI International, Blue Sensors, Sensor Correlation, and Alert Fusion, Oct. 4, 2000.
Valdes et al., Statistical Methods for Computer Usage Anomaly Detection Using NIDES, Jan. 27, 1995, pp. 306-311.
Wimer, Scott, The Core of CylantSecure, http://www.cylant.com/products/core.html, 1999, pp. 1-4.
Zhang et al., A Hierarchical Anomaly Network Intrusion Detection System using Neural Network Classification, Feb. 2001.
Cisco Secure Intrusion Detection System 2.1.1 Release Notes, http://www.cisco.com/univercd/cc/td/doc/product/iaabu/csids/csids3/nr211new.htm, Jun. 10, 2003, pp. 1-29.
Linux Weekly News, http://lwn.net/1998/0910shadow.html, Sep. 8, 1998, pp. 1-38.
Cracker Tracking: Tighter Security with Intrucsion Detection, http://www.bvte.com/art/9805/sec20/art1.htm, May 1998, pp. 1-8.
Cisco Systems, Inc., Newtork RS: Intrusion Detection and Scanning with Active Audit Session 1305, 1998.
Business Security Advisor Magazine, Intrusion Detection Systems: What You Need to Know, http://advisor.com/doc/0527, Sep. 1998, pp. 1-7.
Garvey et al., An Inference Technique for Integrating Knowledge from Disparate Sources, Multisensor Integration and Fusion for Intelligenct Machines and Systems, 1995, pp. 458-464.
Power et al., CSI Intrusion Detection System Resource, Jul. 1998, pp. 1-7.
Cisco Systems, Inc., NetRanger User's Guide Version 2.1.1, 1998.
Internet Security Systems, Real-Time Attack Recognition and Response: A Solution for Tightening Network Security, http://www.iss.net, 1997, pp. 1-13.
Network ICE Corporation, Network ICE Product Documentation, pp. 1-3, http://www.web.archive.org/web/20011005080013/www.networkice.com/support/documentation.html, Jul. 6, 2004.
Network ICE Corporation, Network ICE Documentation, p. 1, http://www.web.archive.org/web/19991109050852/www.networkice.com/support/docs.htm, Jul. 6, 2004.
Network ICE Corporation, Network ICE Press Releases, p. 1, http://www.web.archive.org/web/19990903214428/www.netice.com/company/pressrelease/press.htm, Jul. 7, 2004.
Network Ice Corporation, Network ICE Press Releases, p. 1, http://www.web.archive.org/web/20000304074934/www.netice.com/company/pressrelease/press.htm, Jul. 7, 2004.
Brentano et al., An Architecture for Distributed Intrusion Detection System, Department of Energy Computer Security Group, 14th Annual Conference Proceedings, pp. (17)25-17(45), May 1991.
Staniford-Chen et al., GrIDS-A Graph Based Intrusion Detection System for Large Networks, University of California, Davis, California, 19th National Information Systems Security Conference, 1996, pp. 1-10.
Ricciulli et al., Modeling Correlated Alarms in Network Management Systems, SRI International, Menlo Park, California, , Proceedings of the Conference on Communication Networks and Distributed System Modelng and Simulation, 1997, pp. 1-8.
Porras et al., Emerald: Event Monitoring Enabling Responses to Anomalous Live Disturbances, SRI International, Menlo Park, California, 20th National Information Systems Security Conference, Oct. 1997, pp. 1-24.
Porras et al., A Mission-Impact Based Approach to INFOSEC Alarm Correlation, SRI International, Menlo Park, California, Oct. 2002, pp. 1-33.
Phrack 55 Download (234 kb, Sep. 9, 1999), http://www.phrack.org/show.php?p=55&a=9, pp. 1-6.
Porras et al., A Mission-Impact-Based Approach to INFOSEC Alarm Correlation, SRI International, Menlo Park, California, Oct. 2002, pp. 1-19.
Bace, An Introduction to Intrusion Detection and Assessment for System and Network Security Management, 1999, pp. 1-38.
Hunteman, Automated Information System—(AIS) Alarm System, University of California, Los Alamos National Laboratory, 20th National Information System Security Conference, Oct. 1997, pp. 1-12.
Janakiraman et al., Indra: A Peer-to-Peer Approach to Network Intrusion Detection and Prevention, Proceedings of the 12th International Workshop on Enabling Technologies: Infrastructure for Collaborative Enterprises, 2003, pp. 1-5.
Innella, Intrusion Detection Systems (IDS), Navy Information Assurance, Jun. 28, 2004, pp. 1-4, http://www.infosec.navy.mil/ps/?t=infosecprodsservices/infosecprodsservices.tag&bc=/infosecprodsservices/b . . . .
Curry, Intrusion Detection Systems, IBM Emergency Response Service, Coast Laboratory, http://www.cerias.purdue.edu/about/history/coast_resources/idcontent/ids.html, Jul. 19, 2004, pp. 1-28.
Lunt et al., Knowledge-Based Intrusion Detection, SRI International, Menlo Park, California, Conference on AI Systems in Government, Washington, D.C., Mar. 1989, pp. 102-107.
A. Information Assurance BAA 98-34 Cover Sheet, SRI International, Nov. 1, 2000, pp. 2-35.
NetScreen Products, FAQ, http://www.netscreen.com/products/faq.html, Feb. 28, 2003, pp. 1-6.
Miller, A Network Under Attack: Leverage Your Existing Instrumentation to Recognize and Respond to Hacker Attacks, NetScout Systems, Westford, MA, Apr. 2003, pp. 1-8.
Technology Brief: Intrusion Detection for the Millennium, Internet Security Systems, 2000, pp. 1-6.

(56) References Cited

OTHER PUBLICATIONS

Weiss et al., Analysis of Audit and Protocol Data using Methods from Artificial Intelligence, Siemens AG, Munich, Germany, Proc. of the 13th National Computer Security Conference, Washington, D.C., Oct. 1990, pp. 109-114.
Snapp et al., DIDS (Distributed Intrusion Detection System)—Motivation, Architecture, and an Early Protype), University of California, Davis California, Proc. 14th National Computer Security Conference, Washington, D.C., Oct. 1991, pp. 167-176.
Internet Security Systems, Inc., SAFEsuite Enterprise Edition, Project "Gatekeeper" 1.0, Market Requirements Document, Mar. 30, 1998, pp. 1-12.
Internet Security Systems, SAFEsuite Decisions, 2000, pp. 1-2.
Internet Security Systems, Dynamic Threat Protection, Presse-Roundtable, Munich, Germany, Apr. 10, 2003, pp. 1-63.
Internet Security Systems, Preliminary ODM 1.0 Functional Specificaion, Aug. 1997, pp. 1-7.
Internet Security Systems, Inc., Scanner-ISSDK Interface, Design Specification, Jun. 2, 2000, Draft 1.07, pp. 1-7.
RealSecure, Adaptive Network Security Manager Module Programmer's Reference Manual,pp. 1-74.
Advanced Concept Technology Demonstrations (ACTD), 2005, pp. 1-28.
Frank, Sounding the Alarm, Sep. 6, 1999, Federal Computer Week, pp. 1-2.
Crumb, Intrusion Detection Systems to be Integrated at AFRL, Air Force Research Laboratory, News@AFRL, Fall 1999, pp. 1.
Temin, Case Study: The IA: AIDE System at Two, 15th Annual Computer Security Applications Conference, Dec. 6-10, 1999, Phoenix, Arizona, pp. 1-26.
Spink, Automated Intrusion Detection Environment (AIDE), Intrusion Detection Sensor Fusion, Sep. 7, 1999, pp. 1-25.
Frincke et al., A Framework for Cooperative Intrusion Detection, 21st National Information Systems Security, Conference, Oct. 6-9, 1998, Crystal City, Virginia, pp. 1-20.
Anderson et al., In Athena's Camp: Preparing for Conflict in the Information Age, An Exploration of Cyberspace Security R&D Investment Strategies for DARPA: The Day After—in Cyberspace II, Chaper Eleven, 1996, pp. 253-271.
Valdes et al., SRI International, Probabilistic Alert Correlation, 2001, pp. 1-15.
Bass, Multisensor Data Fusion for Next Generation Distributed Intrusion Detection Systems, Apr. 28, 1999, Iris National Symposium, pp. 1-6.
Perrochon et al., Enlisting Event Patterns for Cyber Battlefield Awareness, No Date, Stanford University, pp. 1-12.
Perrochon, Using Context-Based Correlation in Network Operations and Management, Jul. 2, 1999, Stanford University, pp. 1-20.
Perrochon, Real Time Event Based Analysis of Complex Systems, Jun. 1998, pp. 1-9.
Luckham et al., Complex Event Processing in Distributed Systems, Aug. 18, 1988, Stanford University, pp. 1-26.
Pettigrew, US Southcom United States Southern Command's Information Sharing Projects, Summer 1999, IAnewsletter, vol. 3, No. 1, pp. 1-24.
Levitt et al., CMAD IV, Computer Misuse & Anomaly Detection, Session Summaries, Nov. 12-14, 1996, Proceedings of the Fourth Workshop on Future Directions in Computer Misuse and Anomaly Detection, Monterey, California, pp. 1-86.
Cheung et al., The Design of GrIDS: A Graph-Based Intrusion Detection System, Jan. 26, 1999, University of California, pp. 1-51.
Cohen et al., Report of the Reporting and Analysis Track, Detection of Malicious Code, Intrusions, and Anomalous Activities Workshop, Feb. 22-23, 1999, pp. 1-47.
Garofalakis et al., Network Mining and Analysis: The Nemesis Project, Bell Labs, Lucent Technologies, No Date, pp. 1-12.
RealSecure ICEcap Manager User Guide Version 3.6, Internet Security Systems, Inc., 1998-2002, pp. 1-228.
Cuppens, Cooperative Intrusion Detection, Date Unknown, pp. 1-10.

Mukherjee et al., Network Intrusion Detection, IEEE Network, May/Jun. 1994, pp. 26-41.
Machlis, Net Monitoring Tools Gain Real-Time Alerts, Apr. 14, 1997, http://www.computerworld.com, pp. 1-12.
OmniGuard/ITA Intruder Alert, AXENT Technologies, Inc., Nov. 17, 2004, http://www.web.archive.org, pp. 1-10.
NetRanger Overview, Chapter 1, Date Unknown, pp. 1-16.
Sutterfield, Large-Scale Network Intrusion Detection, 1997, WheelGroup Corporation, pp. 1-10.
Kumar et al., An Application of Pattern Matching in Intrusion Detection, Technical Report No. CSD-TR-94-013, Jun. 17, 1994, Purdue University, pp. 1-55.
Huang et al., A Large-Scale Distributed Intrusion Detection Framework Based on Attack Strategy Analysis, Date Unknown, The Boeing Company, pp. 1-12.
Perrochon et al., Event Mining with Event Processing Networks, Date Unknown, Stanford University, pp. 1-4.
Gruschke, Integrated Event Management: Event Correlation Using Dependency Graphs, presented at DSOM 1998, University of Munich, pp. 1-12.
Bass, Intrusion Detection System and Multisensor Data Fusion, Apr. 2000, Communicationsof the ACM, vol. 43, No. 4, pp. 99-105.
Bass et al., A Glimpse into the Future of ID, Date Unknown, Usenix, pp. 1-10.
LaPadula, State of the Art in Anomaly Detection and Reaction, Jul. 1999, Mitre Corporation, pp. 1-36.
Rationalizing Security Events with Three Dimensions of Correlation, Date Unknown, NetForensics, Tech Brief, pp. 1-6.
Jou et al., Design and Implementation of a Scalable Intrusion Detection System for the Protection of Network Infrastructure, Date Unknown, MCNC, pp. 1-15.
Caldwell, Event Correlation: Security's Holy Grail?, Aug. 1, 2002, GuardedNet, pp. 1-21.
Metcalf et al., Intrusion Detection System Requirements, Sep. 2000, Mitre Corporation, pp. 1-33.
Jou et al., Architecture Design of a Scalable Intrusion Detection System for the Emerging Network Infrastructure, Technical Report CDRL A005, Apr. 1997, MCNC, pp. 1-42.
Security Manager for UNIX Systems Version 3.2.1 User's Guide, Feb. 1998, Internet Security Systems, pp. 1-162.
RealSecure Release 1.2 for UNIX a User Guide and Reference Manual, 1997, Internet Security Systems, Inc., pp. 1-92.
Internet Scanner SAFE SAFEsuite 4.0 User Guide and Reference Manual, 1996, Internet Security Systems, Inc., pp. 1-158.
Internet Scanner 3.3 User Guide and Reference Manual, 1996, Internet Security Systems, Inc., pp. 1-119.
Landwehr et al., Newsletter of the IEEE Computer Society's TC on Security and Privacy Electrorics, Electronic CIPHER, Nov. 25, 1997, Issue 25, pp. 1-34.
20th National Information Systems Security Conference, Oct. 6-10, 1997, Baltimore, Maryland, pp. 1-44.
Emerald Alert Management Interface User's Guide Version 1.2, Dec. 6, 2000, SRI International, pp. 1-11.
Anderson et al., Detecting Unusual Program Behavior Using the Statistical Component of the Next-Generation Intrusion Detection Expert System (NIDES), May 1995, SRI International, pp. 1-89.
Lunt et al., Detecting Intruders in Computer Systems, 1993 Conference on Auditing and Computer Technology, SRI International, pp. 1-17.
Network ICE Products—ICEcap, Date Unknown, pp. 1-2.
Forlanda, The Secrets to Driving on BlackICE, Jan. 12, 2000, Network ICE, pp. 1-35.
BlackICE User's Guide Version 1.0 Beta Draft, 1999, Network ICE Corporation, pp. 1-59.
ICEcap Administrator's Guide Version 1.0 Beta Draft, 1999, Network ICE Corporation, pp. 1-25.
Shulak et al., ICEcap Advanced Administration Guide Version 3.0, 2001, Internet Security Systems Corporation, pp. 1-51.
"Real Secure, OS Sensor User Guide," Version 5.0, © Internet Security Systems, Inc. 199?-2000; Sep. 2000, pp. 1-64.
"Real Secure, User's Guide," Version 3.0, © 1992-1998, Internet Security Systems, Inc., pp. 1-128.

(56) References Cited

OTHER PUBLICATIONS

"System Security Scanner, User Guide," Version 1.6, © 1996-1998, Internet Security Systems, Inc., pp. 1-164.
"Real Secure™, Network Engine User Guide," Version 3.2.1, © 1999 by Internet Security Systems, Inc., pp. 1-38.
"Real Secure™, User Guide," Version 3.2.1, © 1999 by Internet Security Systems, Inc., pp. 1-38.
"Real Secure™, Manager for HP Open View User Guide," Version 1.3, © 1999 by Internet Security Systems, Inc., pp. 1-48.
"Database Scanner, User Guide," Version 2.0, © 1992-1999, Internet Security Systems, Inc., pp. 1-112.
"Database Scanner™, User Guide," Version 4.0, © 2000 by Internet Security Systems, Inc., pp. 1-122.
"Database Scanner™, User Guide," Version 3.0.1,, © 1999 by Internet Security Systems, Inc., pp. 1-164.
"Real Secure™, Network Sensor User Guide," Version 5.0, © 2000 by Internet Security Systems, Inc., pp. 1-42.
"Real Secure, Server Sensor User Guide," Version 5.5, © Internet Security Systems, Inc. 2000, pp. 1-56.
"Internet Scanner™, User Guide," Version 6.0, Copyright © 1999 by Internet Security Systems, Inc., pp. 1-182.
"Internet Scanner™, User Guide," Version 6.1, © 2000 by Internet Security Systems, Inc., pp. 1-226.
"Internet Scanner™, User Guide," Version 5.6, © 1992-1998, Internet Security Systems, Inc., pp. 1-162.
"Internet Scanner™, User Guide," Version 5.3, © 1992-1998, Internet Security Systems, Inc. pp. 1-173.
"Real Secure, Console User Guide," Version 5.5, © 199?-2000, Internet Security Systems, Inc., pp. 1-162.
"Internet Scanner™, User Guide," Version 5.8,© 1999 by Internet Security Systems, Inc., pp. 1-148.
"SAFEsuite Decisions, User Guide," Version 1.0, © 1992-1998, Internet Security Systems, Inc., pp. 1-88.
"Real Secure™, Console User Guide," Version 5.0, © 2000 by Internet Security Systems, Inc., pp. 1-114.
"SAFEsuite Decisions, User Guide," Version 2.5, © 2000 by Internet Security Systems, Inc., pp. 1-194.
"System Scanner, User Guide," Version 1.7, © 1992-1998, Internet Security Systems, Inc., pp. 1-248.
"Sytem Scanner, User Guide," Version 1.0, © 1996-1998, Internet Security Systems, Inc., pp. 1-140.
"System Scanner™, User Guide," Version 4.0, © 1999 by Internet Security Systems, Inc., pp. 1-178.
Internet Security Systems, Inc., "Introduction to RealSecure Version 5.0, The Industry's Only Integrated Host Based and Network-Based Intrusion Detection System", Aug. 22, 2000, pp. 1-47.
Internet Security Systems, Inc., "RealSecure Network Sensor and Gigabit Network Sensor Policy Guide Version 7.0", Aug. 2003, pp. 1-86.
Internet Security Systems, Inc., "RealSecure Console User Guide Version 3.1", Jun. 1999, pp. 1-98.
Internet Security Systems, Inc., "RealSecure Version 2.0", Apr. 1998, pp. 1-154.
Internet Security Systems, Inc., "Enhanced Dynamic Threat Protection via Automated Correlation and Analysis", an ISS White Paper, 2002, pp. 1-14.
Internet Security Systems, Inc., "RealSecure Site Protector Comparison Guide for Internet Scanner 7.0 Reporting Version 1.2", Mar. 2003, an ISS Tech Note, pp. 1-15.
Internet Security System, Inc., "RealSecure Site Protector Comparison Guide for ICEcap Manager Version 1.5", Jan. 2002, an ISS Technical White Paper, pp. 1-27.
Internet Security Systems, Inc., "RealSecure SiteProtector Security Fusion Module 2.0 Frequently Asked Questions", Mar. 2003, pp. 1-8.
Internet Security Systems, Inc., "RealSecure SiteProtector Console User Reference Guide Version 2.0 Service Pack 1", Mar. 14, 2003, Chapter 3, pp. 1-27.
Internet Security Systems, Inc., "Proventia Gateway and Network Protection", Jul. 2003, pp. 1-12.
Farley, Internet Security System, Inc., "ID Fusion Technology, A First-Generation Approach", Apr. 29, 1999, National Security Framework Forum, pp. 1-8.
Farley, "RealSecure Fusion Engine Concepts", an ISS White Paper, Jun. 30, 1999, pp. 1-23.
McGraw et al., "Secure Computing with Java: Now and the Future", 1997, http://java.sun.com/security/javaone97-whitepaper.html, pp. 1-20.
Sandra H. Rouse, William B. Rouse, and John M. Hammer, "Design and Evaluation of an Onboard Computer-Based Information system for Aircraft," IEEE Transactions of Systems, Man, and Cybernetics, vol. SMC-12, No. 4, Jul./Aug. 1982, pp. 451-463.
John M. Hammer, "An Intelligent Flight-Management Aid for Procedure Execution," IEEE Transactions on Systems, Man, and Cybernetics, vol. SMC-14, No. 6, Nov./Dec. 1984, pp. 885-888.
Teresa L. Mann and John M. Hammer, "Analysis of User Procedural Compliance in Controlling a Simulated Process," IEEE Transactions on Systems, Man, and Cybernetics, vol. SMC-16, No. 4, Jul./Aug. 1986.
"e.Security ™—Vision," e-Security, Inc., Naples, FL, 1999.
Charles Babcock, "E-Security Tackles the Enterprise," Jul. 28, 1999; Inter@ctive Week, www.Zdnet.com.
Sean Hao, "Software protects e-commerce—e-Security's product alerts networks when hackers attack,"Florida Today, Florida.
Ann Harrison, "Computerworld—Integrated Security Helps Zap Bugs," Feb. 21, 2000, Computerworld vol. 34, No. 8, Framingham, MA.
Peter Summer, "Intrusion Detection Systems as Evidence," Computer Security Research Centre, United Kingdom.
Todd Sundsted, "Signed and Delivered: An Introduction to Security and Authentication; Find Out How the Jave Security API Can Help Your Code," Javaworld, Web Publishing, Inc., San Francisco, Dec. 1, 1998, pp. 1-5.
Krshna Arvind, "Secure This. Inform," Association for Information and Image Management, Silver Spring, Sep./Oct. 1999, pp. 1-4.
U.S. Appl. No. 09/685,285, Decision on Appeal, Jul. 24, 2009, pp. 1-11.

* cited by examiner

Lungfish - Microsoft Internet Explorer provided by Internet Security Systems

File  Edit  View  Favorites  Tools  Help

| Incident | Investigation | Response | Configure |
|---|---|---|---|
| Report | View | Search | Edit |

POLICY  ASSETS  FIXES  ALERTS  SAFELINK  INCIDENT

Search Results

You can click on the Incident ID to edit the incident, click on the Incident Name to view the incident.

| ID | Status | Incident Name | Incident Date | Report Date |
|---|---|---|---|---|
| 9545203331553 | In Investigation | Test Incident1 | 03/01/2000 05:57:00 PM | 03/31/2000 11:32:11 AM |
| 9555994401480 | New | DDos Attack onEBay.com | 04/17/2000 01:52:03 PM | 04/17/2000 02:00:01 PM |
| 956002249963 | New | Test Incident | 04/17/2000 04:09:39 PM | 04/17/2000 04:10:49 PM |
| 956149177445 | New | Test Apache | 04/19/2000 08:55:00 AM | 04/19/2000 08:59:37 AM |
| 956172292063 | New | Test Apache | 04/19/2000 08:55:00 AM | 04/19/2000 03:24:52 PM |
| 959172334183 | New | Test Apache | 04/19/2000 08:55:00 AM | 04/19/2000 03:25:34 PM |
| 956174666357 | New | Alert Test Again | 04/19/2000 04:03:00 AM | 04/19/2000 04:04:26 PM |
| 959981258675 | New | testsecurity | 06/02/2000 05:26:00 AM | 06/02/2000 05:27:38 PM |
| 963410616255 | New | Test IncidentHandler | 07/01/2000 10:02:00 AM | 07/12/2000 10:03:36 AM |
| 963414077562 | New | Denial of Service Attack 3 | 07/01/2000 11:00:00 AM | 07/12/2000 11:01:17 AM |
| 963927374185 | In Investigation | DDoS Attack on Major Internet Sites | 07/18/2000 09:32:00 AM | 07/18/2000 09:36:14 AM |
| 963929615578 | In Investigation | DDoS Attack on Major Internet Sites | 07/18/2000 10:10:00 AM | 07/18/2000 10:13:35 AM |
| 963931422647 | In Investigation | DDoS Attack on Major Internet Sites | 07/18/2000 10:40:00 AM | 07/18/2000 10:43:42 AM |

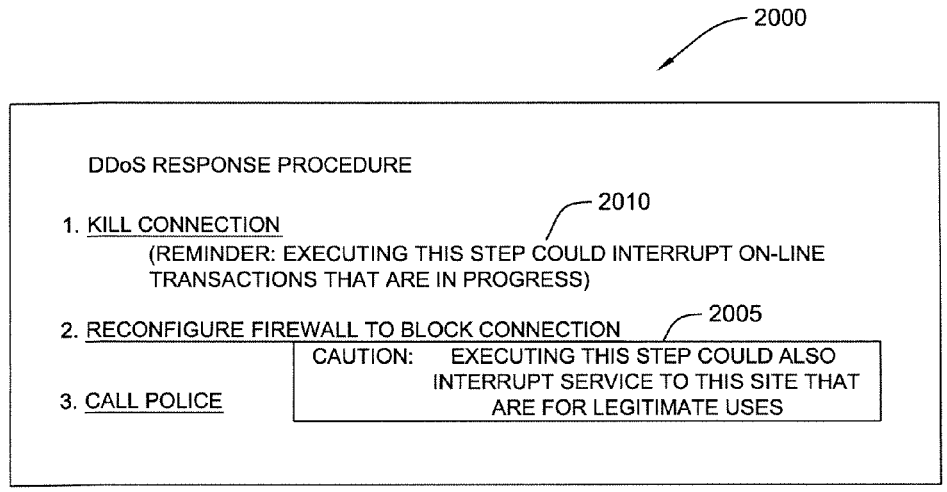

DDoS RESPONSE PROCEDURE

1. <u>KILL CONNECTION</u> ⎯ 2010
   (REMINDER: EXECUTING THIS STEP COULD INTERRUPT ON-LINE TRANSACTIONS THAT ARE IN PROGRESS)

2. <u>RECONFIGURE FIREWALL TO BLOCK CONNECTION</u> ⎯ 2005

CAUTION: EXECUTING THIS STEP COULD ALSO INTERRUPT SERVICE TO THIS SITE THAT ARE FOR LEGITIMATE USES

3. <u>CALL POLICE</u>

FIG. 20

STRATEGIC MACHINE TABLE

| STEP TO BE PERFORMED | COMPUTER INTERNET ADDRESS RANGE | TOOL SERVERS |
|---|---|---|
| BLOCK CONNECTION | 00.000.00.00. - 100.100.100.100.<br>101.101.101.101. - 155.155.155.155.<br>156.156.156.156. - 255.255.255.255. | SC1<br>SC2<br>SC3 |
| RUN TRIPWIRE | 00.000.00.00. - 100.100.100.100.<br>101.101.101.101. - 155.155.155.155.<br>156.156.156.156. - 255.255.255.255. | SC3<br>SC2<br>SC1 |
| DUMP NETWORK PACKETS | 00.000.00.00. -100.100.100.100.<br>101.101.101.101. - 155.155.155.155.<br>156.156.156.156. - 255.255.255.255. | SC1<br>SC3<br>SC2 |

FIG. 21A

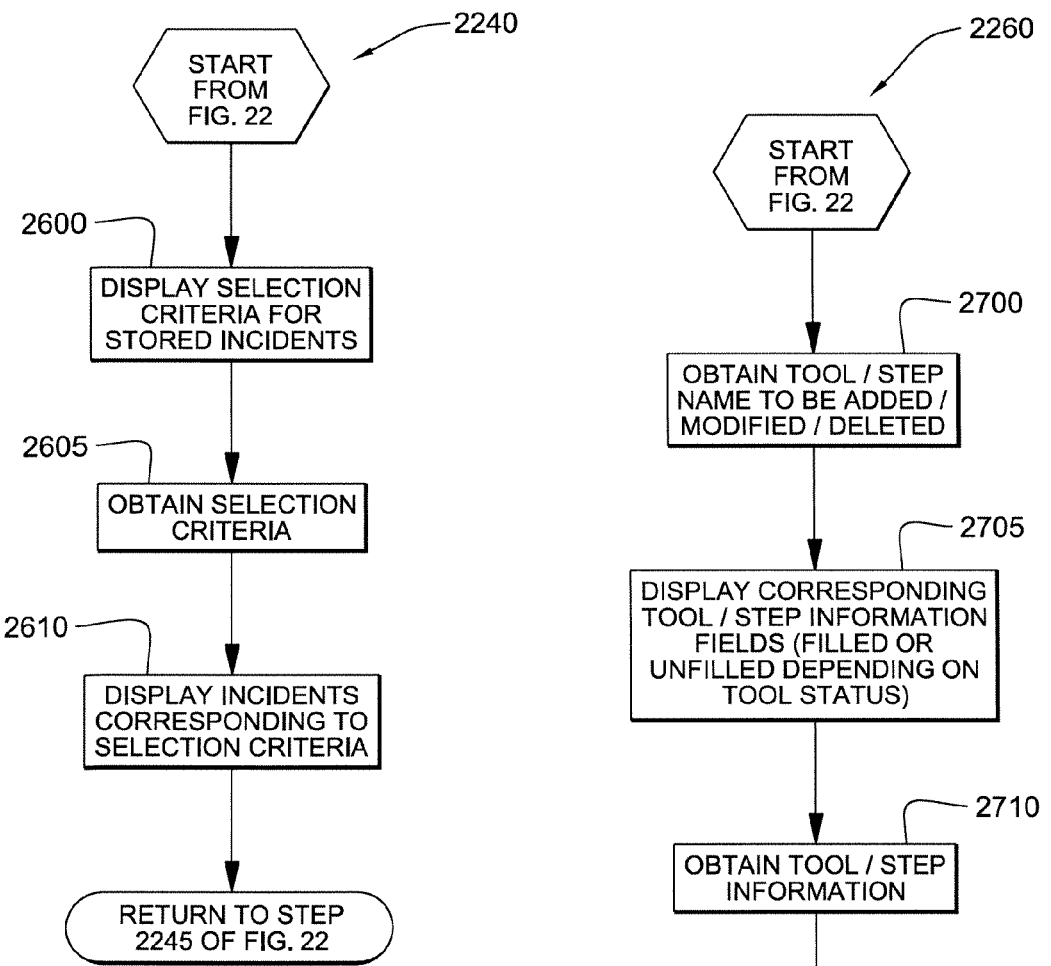

METHOD AND SYSTEM FOR CREATING A RECORD FOR ONE OR MORE COMPUTER SECURITY INCIDENTS

CROSS REFERENCE TO RELATED APPLICATION

This application is a continuation of U.S. application Ser. No. 09/685,285 filed Oct. 10, 2000, now abandoned entitled, "Method and System for Creating a Record for One or More Computer Security Incidents", the entire contents of which are hereby incorporated by reference.

TECHNICAL FIELD

The present invention relates to computer systems and the security of such systems. More particularly, the present invention relates to a method and system for creating an investigation and response record for one or more security incidents that may occur on or within a computer system.

BACKGROUND OF THE INVENTION

As E-commerce or doing business over the Internet becomes a way of life rather than being characterized as novel commercial activity, protecting computer systems against malicious attacks or alleged pranks will be vital to both businesses and individuals because of potential economic disasters. In other words, because businesses and individuals are becoming more and more dependent upon computer systems and computer systems that are integrated with the Internet, any interrupts in service or attacks on such computer systems could have devastating financial repercussions.

Attacks on computer systems that are integrated with the Internet typically comprise malware. Malware is a term of art which is a combination of the word "malicious" and the word "software". Examples of malware include, but are not limited to, the following: computer viruses, worms and Trojan horses. A computer virus is a broad term for a program that replicates itself. A virus can cause many different kinds of damage, such as deleting data files, erasing programs, or destroying everything found on a computer hard drive. Not every virus can cause damage; some viruses simply flash annoying messages on a computer screen. A virus can be received by downloading files from the Internet to a personal computer. Another way in which a personal computer can be infected with a computer virus can occur when files are sent via e-mail over the Internet or through a company's internal network.

Similar to viruses, worms are programs designed to infect network such as the Internet. They travel from network computer to network computer, replicating themselves along the way. Unlike traditional computer viruses and worms, Trojan horses emulate their Homeric namesake by pretending to be a program that a user wants to launch. Trojan horses can be programs or files that disguise themselves as normal, helpful programs or files, but in fact are viruses. For example, if a program purported to be a financial calculator, but really deleted every file on your hard disk, that program will be called a Trojan horse. One of the most famous Trojan horses of all, was "Melissa", which was disguised as a Word document sent via e-mail. The "Melissa" Trojan horse wreaked enough havoc that it crashed many Internet and corporate mail servers.

In addition to the malware mentioned above, other computer incidents can include attacks against an Internet service provider (ISP) or any computer connected to the Internet. One of the most common attacks against an ISP or any computer connected to the Internet is called a Smurf attack, or smurfing. In a Smurf attack, a target, such as an ISP or a computer connected to the Internet, is flooded with many "garbage" packets that all of the target's available bandwidth is used up and the target or customers of the target or both cannot send or receive data by using e-mail, browsing the web, or any other Internet service. In a Smurf attack, a commonly used Internet service such as echo request packet generated from a packet Internet groper (PING) program is exploited. A PING program, utilizing echo request packets, permits a user to determine whether a particular computer or server is currently attached to the Internet and is working.

When a computer or server receives an echo request packet generated from a PING program, it sends a return echo response packet to the user who sent the echo request packet. In a typical Smurf attack, return addresses of a broadcast echo request packet are forged so that the return echo response packets do not go back to the computer incident source that generated the harmful broadcast echo request, but instead, back to the target. Smurf attacks are difficult to fight since echo response packets can originate from legitimate networks and not the computer incident source. The source of each echo response packet must be tracked down and then the source of each echo response packet, such as a network, is then asked to disallow echo requests to broadcast addresses. Adding to the complexity of the situation, when a target goes down, often legitimate customers will send echo request packets to see whether the target is operating. Therefore, a target under a Smurf attack has a very difficult time separating legitimate echo packets from Smurf echo packets.

As noted above, the nature of a distributed network, such as the Internet, makes it vulnerable to attack. The Internet was designed to allow for the freest possible exchange of information, data, and files. However, this free exchange of information carries a price: many users will try to attack the Internet and computers connected to the Internet; many users will also try to invade other users' privacy and attempt to crack databases of sensitive information or snoop around for information as it travels across Internet routes.

While many intrusion detection systems (IDS) and software programs that can gather information or make changes to security configurations of network computers (or both) currently exist, these conventional systems do not meet the threshold necessary to be admissible in a court of law. In other words, most conventional detection systems do not generate substantive evidence in the form of written records that can be admitted as tangible evidence during a trial. Furthermore, conventional intrusion detection systems do not provide a systematic approach to computer incidents that is readily reproducible. The conventional art typically requires highly skilled programmers or security administrators, who probably do not have any training in the production of forensic evidence: evidence that can be admitted into a court of law because of its authenticity, accuracy, and completeness.

Additionally, conventional intrusion detection systems in existing software do not provide any instruction as to how to accurately track and maintain a record of computer security incidents. At most, the conventional art may provide specific tools or software that permit the real time monitoring of packets on a network link by comparing packets against a library of signatures or by detecting unusual patterns in packets, or monitoring activity on a host/network device by comparing the activity against a library of signatures or by detecting unusual patterns of computer behavior. The prior art does not provide any uniform or systematic approach to detecting, monitoring, and responding to computer security incidents.

Accordingly, there is a need in the art for a method and system for determining whether an actual security incident exists. That is, there is a need in the art to determine whether security within a network or over a network has been compromised or if an incident is just some odd behavior that should be disregarded. Another need exists in the art for a method and system for automatically creating a record for one or more security incidents and reactions thereto that can be admitted as evidence in a court of law. There is a further need in the art for a method and system that records detection and responses to computer incidents that is also permanent and protected. A further need exists in the art for the uniform and systematic approach to documenting and responding to computer incidents that is readily reproducible. Additionally, there is a need in the art for a method and system for organizing and recording the actions to one or more computer security incidents that permits less skilled users to conduct investigations and respond to security incidents. A further need exist in the art for a method and system for automatically creating a record of one or more computer security incidents that can permit advanced users to implement their own procedures when investigating and responding to computer security incidents. Another need exists in the art for a method and system for automatically creating a record for one or more computer security incidents that is adaptable or modifiable so that evolving computer threats can be assessed and neutralized.

Similarly, another need exist in the art for a method and system for creating a record of one or more security incidents that is flexible. In other words, there is a need in the art for a method and system for investigating and responding to computer security incidents that provides a step-by-step approach that can be interrupted at any time to prevent network security breaches, to stop any potential damage to a network, and to provide adequate time to investigate an incident before reacting to it. An additional need in the art exist for a method and system for creating a record of computer incidents that can be programmed to automatically respond to computer security incidents that match predefined criteria. A further need exists for a method and system for selecting a computer that is strategically located relative to a source of a computer security incident such that the computer can interrogate the source of the computer security incident.

SUMMARY OF THE INVENTION

The present invention is generally directed to a computer security management system that can log, investigate, respond, and track computer security incidents that can occur in a networked computer system. In other words, the computer security management system can produce a security record of information related to the tracking of suspicious computer activity or actual computer security threats, such as denial of service attacks or other similar compromises to computers or computer networks. The security record can include, but is not limited to, date and times of computer security incidents, a name for a particular security incident, and a potential source of the computer security incident. The security record can be designed as a running log that saves or records all observable activity of a computer incident source as well as the activity of the security team responding to the computer incident source. To produce the security record, all data that relates to a computer incident and all data that relates to a computer incident response can be sent to a separate protected database, where data is protected by digital signature algorithms (DSAs).

The security record produced by the computer security management system can also keep track of the actions taken by security personnel in response to potential or actual harmful computer incidents. That is, the computer security management system can produce a record of information related to the investigation procedures and actual response procedures that are carried out by the security personnel in reaction to a computer security incident. For example, the security record can include, but is not limited to, dates and times of the investigation or response steps taken, names or brief summaries of the steps taken, as well as the names of the security personnel who reacted to a computer security incident.

The contents of the security record can be copied and the copy can be manipulated or processed to make the contents of the copy more easy to understand. However, the original security record containing the raw data should be permanent or unmodifiable so that it can be admitted as forensic evidence in a court of law. The computer security management system can be adaptable or programmable to implement techniques favored by courts to produce the security record. For example, if legal precedent is established that favors admissibility into evidence dual computer records where redundant records are kept, then the present invention can be programmed to maintain such computer record redundancy. Further, if courts favor a specific investigation procedure or response procedure for reacting to a computer incident, then the computer security management system can be programmed to implement such favored procedures in order to guarantee admissibility of the security record as evidence in a court of law.

In addition to its programmability or flexibility, the computer security management system can categorize computer security incidents according to selective properties referred to as attributes. Attributes are properties of computer security incidents that can assist in the task of prioritizing or just grouping computer security incidents. Attributes can assist in the decision making process of how to handle computer security incidents. Attributes can include, but are not limited to the following: computer incident severity; incident category; incident scope; incident status; attacker internet protocol (IP) address; attacker ISP name; attacker country; external attacker status; incident type; vulnerabilities potentially causing the incident; entry point; attack profile; target networks; target firewalls; target hosts; target services; target accounts; and damage type. Each attribute can have one or more values or can comprise a scale of values. For example, for the computer incident severity attribute, values could include high, medium, low, unknown. Additionally, attributes do not need to be predefined. That is, attributes can be computer generated or variable or both. Attributes can be generated "on-the-fly" when different computer security incident scenarios are detected.

The computer security management system can be implemented in a graphical user interface, such as a web (Internet) interface that comprises thin or fat clients or both. The system can include multiple screen displays with data entry fields, buttons, menus, or any combination thereof. According to one aspect of the present invention, the computer security management system can generate displays for organizing and collecting information about a computer security incident. More specifically, the computer security management system can also provide a listing of investigation procedures as well as response procedures that are categorized and that can be selected based upon the type of security incident.

Each procedure can include one or more steps that can be displayed as text listed in a sequential order. In one illustrative embodiment, each step can be a "hyperlink" which activates a computer tool in response to clicking or mousing over the text of a step. Alternatively, some steps can be text instructions for a user to execute manually. For an investigation procedure, each computer tool that is linked to a step can be a separate program module, such as off-the-shelf software, that is designed to collect information about a computer security incident. For a response procedure, each computer tool that is linked to a step can be a separate program module, such as off-the-shelf software, that can change security configurations of networked computers or a network infrastructure in response to a computer security incident. In addition to presenting steps of investigation and response procedures in a logical manner, the steps can also include flags or warnings indicating the impact of the execution of the step at hand.

That is, each step can include a warning, caution, or signal that may be outputted as text, a screen pop-up message, an audio alert, or any combination thereof. For example, if a the execution of a certain step is desired, the computer security management system can display text indicating how execution of the step at hand could affect the network or tracking of a security incident. For example, the security manager system could indicate that a certain step may inform the source of a computer incident that he or she is being observed by the security manager system. With the pre-execution step warnings or cautions and the sequential listing of steps of a procedure or checklist approach, less experienced or novice security personnel can conduct investigations and responses to computer security incidents. Further, the invention can provide a systematic approach to reacting to computer security incidents that can be repeated consistently by different security personnel. This systematic approach can be designed to meet the "business records" requirement for admissibility of evidence in a court of law.

After each step is executed, the computer security management system can save or record the step taken, the results produced by the step, the name of the computer security management system user, and a corresponding date or time stamp or both to a local database. The computer security management system can also display the results of each step so that a visual record is available to security personnel. The computer security management system is flexible. It can permit the addition, deletion, or modification of steps in a procedure. It can also permit regrouping or new groupings of steps to form new procedures. This flexibility permits the computer security management system to be customized for certain applications or computer networked configurations.

In addition to its programming flexibility, according to another exemplary of the invention, the computer security management system can be configured or programmed to respond to computer security incidents automatically, without any manual intervention. That is, the computer security management system can execute an entire procedure without requiring any user input depending upon the type of computer security incident detected. The computer security management system can automatically respond to computer security incidents in accordance with rules or logic that may be changed or updated.

According to yet another aspect of the present invention, the computer security management system can locate an appropriate computer to execute steps of a procedure by accessing a table containing predetermined data. For example, to execute certain steps in response procedures that may include activity or behavior that is restricted in a computer network, it may be necessary to find a computer located close to the perimeter or outer regions of the network to perform such restricted activities or behavior. In other words, in some response scenarios, it may be necessary to locate computers in a network that are not restricted to a limited number of "friendly" commands or operations.

In certain investigation or response scenarios, it may be also necessary for one or more main servers to identify tool servers (also called sensors) that may have stealth capability or, in other words, the ability to not be detected easily by the computer incident source. To locate such tool servers, a main or web server can access a table that contains one or more of the following parameters: the type or name of a step to be executed, Internet address ranges, and an appropriate tool server identifier or location. The Internet address ranges can correspond to sources or originators of computer security incidents, accomplices to computer security incidents, witnesses to computer security incidents, and computers that are subject to an attack. Based upon these parameters, an appropriate tool server can be identified and can complete one or more steps of a procedure. If a matching tool server does not exist for a certain step, then the main server of the computer security management system can recommend or use tool servers that are closest to an exact match. It is noted that the tool servers can be located anywhere on the Internet.

According to another aspect of the present invention, the computer security management system can display investigation and response steps in a non-procedural manner. For example, the computer security management system can display all available information and response steps as icons on a display screen. The icons could be displayed without grouping them according to a procedure category, such as investigation procedure or response procedure. Alternatively, the icons could be grouped according to category. The computer security management system can suggest or indicate the next or most appropriate step to execute after a first step is executed. For example, when a first step is executed, the computer security management system could flash the icon of a step that is the more appropriate step to take as the second step The computer security management system could also display warnings or cautions, as discussed above, in response to mouse-over activity upon an icon.

For another aspect of the present invention, the computer security management system can be stored in a distributed computer network. In other words, for this aspect of the present invention, the execution of steps of a procedure can be completed in an online environment where a graphical user interface (GUI) security client interacts with a server connected to a distributed computer network, such as the Internet. The server can contain the tools or steps to be executed or the server can be connected to a tool server that provides the tools or steps of procedures.

BRIEF DESCRIPTION OF THE DRAWINGS

FIG. 6 is an exemplary display screen of a software program for displaying search results for a search query conducted within a database of security incidents.

FIG. 10 is an exemplary display screen of a software program for modifying security incident header information.

FIG. 15 is an exemplary display screen of a software program for creating a new tool that can be invoked by a step in a procedure or that can be invoked manually.

FIG. 20 is an exemplary display screen of a software program for displaying cautions or warnings prior to the execution of a step of a procedure.

FIG. 21A is an exemplary table listing strategic locations of computers relative to ranges of locations for potential computer incident sources.

FIG. 26 is a logic flow diagram illustrating an exemplary subprocess of FIG. 22 for performing a search of previously recorded security incidents.

FIG. 27 is a logic flow diagram illustrating an exemplary subprocess of FIG. 22 for adding or deleting a tool or step.

DETAILED DESCRIPTION OF EXEMPLARY EMBODIMENTS

Figure 1:
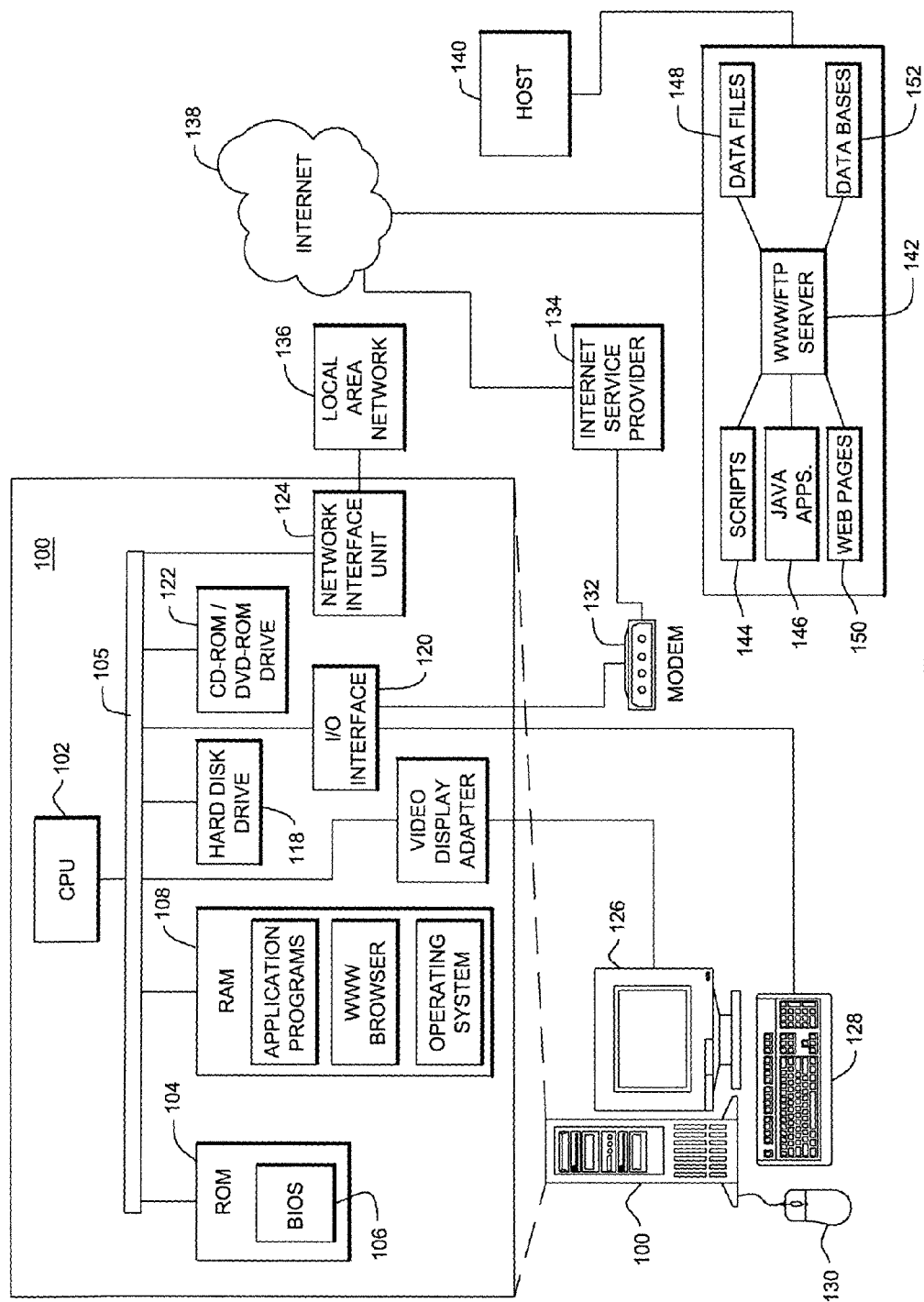
FIG. 1 is a block diagram of a network personal computer that provides the exemplary operating environment for the present invention.

The present invention may be embodied in program modules that run in a distributed computing environment. In an illustrative embodiment, the present invention is embodied in program module running on a personal computer as a client that accesses a server program module. Both program modules form a system for logging, investigating, responding, and tracking computer security incidents that can occur in a networked computer system.

Illustrative Operating Environment

Although the illustrative embodiment will be generally described in the context of an program modules running on a personal computer and a server, those skilled in the art will recognize that the present invention may be implemented in conjunction with operating system programs or with other types of program modules for other types of computers. Furthermore, those skilled in the art will recognize that the present invention may be implemented in either a stand-alone or in a distributed computing environment or both. In a distributed computing environment, program modules may be physically located in different local and remote memory storage devices. Execution of the program modules may occur locally in a stand-alone manner or remotely in a client server manner. Examples of such distributed computing environments include local area networks and the Internet.

The detailed description that follows is represented largely in terms of processes and symbolic representations of operations by conventional computer components, including a processing unit (a processor), memory storage devices, connected display devices, and input devices. Furthermore, these processes and operations may utilize conventional computer components in a heterogeneous distributed computing environment, including remote file servers, computer servers, and memory storage devices. Each of these conventional distributed computing components is accessible by the processor via a communication network.

The processes and operations performed by the computer include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein are machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read-only memory.

Referring now to the drawings, in which like numerals represent like elements throughout the several figures, aspects of the present invention and the illustrative operating environment will be described.

FIG. 1 and the following discussion are intended to provide a brief, general description of a suitable computing environment in which the invention may be implemented. Referring now to FIG. 1, an illustrative environment for implementing the invention includes a conventional personal computer 100, including a processing unit 102, such as a CPU, a system memory, otherwise referred to as computer-readable memory, including read only memory (ROM) 104 and random access memory (RAM) 108, and a system bus 105 that couples the system memory to the processing unit 102. The read only memory (ROM) 104 includes a basic input/output system 106 (BIOS), containing the basic routines that help to transfer information between elements within the personal computer 100, such as during start-up. The personal computer 100 further includes a hard disk drive 118 and an optical disk drive 122, e.g., for reading a CD-ROM disk or DVD disk, or to read from or write to other optical media. The drives and their associated computer-readable media, otherwise referred to as computer-readable, tangible storage devices, provide nonvolatile storage for the personal computer 100. Although the description of computer-readable media above refers to a hard disk, a removable magnetic disk and a CD-ROM or DVD-ROM disk, it should be appreciated by those skilled in the art that other types of media and tangible storage devices are readable by a computer, such as magnetic cassettes, flash memory cards, digital video disks, Bernoulli cartridges, and the like, may also be used in the illustrative operating environment.

A number of program modules may be stored in the drives and RAM 108, including an operating system 114 and one or more application programs 110, such as a program for browsing the world-wide-web, such as a WWW browser 112. Such program modules may be stored on hard disk drive 118 and loaded into RAM 108 either partially or fully for execution. The program modules can include program instructions stored on a computer-readable, tangible storage device (e.g., CD-ROM disk, DVD disk, etc.) for execution by the processing unit 102 (e.g., CPU) via computer-readable memory, such as RAM 108.

A user may enter commands and information into the personal computer 100 through a keyboard 128 and pointing device, such as a mouse 130. Other control input devices (not shown) may include a microphone, joystick, game pad, satellite dish, scanner, or the like. These and other input devices are often connected to the processing unit 100 through an input/output interface 120 that is coupled to the system bus, but may be connected by other interfaces, such as a game port, universal serial bus, or firewire port. A display monitor 126 or other type of display device is also connected to the system bus 105 via an interface, such as a video display adapter 116. In addition to the monitor, personal computers typically include other peripheral output devices (not shown), such as speakers or printers. The personal computer 100 may be capable of displaying a graphical user interface on monitor 126.

The personal computer 100 may operate in a networked environment using logical connections to one or more remote computers, such as a host computer 140. The host computer 140 may be a server, a router, a peer device or other common network node, and typically includes many or all of the elements described relative to the personal computer 100. The LAN 136 may be further connected to an internet service provider 134 ("ISP") for access to the Internet 138. In this manner, WWW browser 112 may connect to host computer 140 through LAN 136, ISP 134, and the Internet 138. Such networking environments are commonplace in offices, enterprise-wide computer networks, intranets and the Internet.

When used in a LAN networking environment, the personal computer 100 is connected to the LAN 136 through a network interface unit 124. When used in a WAN networking environment, the personal computer 100 typically includes a modem 132 or other means for establishing communications through the internet service provider 134 to the Internet. The modem 132, which may be internal or external, is connected to the system bus 105 via the input/output interface 120. It will be appreciated that the network connections shown are illustrative and other means of establishing a communications link between the computers may be used.

The operating system 114 generally controls the operation of the previously discussed personal computer 100, including input/output operations. In the illustrative operating environment, the invention is used in conjunction with Microsoft Corporation's "Windows NT" operating system and a WWW browser 112, such as Microsoft Corporation's Internet Explorer or Netscape Corporation's Navigator, operating under this operating system. However, it should be understood that the invention can be implemented for use in other operating systems, such as Microsoft Corporation's "WINDOWS 3.1," "WINDOWS 95", "WINDOWS 98" and "WINDOWS 2000" operating systems, IBM Corporation's "OS/2" and "AIX" operating system, SunSoft's "SOLARIS" operating system used in workstations manufactured by Sun Microsystems, and the operating systems used in "MACINTOSH" computers manufactured by Apple Computer, Inc. Likewise, the invention may be implemented for use with other WWW browsers known to those skilled in the art.

Host computer 140 is also connected to the Internet 138, and may contain components similar to those contained in personal computer 100 described above. Additionally, host computer 140 may execute an application program for receiving requests for WWW pages, and for serving such pages to the requester, such as WWW server 142. According to an embodiment of the present invention, WWW server 142 may receive requests for WWW pages 150 or other documents from WWW browser 112. In response to these requests, WWW server 142 may transmit WWW pages 150 comprising hyper-text markup language ("HTML") or other markup language files, such as eXetnsible Markup Language (XML), to WWW browser 112. Likewise, WWW server 142 may also transmit requested data files 148, such as graphical images or text information, to WWW browser 112. WWW server 142 may also execute scripts 144, such as CGI, PERL, ASP, or JSP (Java Server Pages) scripts, to dynamically produce WWW pages 150 for transmission to WWW browser 112. WWW server 142 may also transmit scripts 144, such as a script written in JavaScript, to WWW browser 112 for execution.

Similarly, WWW server 142 may transmit programs written in the Java programming language, developed by Sun Microsystems, Inc., to WWW browser 112 for execution. The WWW server 142 could comprise a UNIX platform running Apache or Netscape webserver. Alternatively, the WWW server 142 could comprise an Internet Information Server (IIS). The present invention is not limited to these enumerated examples. Other web server environments are not beyond the scope of the present invention.

As will be described in more detail below, aspects of the present invention may be embodied in application programs executed by host computer 142, such as scripts 144, or may be embodied in application programs executed by computer 100, such as Java applications 146. Those skilled in the art will also appreciate that aspects of the invention may also be embodied in a stand-alone application program.

Figure 2:
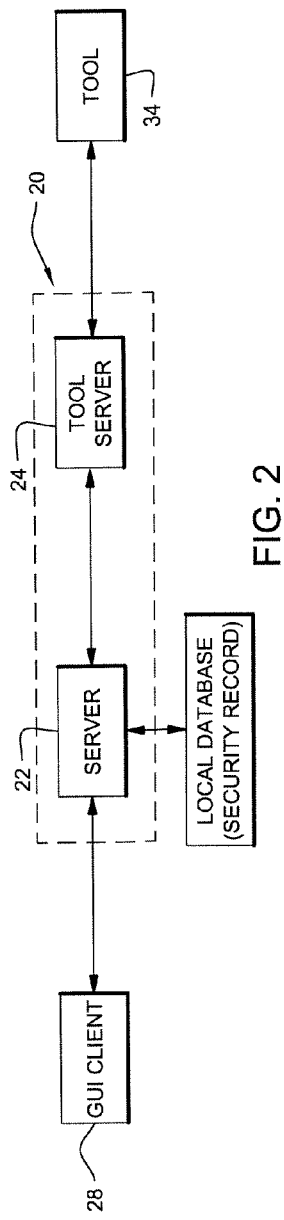
FIG. 2 is a functional block diagram illustrating exemplary network architecture for the present invention.

Referring now to FIG. 2, the computer architecture for one exemplary embodiment of the present invention will be described. FIG. 2 illustrates a System 20 for automatically creating a record for one or more security incidents and reactions thereto. This security management system 20 can include a main server 22 that is linked to a tool server 24, a local data base 26, and a graphical user interface (GUI) Client 28. The main server 22 and GUI Client 28 can form a client/server architecture that makes use of distributed intelligence to treat both the main server 22 and the GUI Client 28 as intelligent, programmable devices, thus exploiting the full computing power of each device. The GUI Client 28 can be a complete, stand alone personal computer which offers the user a full range of power and features for running program modules. The main server 22 can be a personal computer, a mini computer, or mainframe that provides the traditional strengths offered by mini computers and mainframes in a time-sharing environment. The main server 22 and GUI Client 28 can comprise the exemplary hardware and software discussed above with respect to FIG. 1. Further, it is possible to combine all program modules discussed above and run them on a single computer hardware platform.

The main server 22 can communicate with GUI Clients 28 using HTTP, however, other communication protocols may be used (e.g., CORBA, RMI). The tool server 24 can also be a personal computer, a mini computer, or mainframe that provides access to tools or program modules 34 that can be used to gather information or make changes to a security configuration of network computers or a network infrastructure. Alternatively, as indicated by the dotted line 32, the tool server 24 and main server 22 can be a single machine or computer that provides client services in addition to access to tools 34. It is also possible for some tools to be implemented directly on the main server 22 for convenience as opposed executing separate application programs. That is, the functionality of off-the-shelf program modules, such as nmap, traceroute, and other like modules, can be incorporated into a single module running on a single main server 22. A tool server 24 may be referred to as a sensor (as discussed below with respect to FIG. 3) for observing a computer incident source. But a tool server may also perform functions other than those of a sensor, such as configuration changes.

The tools 34 accessed by tool server 24 can comprise program modules that can be used to gather information or make changes to a security configuration of network computers or a network infrastructure. Tools 34 may also comprise off-the-shelf program modules. For example, the step "traceroute" discussed later is an off-the-shelf program. Other off-the-shelf programs include, but are not limited to, a program module entitled "NMAP", a program module entitled "PING", and other like program modules.

In one exemplary embodiment, a tool 34 could be split into a local module 30 and a remote module 32. For example, the local module 30 could run on the tool server 24 while the remote module 32 could run on a user workstation 380 (discussed below) that may contain the GUI client 28. The location of the remote module 32 is not limited to a user workstation 380. Other potential locations include, but are not limited to, FTP servers, WWW servers, database servers, name servers, file servers, and other like computers. For the user workstation 380 example, a function of the remote module 32 could be to check the file system integrity of a user workstation 380. The remote module 32 could check for changes in permissions or whether files of a user workstation 380 have been improperly modified. The present invention is not limited to this type of file system integrity information. Other information that can be collected by the remote module 32 includes, but is not limited to, the status of processes currently running on the user workstation 380, configuration changes, the status of current configurations, the contents of log files, and other similar information.

If a user workstation 380 was subject to a computer security incident such as an attack, the local tool module 30 could query the remote module 32 disposed within the user workstation 380 to determine the file system integrity of the user workstation 380. The functionality and operability of the remote module 32 and local module 30 are not limited to this example. Other functions and operations of such a remote/local tool combination are not beyond the scope of the present invention.

Because of the client-server architecture of the security management system 20, workflow between groups of users within a single organization or multiple organizations is enhanced. In other words, since the security management system 20 stores the intermediate results of a user's work in progress, partially completed investigations or responses to computer security incidents can be handed off to another user. This allows organizations to implement workflow, where part of the work, such as investigation for a computer security incident can be completed by one group of users while a different part such as a response to a computer security incident can be completed by another group of users.

Similar to the tool server 24, the local data base 26 is connected to the main server 22. The local data base 26 can be a server that includes its own data base composed of records. Each record can contain fields together with a set of operations for searching, sorting, recombining, and other functions. Typically, the local data base 26 houses or stores the security record produced by the security management system 20. The security record contains raw data that is received from the GUI Client 28 in data streams that are tagged with a digital signature. The digital signature can be based upon the United States government standard digital signature algorithm (DSA), as specified by the National Institute of Standards and Technology, in Federal Information Processing Standard (FIPS) 186. The digital signature can be extra data, such as a cryptographic checksum, appended to a message which identifies and authenticates the sender and message data using public-key encryption. The present invention is not limited to the government standard DSA and can include any other like encryption or security technology that insures authenticity of data.

The security record should be permanent or unmodifiable so that its contents can be admitted as forensic evidence in a court of law. The contents of the security record can be copied to another medium so that the copy on the other medium can be manipulated or processed to make the contents derived from the permanent security record more easy to understand. The structure of the local data base 26 can be modified. For example, if dual computer records are necessary to provide corroboration, then the local data base 26 can be structured such that redundant computer records can be maintained.

Figure 3:
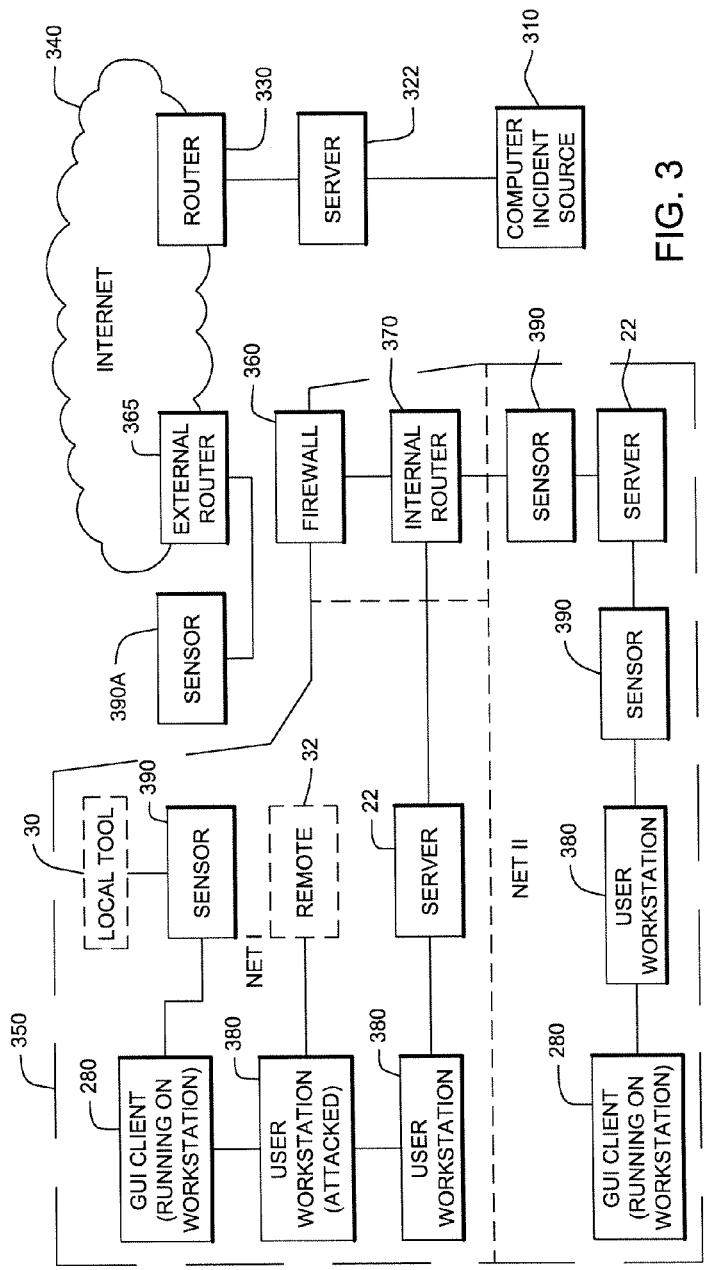
FIG. 3 is a functional block diagram illustrating potential strategically located tool servers or security computers relative to a computer incident source.

Referring now to FIG. 3, a functional block diagram of strategically located GUI clients 280 and sensors or tool servers 390 relative to a computer incident source 310 are illustrated. Sensors or tool servers 390 can be computers that run requests (usually steps of a procedure) originating from GUI clients 280 via main severs 22 to perform steps or execute tools of a procedure. GUI Clients 280 can be the client software or program modules of the present invention that run on user workstation hardware. GUI Clients 280 can access the servers 22 which in turn, access the tools 34 on one or more tool servers 24 (also referred to as sensors 390 in FIG. 3). The computer incident source 310 can be a computer or network of computers that originate malware or an attack against a network 350.

The computer incident source 310 can be connected to a server 322 of a local area network. Alternatively, instead of a server 322, the computer incident source 310 can be connected to a dial-in Internet service provider (ISP) or any computer connected to the Internet. The server 322 or ISP (or the computer connected to the Internet) can then be connected to a router 330. The router 330 provides access to a distributed computer network such as the Internet 340. While the computer incident source 310 can be located outside of the network 350, it is possible for the computer incident source 310 to be located within the network 350. That is, a computer incident source 310 could be a user work station 380 located within the network 350. For example, in the case of a disgruntled employee within a company, a user work station 380 could be used as a computer incident source 310 when the employee decides to interfere or hamper the operations of the network 350 or one or more other workstations 380 within the network 350.

Through the Internet 340, the computer incident source 310 may try to access the network 350 that may be part of a company, an Internet service provider (ISP), an educational facility, or another private entity, or any other similar type network. The network 350 is connected to the Internet 340 by and external router 365 and by a firewall 360. The firewall 360 can comprise a bastion host or similar device. The firewall 360 can also be connected to an interior router 370 that may examine all packets of data traveling to and from the internal screening router 370. The user workstations 380 can be stand alone personal computers that access servers 22. Since the security management system 20 can be implemented with a client/server architecture, it is possible for user workstations 380 to become GUI clients 280 when a user workstation 380 has the appropriate client software and access keys to interact with the tool server 24 and local data base 26.

The user workstations 380, GUI clients 280, sensors 390, and servers 22 form a large network 350. The large network 350 may comprise one or more sub-networks, such as sub-network NET I and sub-network NET II.

Sub-network NET I may have different security protocols relative to sub-network NET II. For example, user workstations 380, GUI clients 280, and sensors 390 in the sub-network NET I may not be granted access to certain Internet sites and may not be able to perform certain functions that are considered obnoxious or intrusive computer behavior. On the other hand user workstations 380, GUI clients 280, and sensors 390 within sub-network NET II may have unlimited access to Internet sites as well as the capability to perform all functions, including those functions considered to be obnoxious or intrusive computer behavior. More specifically, the GUI clients 280, user workstations 380, and sensors 390 within sub-network NET I may be restricted from using packet Internet gropers (PINGs) while user workstations 380, GUI clients 280, and sensors 390 within sub-network NET II may be able to send PING request packets to any computer outside of the large network 350.

In light of the restrictions of the computers within sub-network NET I relative to the computers within sub-network NET II, it is apparent that the computers and sensors 390 within the sub-network NET II may offer significant and strategic advantages over the computers within sub-network NET I. The security management system 20 can locate an appropriate computer or sensor within either sub-network NET I or sub-network NET II to execute steps of a procedure by accessing a table containing predetermined data as will be discussed in further detail below with respect to FIG. 21. Although not illustrated, tool servers or sensors 390 can be located outside of the sub-networks and large network 350 and beyond sensor 390A and external router 365. That is, the tool servers or sensors 390 can be located anywhere on the Internet outside of the large network 350 and beyond external router 365, as long as the tool server 390 is connected to the Internet 340. For example, a tool server or sensor 390 could exist on the other side of external router 365, opposite large network 350.

To execute certain steps and response procedures that may include activity or behavior that is restricted in a computer network, such as found in sub-network NET I, it may be necessary to find a computer or sensor 390A located close to the perimeter or outer regions of a network to perform the restricted activities or behavior. In search and investigation or response scenarios, it may be also necessary to identify GUI clients 280 or sensors 390 that are not easily detected by the computer incident source 310. Sensors 390A outside of the large network 350 may have strategic advantages over other computers disposed within the large network 350. The security management system 20 is designed to identify or suggest the appropriate computer to perform a step in a procedure based upon tabulated data which will be discussed in further detail with respect to FIG. 21. In other words, certain GUI clients 280 or sensors 390 may be able to track activity of a computer incident source 310 without the computer incident source 310 sensing the tracking activity of a GUI client 280 or sensor 390.

In another exemplary embodiment (not illustrated), a tool server 390 could be loaded on a user workstation 380. That is, a tool server 390 and tools 34 could be present on a personal computer that can also be used as a workstation 380. Having a tool server 390 and tools 34 on a personal computer that could be a target of a computer security incident can increase the incident investigation and response capabilities of the security management system 20. For example, computer files on a personal computer, such as a user workstation 380, are not generally accessible from other computers within a network 350 or outside a network 350. However, if a tool server 390 was loaded on a user workstation 380, the files of user workstation 380 could be examined by the tool server 390 with its corresponding tools 34. Such a tool server 390 running on a workstation 380 would permit investigation for modified files or modified file permissions or both within the workstation 380. Other information that can be monitored by a tool server 390 running on a workstation 380 includes, but is not limited to, the status of processes currently running on the user workstation 380, the applications currently running on the user workstation 380, the status of users logged onto the network 350, configuration changes, the status of current configurations, the contents of log files (user log files, configuration log files, etc.), any records of system or application changes, and other similar information. Another capability of a tool server 390 in combination with a user workstation 380 is that the tool server 390 could prevent undesirable processes, such as Trojan horses. Generally, stopping Trojan horses remotely across a network can be very difficult. Since the tool server 390 of this exemplary embodiment can be present on the same machine as a Trojan horse, any damage from a Trojan horse can be contained or substantially eliminated.

For this exemplary embodiment, tools 34 can be preloaded on the combination tool server 390/user workstation 380. Alternatively, tools 34 can be installed on the combination tool server 390/workstation 380 when they are needed. When tools 34 are installed as they are needed, this could prevent the tools 34 from being modified by a hacker or program module that obtains access to the combination tool server 390/user workstation 380.

The present invention is not limited to the combination tool server 390/user workstation 380. The tool server 390 can reside at other locations. Other locations include, but are not limited to, FTP servers, WWW servers, database servers, name servers, file servers, and other like locations.

Figure 4A:
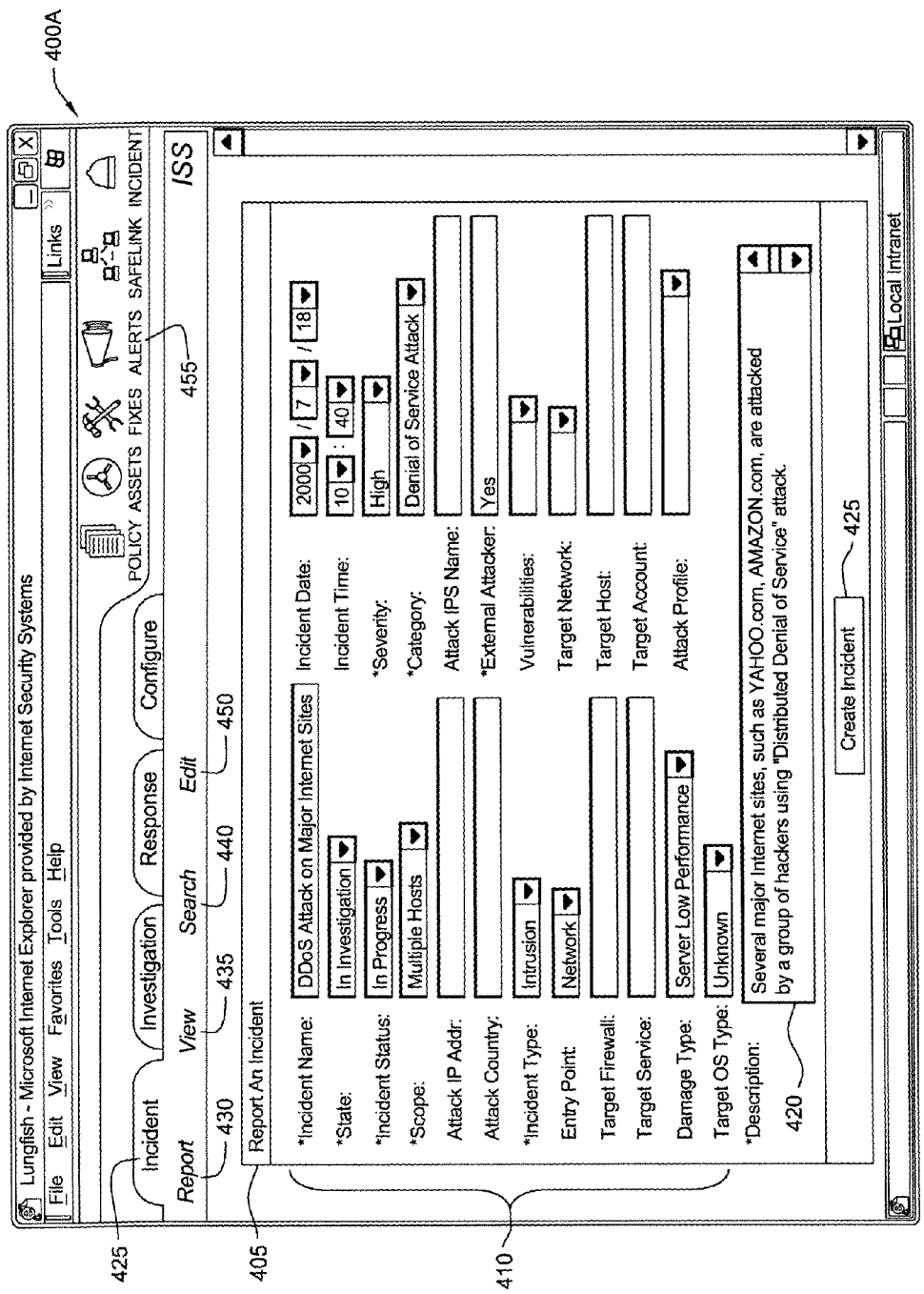
FIG. 4A is an exemplary display screen of a software program for acquiring information about a computer security incident.

Referring now to FIG. 4A, an exemplary display screen 400A can be generated in order to acquire information about a computer security incident. Display screen 400 illustrates a form 405 that can be used to track and identify suspicious computer activity or computer behavior. Display screen 400A can be generated upon the selection of an incident tab 425. Incident tab 425 includes the following commands: a report command 430, a view command 435, a search command 440, and an edit command 450. The view command 435 enables a user to select a particular computer security incident to be displayed on the display screen. The search command 440 activates the search window as will be discussed with respect to FIG. 5. The edit command 450 enables the modification or rearranging of data for a previously entered computer security incident. The security management system 20 can be part of other systems or programs that are capable of detecting and displaying computer security incidents. For example, the security management system can be part of an alert system 455 as illustrated in FIG. 4 (as will be discussed in further detail below).

Form 405 can be generated when the report command 430 is activated. Form 405 may include a plurality of fields 410 that provide summary information of a particular computer security incident. For example, the summary information fields 410 may comprise attributes. Attributes are properties of computer security incidents that can assist in the task of prioritizing or grouping of computer security incidents. Attributes can also assist a computer or a person in selecting an appropriate investigation or response procedure. However, attributes are not limited to these exemplary functions.

Attributes can include, but are not limited to the following: computer incident severity; incident category; incident scope; incident status; attacker internet protocol (IP) address; attacker ISP name; attacker country; external attacker status; incident type; vulnerabilities potentially causing the incident; entry point; attack profile; target networks; target firewalls; target hosts; target services; target accounts; and damage type. Each attribute can have one or more values or can comprise a scale of values. As noted above, attributes can assist in the decision making process of how to handle computer security incidents. Additionally, attributes do not need to be predefined. That is, attributes can be computer generated or variable or both. Attributes can be generated "on-the-fly" when different computer security incident scenarios are detected in order to assist in the selection of the appropriate investigation or response procedure, or both.

Exemplary Predefined Attribute Values

For the computer incident severity attribute, exemplary values could include high, medium, low, unknown, etc. The severity attribute can measure the damage degree caused by the incident or potential damage that might be caused by a computer security incident. The following paragraphs describe possible values of each attribute identified above:

The category attribute can include the following exemplary values: DoS attack, Integrity attack, Confidentiality attack, Relay attack, Unknown, etc. The category attribute can track at least three basic security aspects: availability, integrity, and confidentiality. The category attribute measures which security aspects are compromised as a result of a computer security incident.

The scope attribute can include the following values: Entire Network, Multiple Subnets, Single Subnet, Multiple Hosts, Single Host, Multiple Services, Single Service, Multiple Accounts, Single Account, Unknown, etc. The scope attribute can measure how many systems or services or user accounts are affected by a computer security incident.

The incident status attribute can include the following values: In Progress, Not In Progress, Unknown. The incident status can measure whether the attack is in progress or not.

The attack IP address attribute can include the following values: an <IP Address>, Unknown, etc. The attack IP address attribute can inform the user of the IP address of an intruder's machine. The IP address is usually (and currently) a 32-bit (four byte) binary number that uniquely identifies a host computer connected to the Internet to other Internet hosts, for the purposes of communication through the transfer of data packets. An IP address is expressed in "dotted quad" format consisting of the decimal values of its four bytes, separated with periods; for example, 209.168.1.10.

The attack ISP name attribute can include the following values: <ISP Name>, Unknown, etc. The attack ISP name attribute can identify the intruder's Internet Service Provider's name. For example, an ISP name could be, but not limited to, any one of the following examples: aol.com (for America On Line); mindspring.com; netscape.net; and msn.com (for Microsoft Network), etc.

The attack country attribute can include the following values: <Country>, Unknown, etc. The attack country attribute can list the intruder's country name, such as, but not limited to, United States of America (USA); Japan; England; Germany; and other countries.

The external attacker attribute can include the following values: True, False, Unknown, etc. The external attacker attribute can identify whether the intruder is from internal or external relative to a network.

The incident type attribute can include the following values: Accidental, Misuse, Intrusion, Unknown, etc. This attribute can measure the nature of the incident, such as whether the computer incident is an accidental incident, misuse or intrusion.

The vulnerabilities attribute can include the following values: <Security Check1>, <Security Check2>, Unknown, etc. The vulnerabilities attribute can measures which security holes or problems in a network caused or contributed to the incident. A security check value is an index to a table of types of attacks and vulnerabilities. Security check data can identify the type of attack or computer incident or vulnerability.

The entry point can include the following values: Network, Modem, Terminal, Unknown, etc. The entry point can determine the approximate location of where a hacker gained access to a network or user workstation.

The attack profile attribute can include the following values: <Known Attacking Signature>, Unknown, etc. This attribute can determine if a computer attack matches a known signature.

The target network attribute can include the following values: <network_address>, BLANK, etc. The target network attribute can identify the IP addressees of which networks or sub-networks are attacked.

The target firewalls attribute can include the following values: <firewall_address>, BLANK, etc. The target firewalls attribute can identify the IP addresses of which firewalls are attacked within a network.

The target hosts attribute can include the following values: <host_ip_address>, BLANK, etc. This attribute can identify the IP addresses of which hosts are attacked.

The target services attribute can include the following values: <service_name>, BLANK, etc. This target services attribute can identify which network services (such as WWW service) are attacked.

The target accounts attribute can include the following values: <account_name>, BLANK, etc. The target networks can identify which user accounts are attacked.

The damage type attribute can include the following values: Network down, Server down, Service down, File lost, Account compromised, Unknown, etc. This attribute can measure the damage type caused by a computer security incident.

Figure 4B:
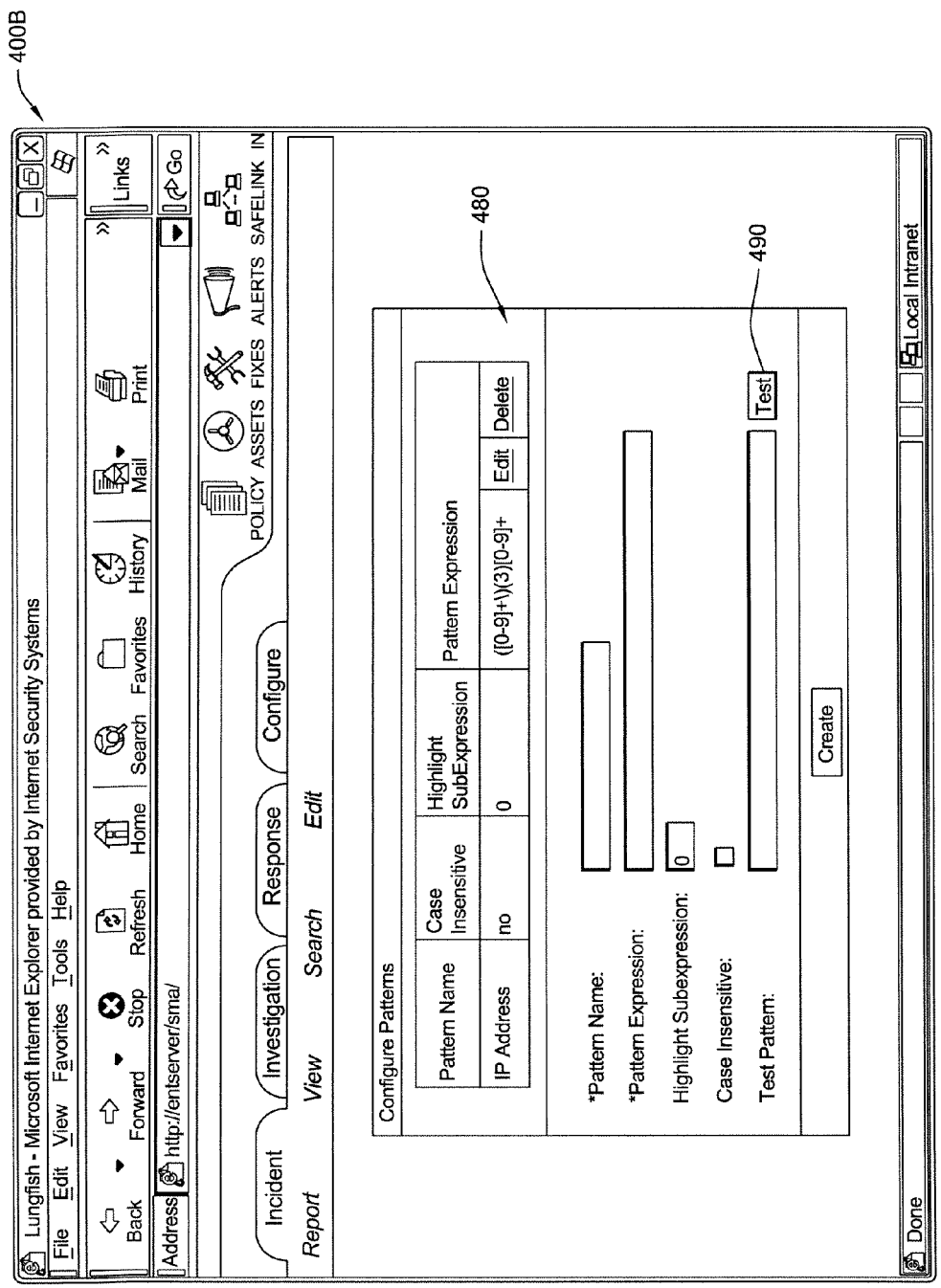
FIG. 4B is an exemplary display screen of a software program for defining and editing patterns that determine attributes.

Referring now to FIG. 4B, an exemplary display screen 400B of a software program for defining and editing patterns that provide resultant attribute values. More specifically, patterns can extract data output from a tool server 24 to generate the attribute values discussed above. A configure pattern block 480 can acquire information about a new or existing pattern that forms a specific attribute value. Such information can include, but is not limited to, the following parameters: pattern name; pattern expression; highlight subexpression; case insensitive, and test pattern.

The pattern name parameter can provide for a name that can used to identify a pattern so that the pattern may be used from multiple steps in a procedure. The pattern expression parameter can permit manual entry of a mathematical or logical expression that defines a pattern. The highlight subexpression parameter can identify a number of sub-expressions that are numbered, starting from zero. The subexpression parameter can determine which one of the sub-expressions is selected as the value. The case insensitive parameter can designate whether upper case and lower case letters should be considered equal while matching. The test pattern parameter can also be the mathematical or logical expression that was entered into the pattern expression parameter or field. The present invention is not limited to the parameters shown. Other pattern parameters are not beyond the scope of the present invention.

The test button 490 enables experimentation of test pattern entered into the configure pattern block 480. Upon activation of the test button 490, output of the pattern matching can be displayed to the user. This feature can be helpful in debugging patterns that provide attribute values. On unique feature of the invention is that pattern matching permits the extraction of information from the output of tools so that security incident investigations and responses can be conducted.

Referring back to FIG. 4A, in the exemplary embodiment, fields 410 can include the following computer incident information: an incident name, an incident date and time, the user ID of the GUI client 280, the user phone number, the user e-mail address, the department of the user; a status field of the computer security incidents, a computer security incident severity scale, a scope field, a status of the computer security incident field, a category field, an attack or origin field, an entry point field, a target field that identifies targets that are the focal point of a computer attack, a vulnerability exploited field, and a computer security incident type field.

The form 405 may further include a detailed description field 420 in which a security computer user enters or formulates a detailed description of a computer security incident. The security management system 20 is not limited to the fields 410, 420 illustrated in FIG. 4. Fewer or more fields can be employed to provide additional or a reduced amount of information about the computer security incident. Upon completion of a form 405, a save data button 425 can be activated in order to store the information contained within the form 405 within the local data base 26 that contains the security record. While the form 405 can be accessed at any time and data within the fields 410, 420 can be modified or deleted, the local data base 26 will still maintain or save previous iterations or versions of the form 405. In other words, the local data base 26 will save the original version of every form 405 that is saved in order to increase a security record's admissibility in a court of law as a detailed chronological and permanent file of the actions taken by security computer personnel.

While a security computer or security management system user may key-in the data for the fields 410, 420 of form 405, the security management system 20 can share information with different software modules outside of the security management system 20. That is, other software modules outside of the security management system 20, such as alert system 455, can pre-populate the data fields in form 405. The security management system 20 can operate in an environment with other security program modules. Other program modules can be capable of detecting and displaying suspicious computer activity.

When other program modules outside the security management system 20, such as alert system 455, detect such suspicious computer activity, these program modules can request a security management user to create a record of the incident with the form 405. The outside program modules can fill in those fields of the form 405 for the information that the outside program modules detect and display to the user. The user may then complete the remaining fields of the form 405 if the remaining fields are blank or empty or if additional information fields are needed. The security management system 20 can then save this information for its own processing or it can forward the information to another program module.

That is, in one exemplary embodiment, the security management system 20 can operate as the link or "glue" between two or more separate program modules that operate independently of the security management system 20. The security management system 20 can receive data from one program module, such as an alert system 455, generate new data about a computer security incident, and then forward the new data or old data or both to another program module, such as a trouble ticket system (not shown). The trouble ticket system (not shown) could then generate reports on computer security incidents that require action from a user. The aforementioned program modules that could be linked together via the security management system 20 should be considered illustrative rather than exhaustive. In other words, the number and types of program modules that can be linked to the security management system is not limited to those shown or discussed in this description.

Figure 5:
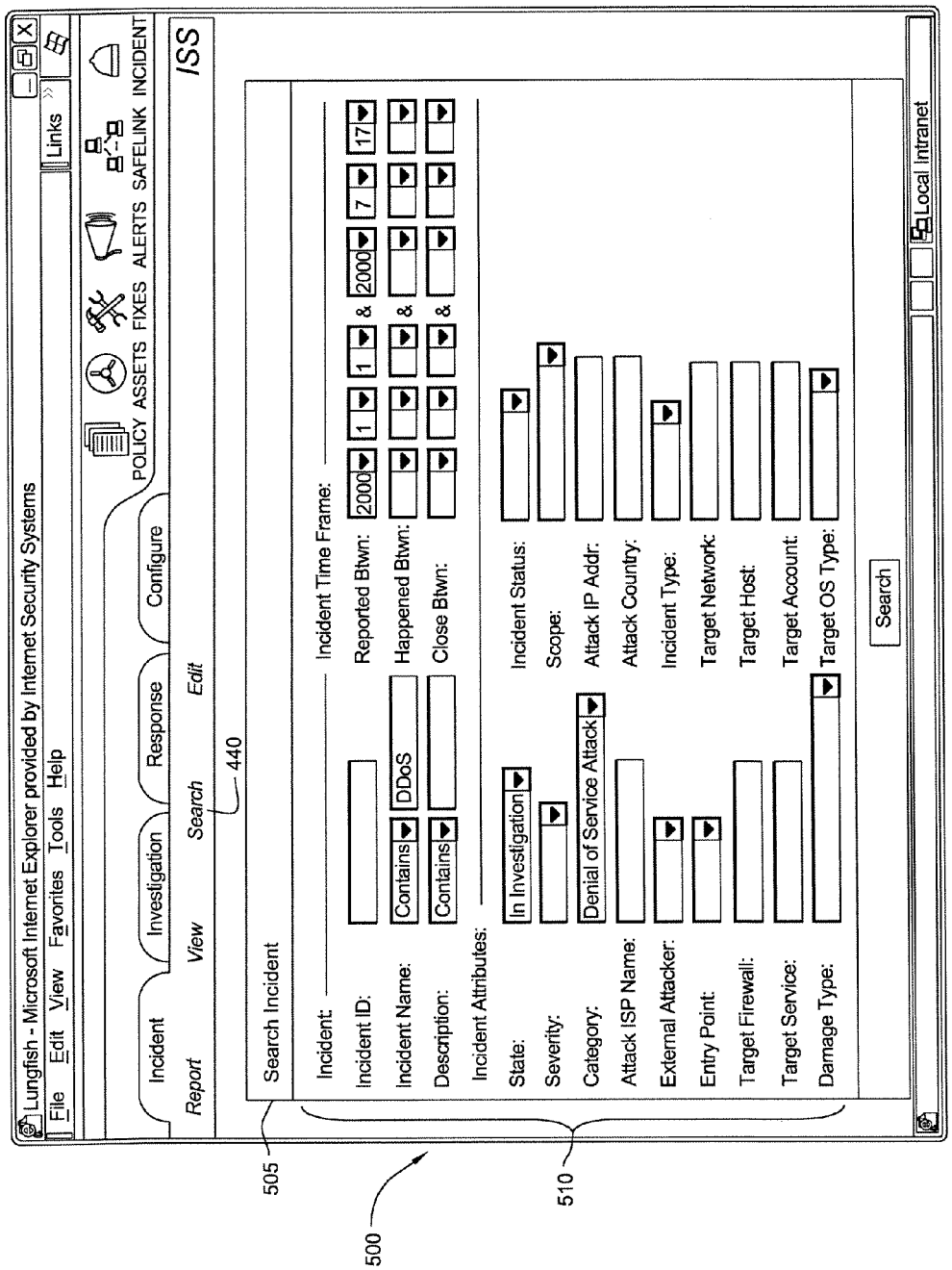
FIG. 5 is an exemplary display screen of a software program for acquiring information about an existing computer security incident in order to conduct a search within a database of security incidents.

FIG. 5 illustrates an exemplary display screen 500 that can be generated in order to conduct a search within the data base 26. This display screen 500 can include one or more fields 510 that could be used to acquire information, such as attributes, about a particular or group of computer security incidents. The data fields 510 of display screen 500 can include any one of the following fields: an incident ID field, an incident name field, an incident status field, a severity field, a scope field, a status of attack field, a category field, specific date criteria fields, or any attribute of a computer security incident.

The search fields 510 of the search criteria block 505 usually match or are parallel to the data fields 410, 420 of the form 405 illustrated in FIG. 4. The search criteria block 505 can be used by a security management system user that desires an organized display of computer security incidents that are either being tracked or have been tracked by the security management system 20. The number and type of search fields 510 are not limited to those illustrated in FIG. 5 and can include fewer or more search fields in order to facilitate rapid searching of computer security incidents within the local data base 26.

Referring now to FIG. 6, an exemplary display screen 600 can be generated in response to a computer security incident search conducted within the security management system 20. Specifically, display screen 600 can include a search results block or window 605 that may list a plurality of computer security incidents that are being tracked or have been tracked by the security management system 20. The listing of the computer security incidents can be sorted or organized in any fashion. That is, the result of a computer security incident search can be organized or sorted according to the ID number of a computer security incident, the status of a computer security incident, the incident name of a computer security incident, the incident date of a computer security incident, the report date of a computer security incident, or any attribute of a computer security incident. The present invention is not limited to the organization based upon the fields illustrated in FIG. 6 and can include more or less fields depending upon a particular application of the security management system 20. Additionally, any one of the fields listed for a computer security incident that has been uncovered during a computer security incident search can be a hyperlink to another portion or functionality of the computer security management system 20.

For example, a user could click on the incident name field 610 of an uncovered computer security incident in order to view all of the current data for that particular computer security incident. A user could also click on the incident ID field 615 in order to activate or generate the form 405 of FIG. 4 such that data of the form 405 as illustrated in FIG. 4 could be modified or deleted. The computer security incidents uncovered during a computer security incident search can be organized according to the respective columns of fields being displayed for the results of the search. That is, by clicking upon a particular column identification name, the results of the computer security incident search can be organized according to the column name field that has been activated. For example, if a user desires to see the search results of a computer security incident search to be organized according to a computer security incident identification number, then the user would click upon the "ID" name field 620 in order to organize the uncovered computer security incidents according to their identification number.

Figure 7:
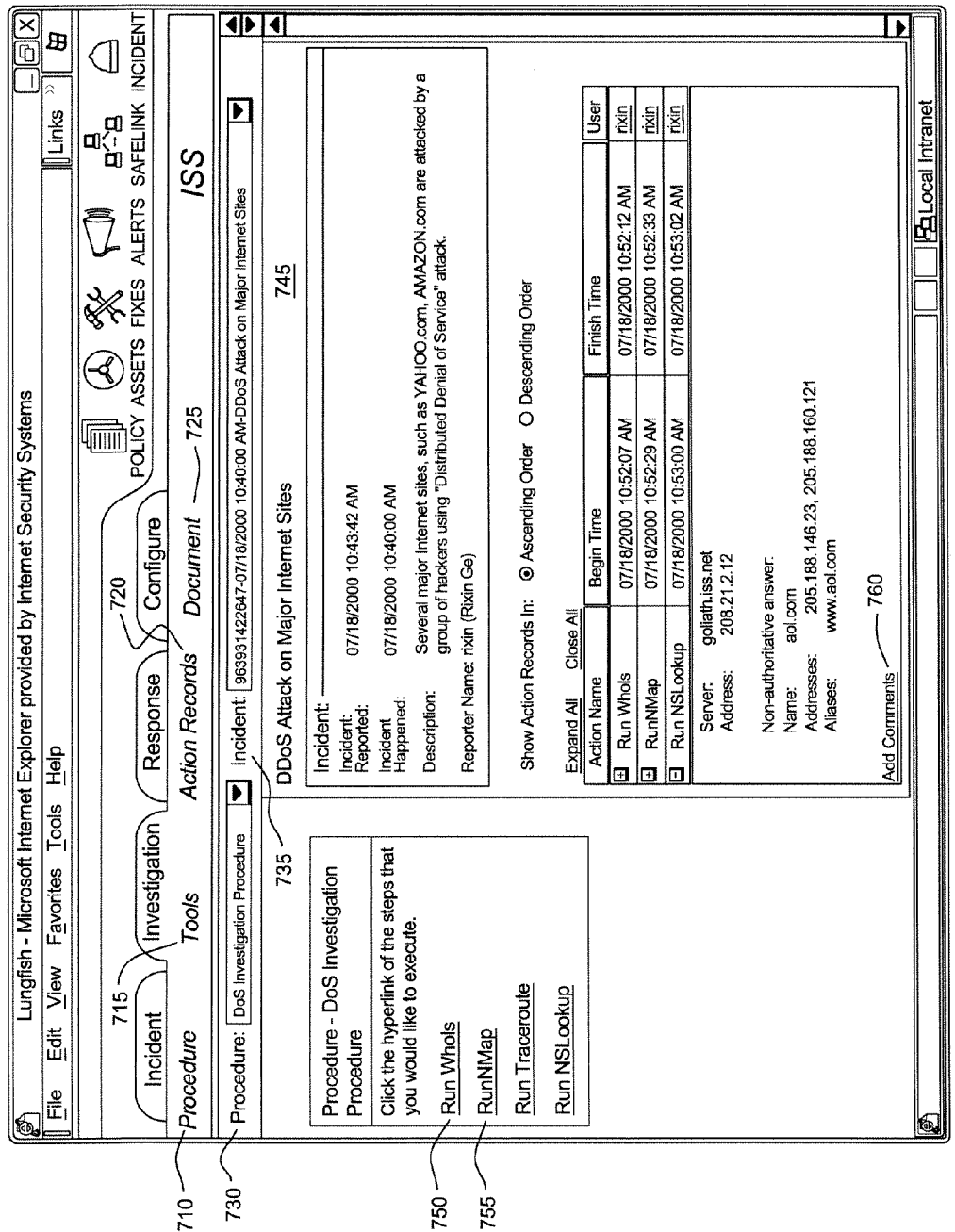
FIG. 7 is an exemplary display screen of a software program for displaying results of an executed step in an investigation procedure and for listing steps of a particular investigation procedure that can be selected for execution.

FIG. 7 illustrates an exemplary display screen 700 when the investigation tab 705 is selected or activated. The investigation tab 705 further includes the following commands: procedure 710, tools 715, action records 720 and document 725. The procedure command 710 permits access to a window which will display all of the investigation procedures for the security management system 20. The tool command 715 permits access to a list of tools that can be activated manually in a random fashion. The manual operation of tools will be discussed in a detailed fashion with respect to FIG. 18. The action records command 720 can provide a list of investigation procedures that have already been implemented for computer security incidents that were detected. The document command 725 initiates a display that permits a user to enter data manually with respect to a computer security incident as will be discussed with respect to FIG. 8.

A procedure drop-down list 730 and an incident drop-down list 735 will be displayed upon selection or activation of the investigation tab 705. The procedure drop-down list 730 permits selection of one or more computer security incident investigation procedures that are part of the present invention. The incident drop-down list 735 permits the selection of one or more computer security incidents that are being investigated with the security management system 20. Upon selecting a particular investigation procedure from the procedure drop-down list 730, the actual steps of the selected investigation procedure will be displayed in frame 740. Upon selection of a particular computer security incident from the computer incident drop-down list 735, an action record showing a summary of the incident as well as what actions have been taken will be displayed in frame 745.

While frame 740 lists the steps or tools of an investigation procedure, the actual steps or tools listed may also be hyperlinks that execute program modules upon their activation. For example, in step one, a tool 750 is labeled as "Run WhoIs". The tool 750 is a separate program module that is designed to collect information from a database off of the Internet. Each tool or step listed in an investigation procedure can be a separate program module, such as, off-the-shelf software, that is designed to collect any kind of information about a computer security incident. Step or Tool functions or both can include, but are not limited to, gathering information either from the target of an attack or the source of an attack; modifying a networked environment (such as creating changes such as permanently blocking IP at a firewall or killing a connection); creating requests to modify a networked environment (such as creating a change order request to permanently block an IP at a firewall); modifying the state of an incident (such as marking an incident as closed); retrieving stored information (such as collecting archived information from a database); notifying users of a network with information (such as sending a web page, e-mail, or telephone message about an incident); coordinating workflow (such as sending information about an incident to some other system outside the security management system 20 for subsequent handling or processing, or directing the incident to another user within an incident response system contained within the security management system 20); changing the value of an attribute being tracked; finding information about the computer incident source; and other like functions.

The security management system 20 is designed to be flexible so that new steps or tools can be added readily to both investigation and response procedures. Therefore, the present invention is not limited to the steps or tools illustrated nor is the present invention limited to the categories of procedures shown in the drawings. Other tools that may comprise off-the-shelf program modules include the second step 755, listed as "RunNMap", a program module entitled "Traceroute", a program entitled "NS Lookup", and other like program modules. Further, the present invention is not limited to the graphical user interface (GUI) devices of hyperlinks to activate steps of procedures. Other GUI devices include, but are not limited to, graphical elements such as "buttons", drop down menus, icons, and other like GUI devices.

As noted above, frame 745 lists a summary of a computer security incident that is being analyzed in addition to all of the actions or activity taken by security personnel. These actions taken by security personnel are referred to as action records. The action records can be organized in any fashion such as according to chronology. In frame 745 of FIG. 7, for example, the action records may be organized in an ascending order or descending order based upon the date of the action taken. Within each of the action records themselves, there may be hyperlinks such as hyperlink 760 that activates a window which permits the updating of a record of a computer security incident.

As noted above, frame 745 can display summary information of a computer security incident as well as detailed action records. Basically, the information displayed within frame 745 is an extraction of the unmodifiable raw data that is stored within the local data base 26 as illustrated in FIG. 2. In other words, the information displayed in 745 is a copy of parts of the raw data or permanent security record stored in the local data base 26. The information displayed within frame 745 can be modified, however, the actual raw data stored within the permanent record of the local data base 26 cannot be manipulated, changed, deleted or affected in any way by a user of the security management system 20. Thus, the present invention is designed to maintain a high degree of integrity for the permanent security record that tracks and saves all data made by the security management system 20 including dates and times thereof in reaction to any suspicious or actual computer security incidents.

The procedures of the security management system 20, such as the investigation procedure displayed in frame 740, are designed such that the steps or tools of a procedure provide a systematic approach for reacting to various computer security incidents so that the procedures can be repeated consistently and by different security personnel. After each step or tool of a procedure is executed, the security management system 20 records the name of the step taken, the results produced by the step, and a corresponding date or time stamp or both within the security record of the local data base 26 (See FIG. 2). In addition to the aforementioned information that can be recorded, the security management system can also record the name of the security personnel who initiated the particular step that is being recorded.

Further, other information may be stored after each step. Other information can include, but is not limited to, any of the information fields or attributes that are tracked relative to a computer security incident, such as the fields enumerated in form 405 of FIG. 4. After executing each step or tool of a procedure, the security management system 20 can also display the results of each step to the security personnel so that a visual record is available.

The procedures of the security management system 20 are set-up according to discrete steps that require security personnel or users to activate each step so that the security personnel or user of the security management system 20 can assess whether it is appropriate to take the next step of a particular procedure. For example, when tracking computer security incidents, it is possible that the computer incident source may detect the gathering or collecting of information by the security management system 20. Certain steps may generate computer activity that could be detected by the computer incident source. By breaking up procedures into a finite number of tasks that are not automatically executed, the user or security personnel using the security management system 20 can assess whether a certain step may be detected by the computer incident source.

Furthermore, certain steps or tools of the procedures of the present invention could be restricted by certain networks since they could significantly affect the flow of information that originates from or is received by a computer network. For example, a step or tool called "kill connection" could interrupt information between a source computer and a destination computer. The "killing the connection" information from a particular Internet protocol address could significantly impact the workflow of innocent users on a network. For example, the plurality of users within a corporate network may require access to a database outside of a company. If a connection to the outside database is interrupted because it is suspected that a computer incident source may be part of such a database, then information or workflow originating from the corporate users or from the outside database connected to the corporate network may be negatively impacted. Moreover, if a step or tool called "block at firewall" is activated, then information or workflow originating from the corporate users or from the outside database connected to the corporate network could be permanently interrupted and thus eliminate each user's access to the outside database.

In such a scenario, the users may not be able to conduct normal business transactions while the connection to the outside data base is terminated. Such a termination of a connection that affects a plurality of users could have substantial financial repercussions on the company. Therefore, breaking the procedures of the security management system 20 into discrete, finite steps that are not automatically activated after each execution of a previous step will prevent inadvertent obnoxious or detrimental computer activity.

Figure 8:
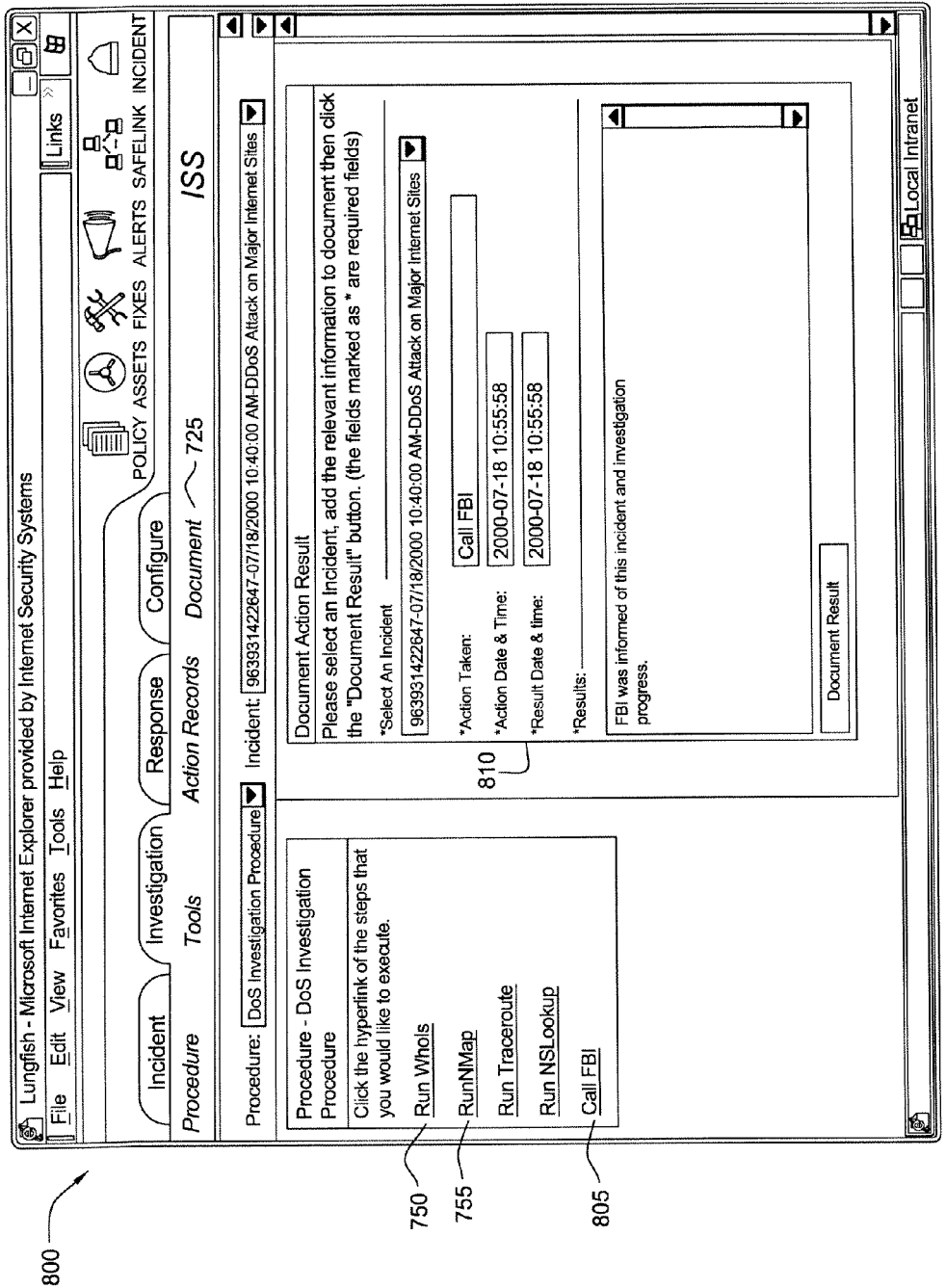
FIG. 8 is an exemplary display screen of a software program for acquiring information about a manually executed step and for listing steps of a particular investigation procedure that can be selected for execution.

Referring now to FIG. 8, a exemplary display screen 800 is generated when the document command 725 is activated. Specifically, in the last step or step 5 of the investigation procedure displayed in frame 740, security personnel in this exemplary procedure is required to call law enforcement officials from government agencies such as the Federal Bureau of Investigation (FBI), police, or other appropriate government agencies. In order to provide a complete record of the phone call by security personnel, the document command 725 can be activated so that data acquisition block 810 will be generated in order to obtain the appropriate information about the phone call to the police. Alternatively, (and not shown) the last step or the "Call FBI" step 805 of the investigation procedure can be a hyperlink that automatically activate the document command 725 such that the data acquisition block 810 is generated. As mentioned above, after the information is entered into the data acquisition or window 810, it is saved within the permanent security record of the local data base 26.

Figure 9:
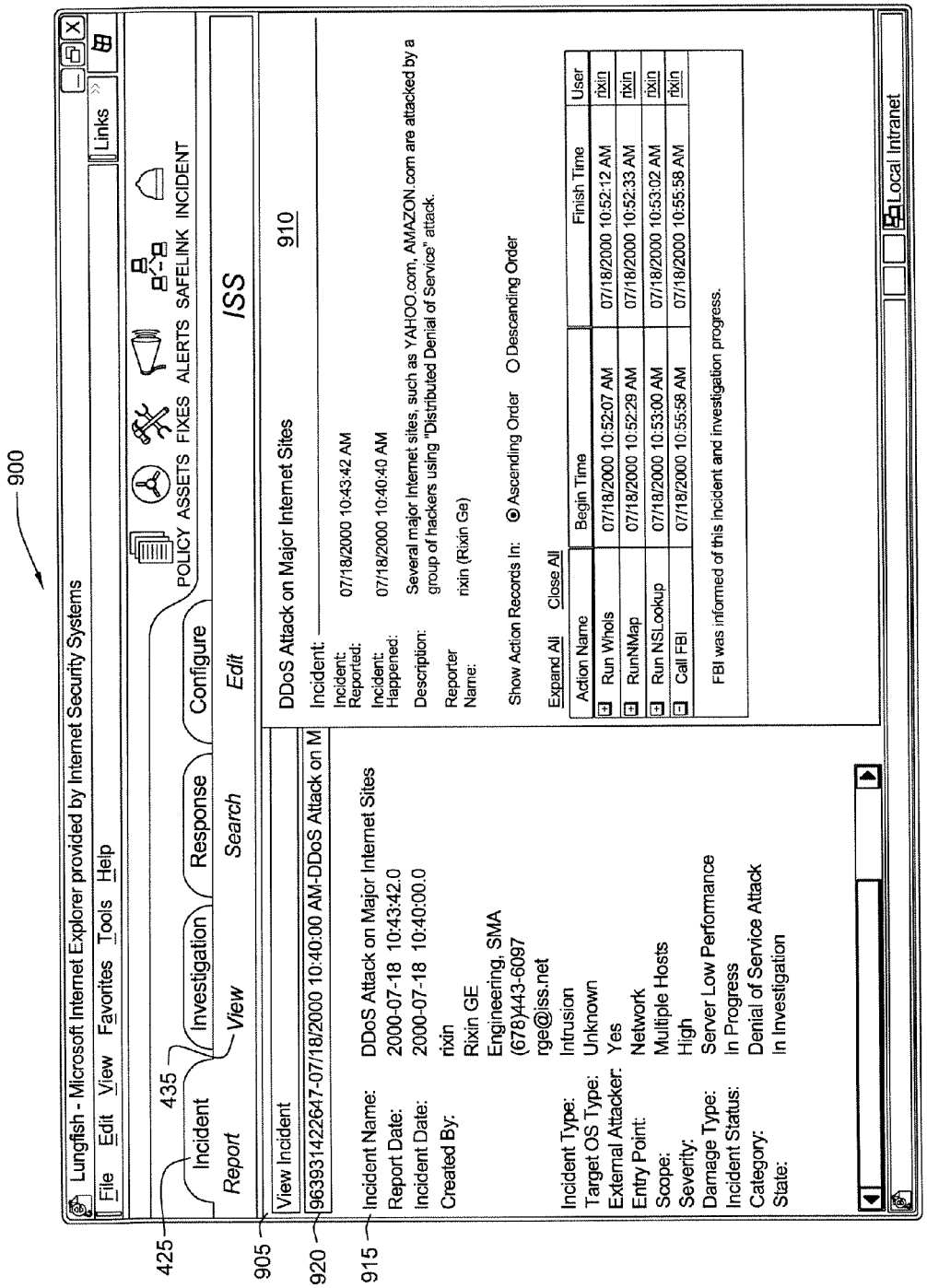
FIG. 9 is an exemplary display screen of a software program for displaying security incident header information and for displaying records of executed steps of a procedure.

FIG. 9 illustrates an exemplary display screen 900 when the incident tab 425 and view command 435 are activated. In response to the activation of the view command 435, frames 905 and 910 are generated. Within frame 905 is a view incident block 915 that displays summary or header information of a particular computer security incident. Within the view incident block 915, there is also a view incident drop-down list 920 that permits the selection of a particular computer security incident that has been tracked by the security management system 20. Upon the selection of a particular computer security incident from the view incident drop-down list 920, action records for the selected computer security incident will be displayed within frame 910. As noted above, action records are extractions or copies of parts of the information contained within the security record of the local data base 26. The action records can be organized in any fashion, such as in chronological order or reverse chronological order, or according to any attribute.

Figure 10:
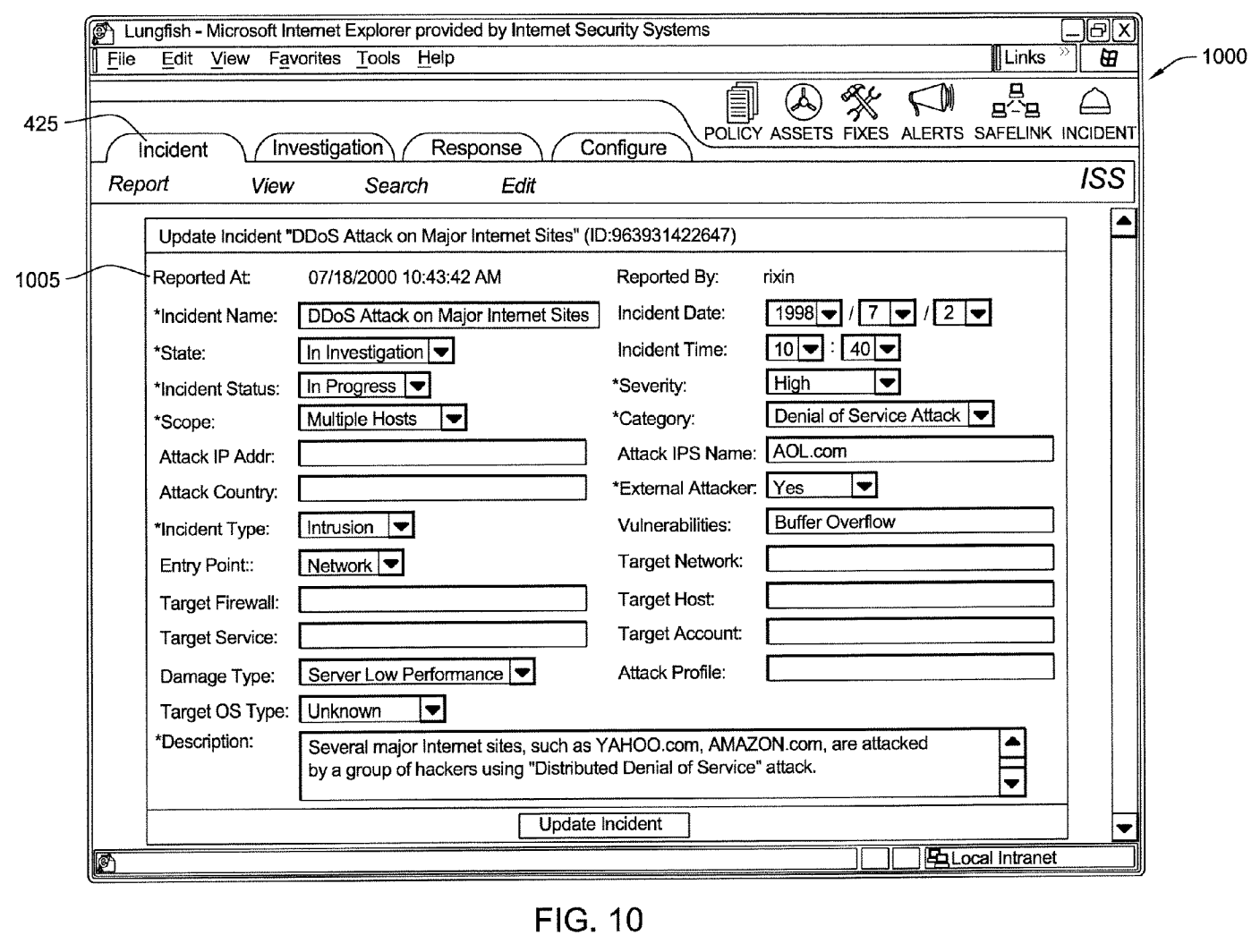

Referring now to FIG. 10, an exemplary display screen 1000 can be generated after the incident tab 425 and edit command 450 are activated. In response to the activation of the edit command 450, an incident edit block 1005 is generated such that a user or security personnel can modify the header information or summary information of a particular computer security incident. This header information or summary information can be automatically generated by the security management system. For example, the security management system 20 can extract information from the results of executed steps and make this information available for invocations of other tools or steps. The extracted information can also be made part of a database or incident log that is separate from the local database 26 that contains the permanent security record. This automatic extraction of information to produce header information of a security incident increases accuracy of stored information while reducing the amount of work for a user. That is, automatic extraction eliminates the need for the user to select and key-in pertinent information about a security incident. The present invention is not limited to auto-extraction of security incident header information. In other words, if manually entry of header information is desired, then the security management system 20 can be configured to accept such manual entry.

While a user or security personnel person can modify the header or summary information of the computer security incident, it is emphasized that the raw data or permanent record of the activity of the security management system 20 cannot be modified or deleted. That is, while a user may modify how a computer incident will be referred to during any future investigation or response to a particular incident, previous iterations or versions of the computer security incident contained within the permanent record of the local data base 26 cannot be changed or modified by way of the incident edit block 1005.

Figure 11:
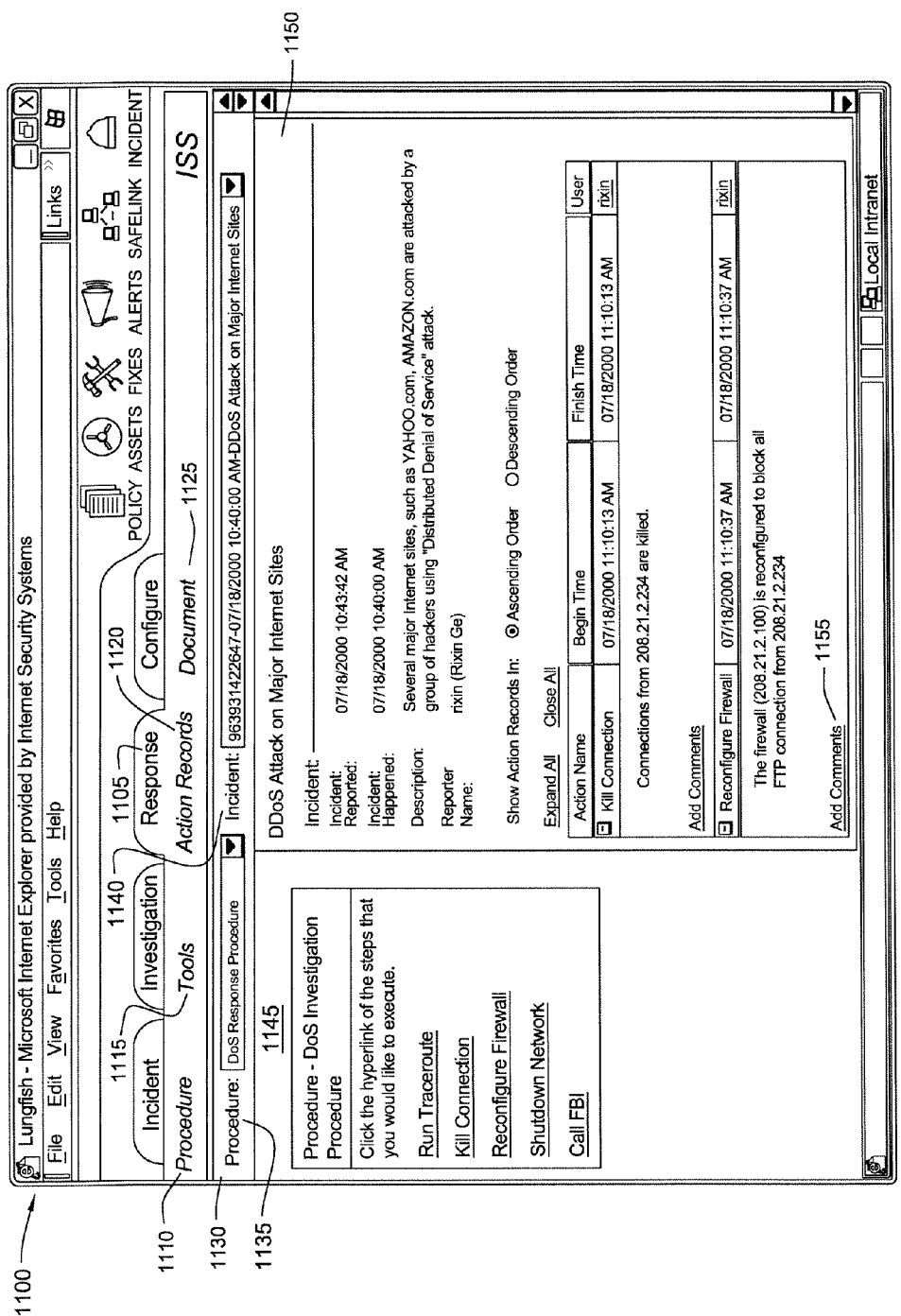
FIG. 11 is an exemplary display screen of a software program for displaying results of an executed step in a response procedure and for listing steps of a particular response procedure that can be selected for execution.

FIG. 11 illustrates an exemplary display screen 1100 when the response tab 1105 is activated. The following commands are contained within the response tab 1105: a procedure command 1110, a tools command 1115, an action records command 1120, and a document command 1125. It is noted that the commands contained within the response tab 1105 are very similar to the commands available upon activation of the investigation tab 705 as illustrated in FIG. 8.

The tools command 1115 allows for the execution of tools in a free-form, random, or non-ordered fashion so that the tools can be selected without following a specific procedure. Activating the tools command 1115 will initiate a display similar to FIG. 18 as will be discussed below. Activation of the action records command 1120 can generate a screen display that provides access to an action record similar to frame 1150. Upon activation of the document command 1125, a data acquisition block similar to data acquisition block 810 of FIG. 8 will be generated so that data can be entered manually for a specific step of a response procedure. For example, in step 3 of the DoS response procedure of frame 1145, the document command 1125 could be activated so that data could be entered manually regarding a phone call to the police, FBI, or any other law enforcement agency. Alternatively (and not illustrated) certain steps, such as the "call police" step of the response procedure of frame 1145 could be hyperlinks that would activate the document command 1125 or generate the data acquisition block similar to data acquisition block 810 of FIG. 8.

Upon activation of the procedure command 1110, frame 1130 is generated which contains a response procedure drop-down list 1135 and a response incident drop-down list 1140. With the response procedure drop-down list 1135, a particular response procedure can be selected. Similarly with the response incident drop-down list, a particular computer security incident can be selected for generating a response thereto.

After selecting a particular response from the response procedure drop-down list 1135 and a particular computer security incident within the response incident drop-down list 1140, frames 1145 and 1150 are generated. Similar to frame 740 of FIG. 8, frame 1145 of FIG. 11 contains one or more steps that form a procedure. Frame 1150 contains header or summary information of the selected computer security incident as well as action records of the response activity already taken by security personnel or a user of the security management system 20. Similar to the action records for the investigation activity illustrated in frame 745 of FIG. 7, the action records of response activity can be listed in chronological or reverse chronological order, or according to any attributes of a computer security incident. Also, action records can be updated by activating an Add Comments hyperlink 1155.

Similar to the investigation procedure, the steps of the response procedure listed in frame 1145 can be selected for execution at appropriate times as designated by the user of the security management system 20. After execution of each step, the security management system 20 can record a name or caption of the step taken, the results produced by the step, and a corresponding date or time stamp or both, in the security record of the local data base 26. The security management system 20 can also display the results of each step so that a visual record is available to the user of the security management system 20 or security personnel. Similar to the investigation procedure, each step of a response procedure can be selected at appropriate times so that it can be determined whether a specific step should be executed. In other words, presenting steps in such a logical sequence without automatic execution of the steps permits a user to determine whether the execution of a specific step is appropriate for an instant of time.

Figure 12:
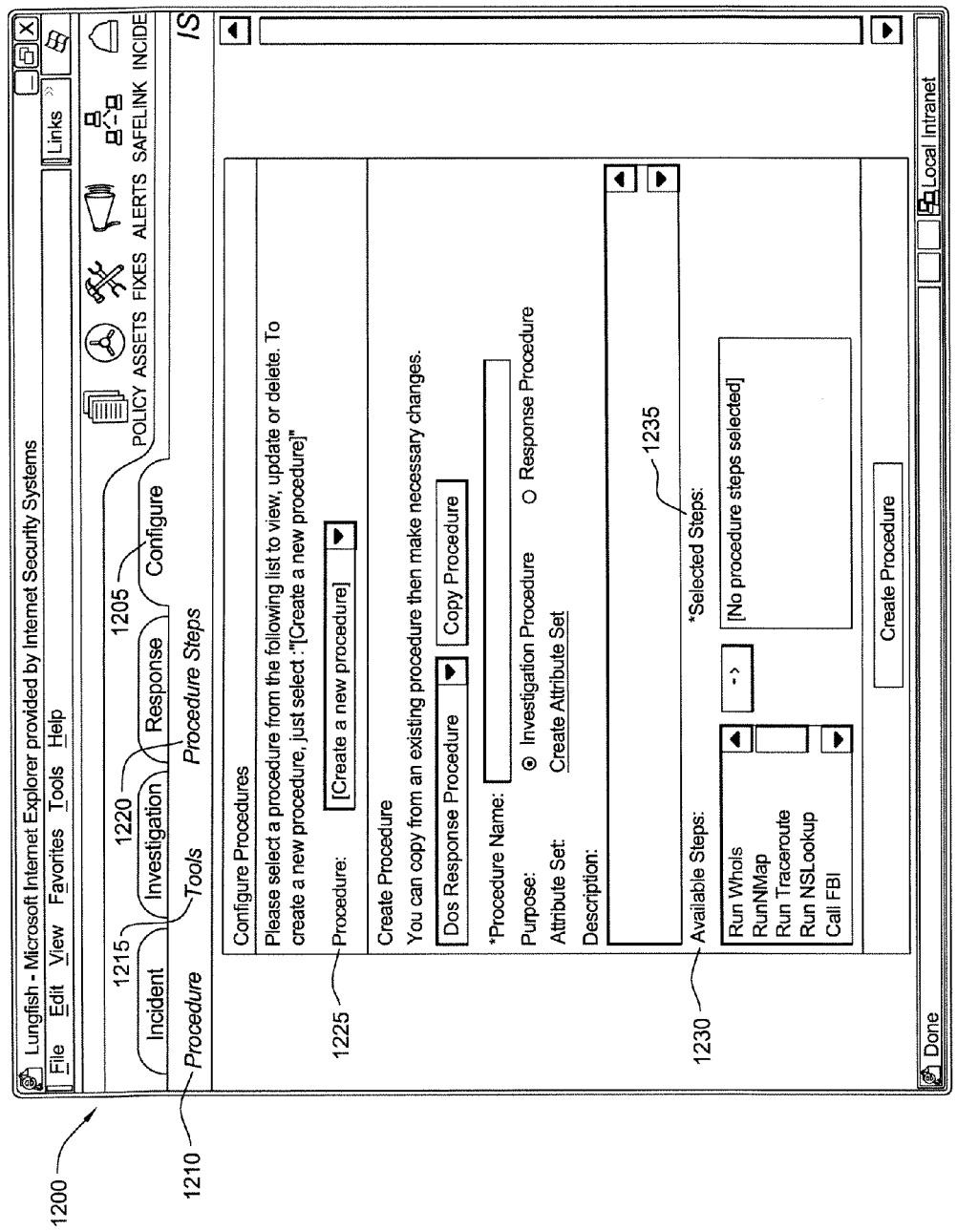
FIG. 12 is an exemplary display screen of a software program for grouping steps to create a new procedure.

Referring now to FIG. 12, an exemplary display screen 1200 can be generated so that steps can be grouped in order to create a new procedure. Specifically, upon activation of a configure tab 1205, the following commands are displayed: a procedures command 1210, a tools command 1215, and procedure steps command 1220. Upon activation of the procedures command 1210, a create procedure block or window 1225 is generated. The create procedure block 1225 can permit the addition, deletion, or modification of steps in a procedure. For example, the create procedure block 1225 can include one or more fields for data acquisition for a particular new procedure or a pre-existing procedure. The create procedure block 1225 permits the naming of procedures as well as categorizing the type of procedure being created or modified. In the exemplary embodiment, a procedure can be characterized or categorized as either an investigation procedure or an incident response procedure. However, those skilled in the art will recognize that various other procedure categories can be generated and that other categories are not beyond the scope of the present invention.

The create procedure block 1225 in the exemplary embodiment permits the creation of a procedure by listing available steps 1230 that can be selected in order to create a selected steps list 1235. The present invention is not limited to the graphical user interface illustrated in FIG. 12. Other graphical user interfaces are not beyond the scope of present invention. The create procedure block 1225 should be designed such that pre-existing steps can be selected and grouped in order to create new procedures. This flexibility of the present invention permits the security management system 20 to be customized for certain applications or for particular computer networks. Since less experienced or novice security personnel can conduct investigations and responses to computer security incidents with the security management system 20, access to the create procedure block 1225 can be restricted. For example, a password may be required in order to create new procedures or new steps for the security management system 20. Alternatively, only users with authorization, such as Identification codes, may be permitted to modify or change any of the procedures or steps within the security management system 20. Those skilled in the art will appreciate that the various access algorithms can be employed to restrict access to portions of the security management system 20 that can be altered or modified. The security management system 20 should be designed so that it can provide a systematic approach to reacting to computer security incidents that can be repeated consistently by different security personnel or users of the security management system 20. Requiring authorization for certain steps or procedures can prevent changes to steps or procedures which, in turn, increases uniformity of results between users of similar authorization levels.

Figure 13A:
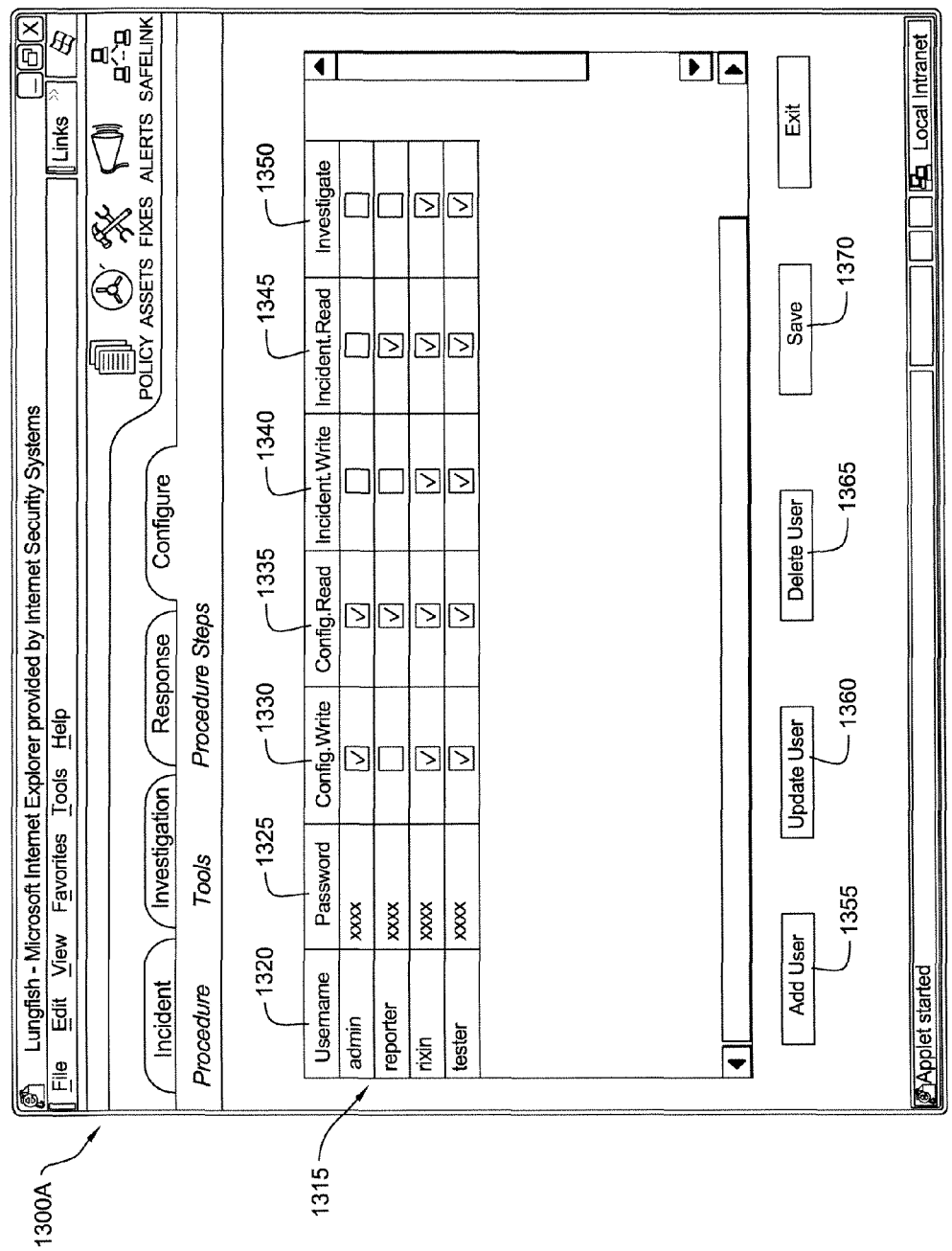
FIG. 13A is an exemplary display screen of a software program for listing authorization levels of users.

FIG. 13A is an exemplary display screen 1300A of a software program for listing authorization levels of users. A permission table 1315 includes a users column 1320, a password column 1325, a configuration write column 1330, a configuration read column 1335, an incident write column 1340, an incident read column 1345, and an investigate column 1350. The number and types of permission areas or columns of the permission table 1315 are not limited to the columns shown. Other permission areas or columns are not beyond the scope of the present invention.

The configuration write column 1330 and configuration read column 1335 provide authorization for the writing and reading of security incidents. The investigate column 1350 provides authorization for access to the investigation procedures of the security management system 20. This display screen determines the type of access that users have with the security management system 20. The screen display buttons, add user 1355, update user 1360, delete user 1365, and save 1370, permit the creation, editing, or deletion or any combination thereof for users of the security management system 20.

Figure 13B:
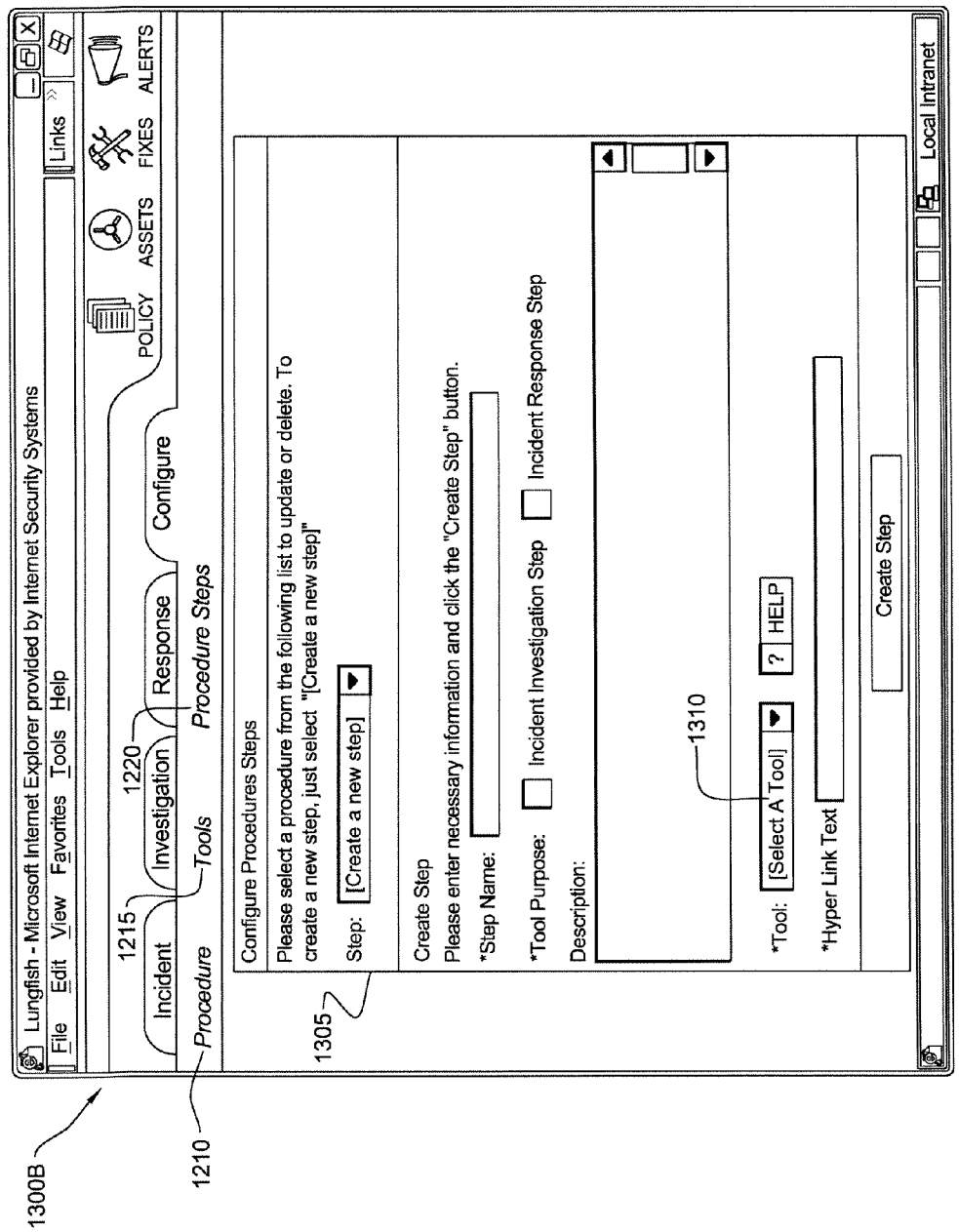
FIG. 13B is an exemplary display screen of a software program for creating new steps in a procedure.

Referring now to FIG. 13B, an exemplary display screen 1300B provides a technique for creating new steps in a procedure. The new procedure block or window 1305 is generated upon activation of the procedure steps command 1220. The new procedure step block 1305 acquires data for the naming of a step, the categorization of a step, a brief description of a step, and the actual computer code for the step. If a step happens to be a program module that is an off-the-shelf software program, then one or more tools can be selected from the tool drop-down list 1310.

The new procedure step block 1305 is not limited to the graphical user interface shown. The new procedure step block 1305 should permit authorized users to create new steps for any of the procedures supported by the security management system 20. As noted above, since less experienced or novice security personnel can conduct investigations and responses to computer security incidents with the security management system 20, access to the new procedure step block 1305 can also be restricted. For example, a password may be required in order to create new procedures or new steps for the security management system 20. Alternatively, only users with particular IDs may be permitted to modify or change any of the procedures or steps within the security management system 20.

Figure 14:
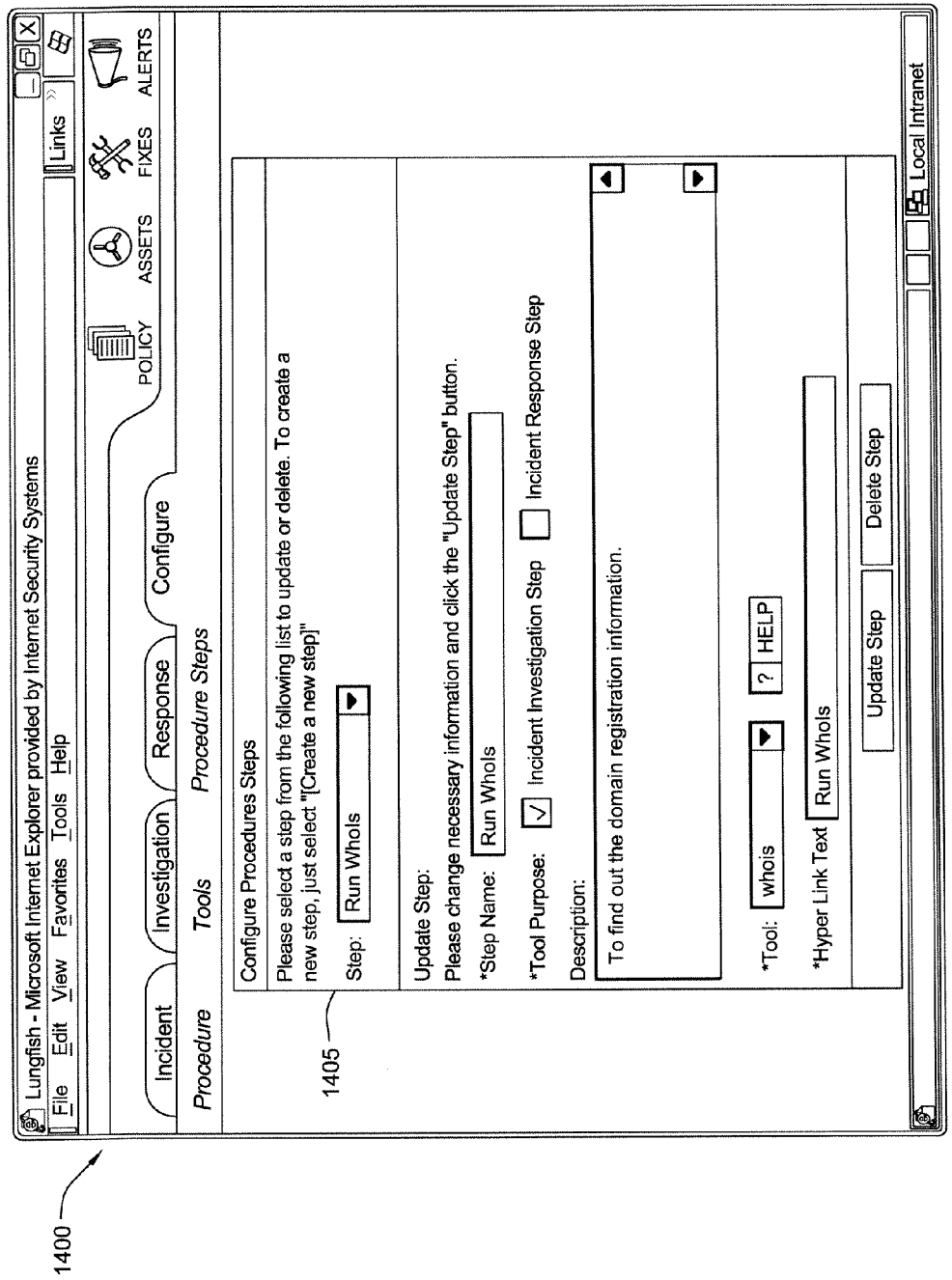
FIG. 14 is an exemplary display screen of a software program for updating a step in a procedure.

FIG. 14 illustrates an exemplary display screen 1400 that permits updating of a step in a procedure. After selecting a particular step, the update procedure step block 1405 can be generated to acquire modification data for a particular step of a procedure. The update procedure step block 1405 can include various fields for acquiring the modification data for a particular step. Similar to the new procedure step block 1305 of FIG. 13, the update procedure step block 1405 of FIG. 14 can include step name fields, a description field, and a field to add specific coding of a particular step or tool. Also similar to the new procedure step block 1305 of FIG. 13 as well as the create procedure block 125 of FIG. 12, access to the update procedure step block 1405 can be restricted. Restricted access to the aforementioned data acquisition blocks or windows can ensure that procedures will remain consistent during actual use which in turn also increases the chances that the security record stored in the local data base 26 will be admissible as evidence in a court of law. The security management system 20 should be designed such that the security records parallel daily business records that are kept in industry which are also usually admissible as evidence in a court of law.

Figure 15:
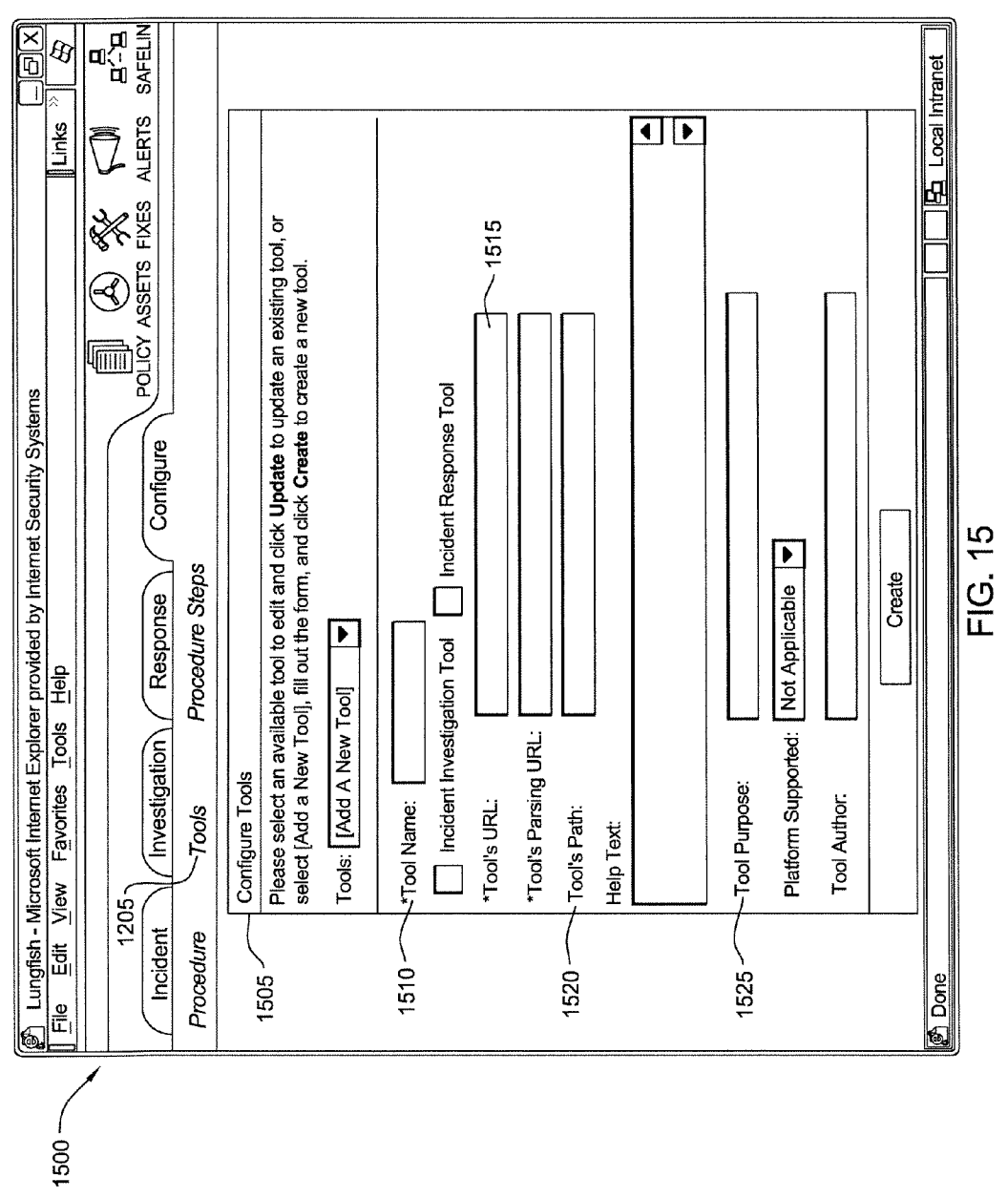

FIG. 15 illustrates an exemplary display screen 1500 for creating a new tool. The new tool block for window 1505 can be generated upon activation of the tools command 1215. Similar to the create procedure block 1225 of FIG. 12 and the new procedure step block 1305 of FIG. 13, the new tool block 1505 permits the creation of a new tool for a procedure. The new tool block 1505 can include various fields for acquiring data relating to a new tool. For example, the new tool block 1505 can include a tool name field 1510, a universal resource locator field (URL) 1515, a brief description field 1520, a tool purpose field 1525, and a categorization field (not illustrated). As noted above, a tool according to the present invention is a program module that can be an off-the-shelf software program that can be used to gather information or make changes to a security configuration of a computer network or network infrastructure. However, other tools are not beyond the scope of the present invention. Other tools can include any type of program module that could be used to track, identify, or react to a computer security incident.

Figure 16:
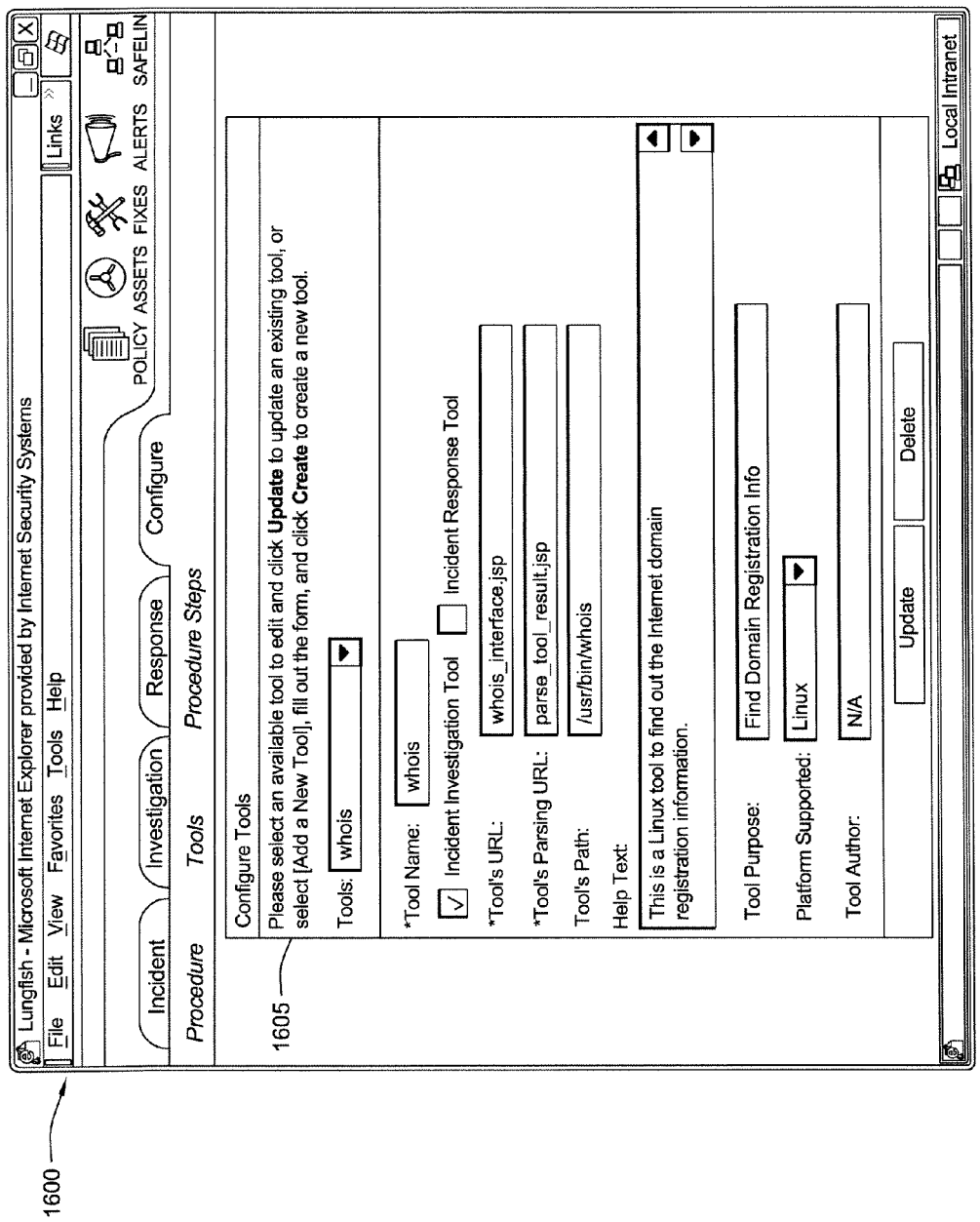
FIG. 16 is an exemplary display screen of a software program for updating information about a tool.

Referring now to FIG. 16, an exemplary display screen 1600 can be generated for updating information about a tool. In response to activation of the tool command 1215, the update tool block or window 1605 can be generated to acquire update information for a particular tool. The update tool block 1605 can include similar data acquisition fields relative to the new tool block 1505 as illustrated in FIG. 15. However, one of ordinary skill in the art recognizes that the update tool block 1605 can include more or less fields for data acquisition compared to the new tool block 1505 as illustrated in FIG. 15. The present invention is not limited to the graphical user interface illustrated in the drawings. Various user interfaces can be employed to collect pertinent information for updating a specific tool of a procedure.

Figure 17:
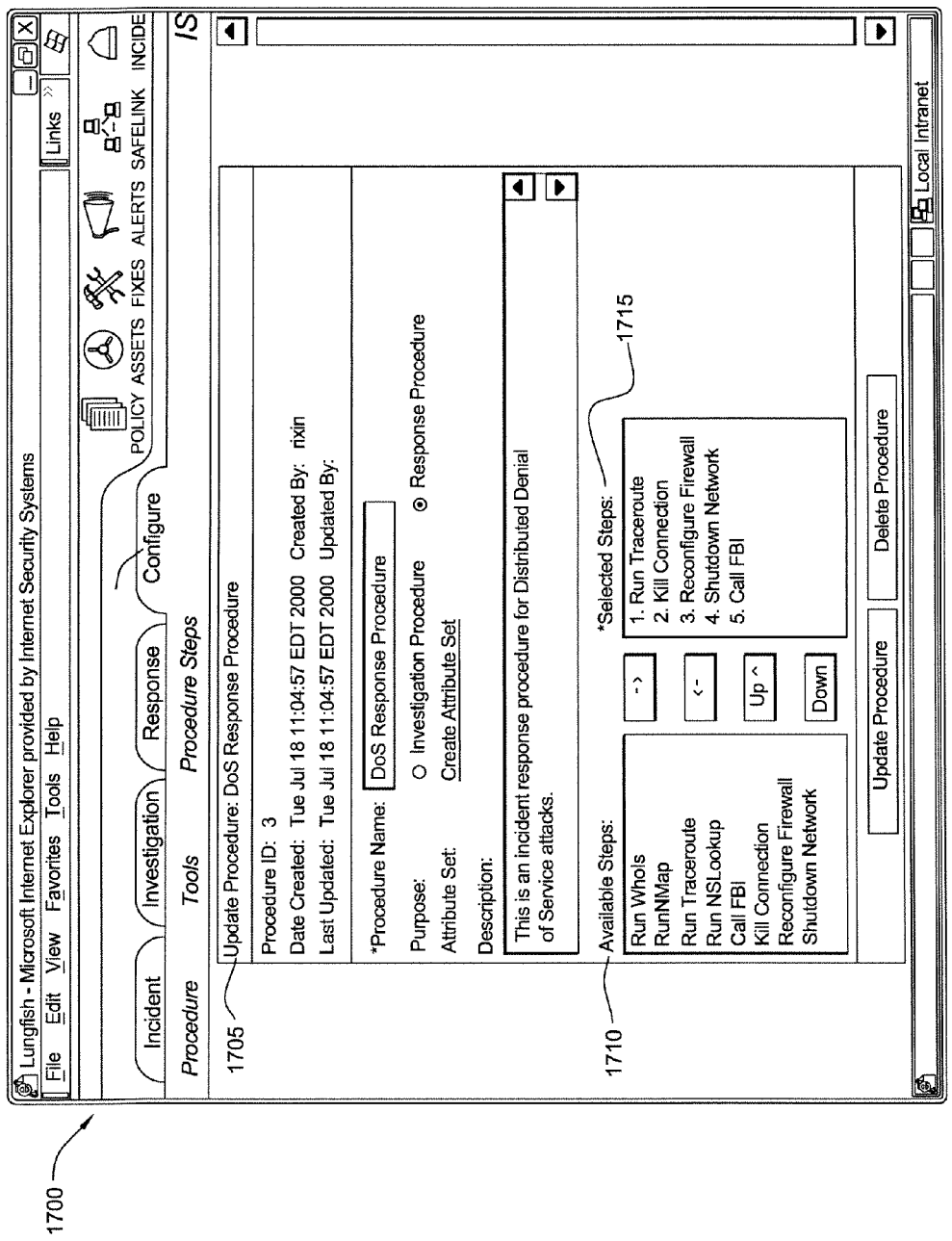
FIG. 17 is an exemplary display screen of a software program for modifying an existing procedure.

FIG. 17 illustrates an exemplary display screen 1700 for modifying an existing procedure. Specifically, exemplary display screen 1700 includes an update procedure block 1705 that can include various data acquisition fields that may be similar to the data acquisition fields present in the create procedure block 1225 of FIG. 12. The update procedure block 1705 can include an available steps list 1710 and a select steps list 1715. The available steps list 1710 permits the selection of one or more steps that can be added into the selected steps list in order to perform an updated procedure. Similar to the create procedure block 1225 of FIG. 12, access to the update procedure block 1705 can be restricted in order to ensure that only expert users have access to these features which can modify steps and procedures of the security management system 20.

Figure 18:
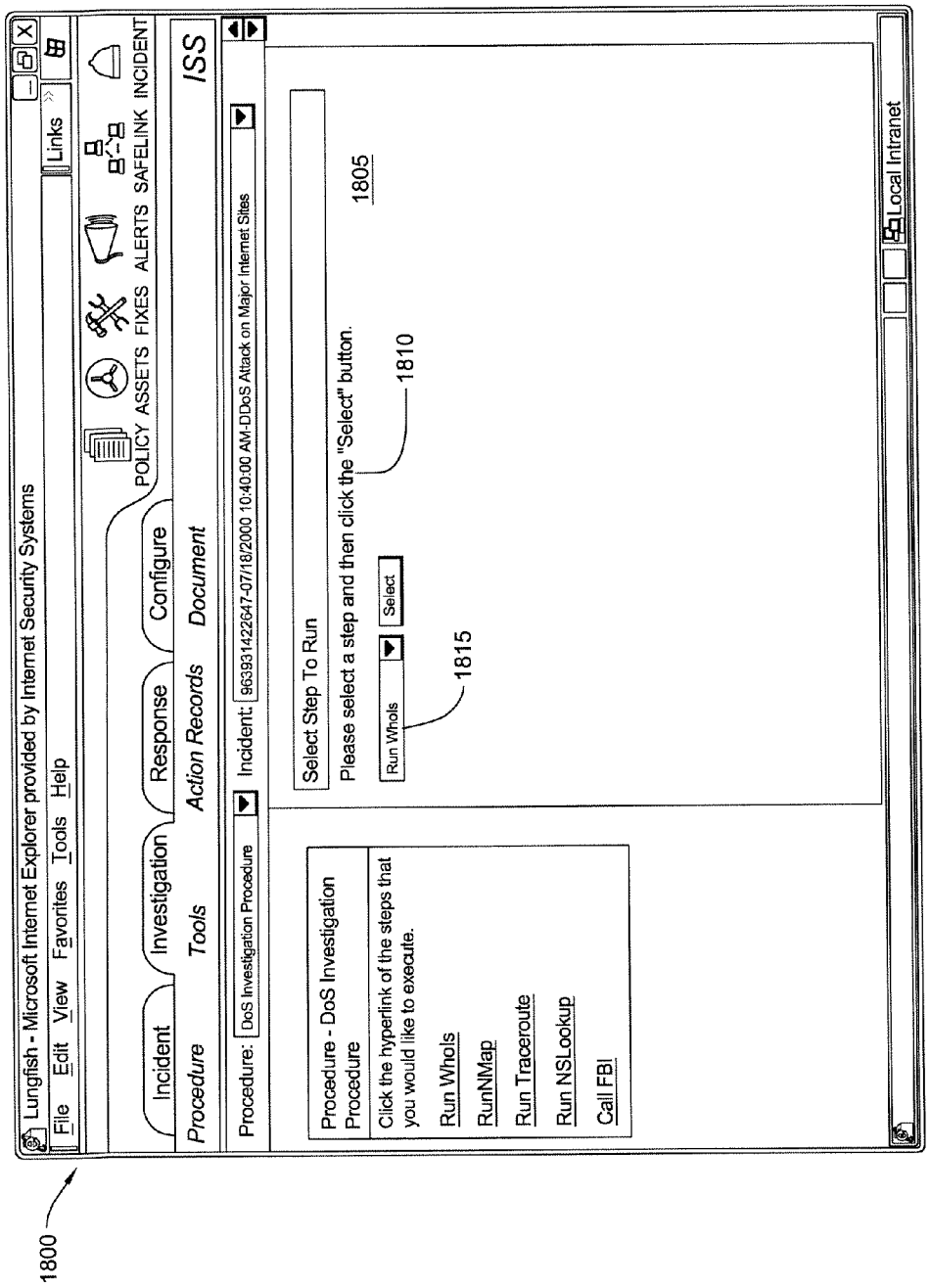
FIG. 18 is an exemplary display screen of a software program for executing tools without following a procedure and for listing steps of a particular investigation procedure that can be selected for execution.

FIG. 18 illustrates an exemplary display screen 1800 for executing tools without following a procedure. Specifically, upon activation of the tools command 715 while the investigation tab is in focus, a new frame 1805 is generated that includes a select tool block or window 1810. The select tool block 1810 permits the selection of one or more tools without the formal listing of a procedure. The select tool block can include several drop-down lists or menus where tools can be separated by categories. Adjacent to each tool category can be a brief description of the category.

For example, a network monitoring tools drop-down list 1815 can include a corresponding description that provides a user with information about the category of the tools that can be selected from the drop-down list 1815. Similar to all of the aforementioned blocks or windows that can modify steps or procedures of the security management system 20, access to the select tool block 1810 can be restricted to expert users so that consistent and more accurate results can be obtained by novice security personnel.

Also similar to steps or tools listed in a formal procedure, after each tool that is executed within the select tool block 1810, the name of the tool, the results of the tool, and a corresponding date or time stamp or both can be stored within the security record of the local data base 26. Furthermore, and it is not beyond the scope of the present invention to provide the security management system 20 with the capability of suggesting an appropriate tool to be executed based upon the computer security incident detected. Such a feature or capability will be discussed in further detail with respect to FIG. 19. The select tool block 1810 lists the tools for an investigation procedure. Conversely, a select tool block (not shown) similar to the select tool block 1810 of FIG. 18 can be generated when the tools command 1115 is activated while the response tab 1105 is in focus.

Figure 19:
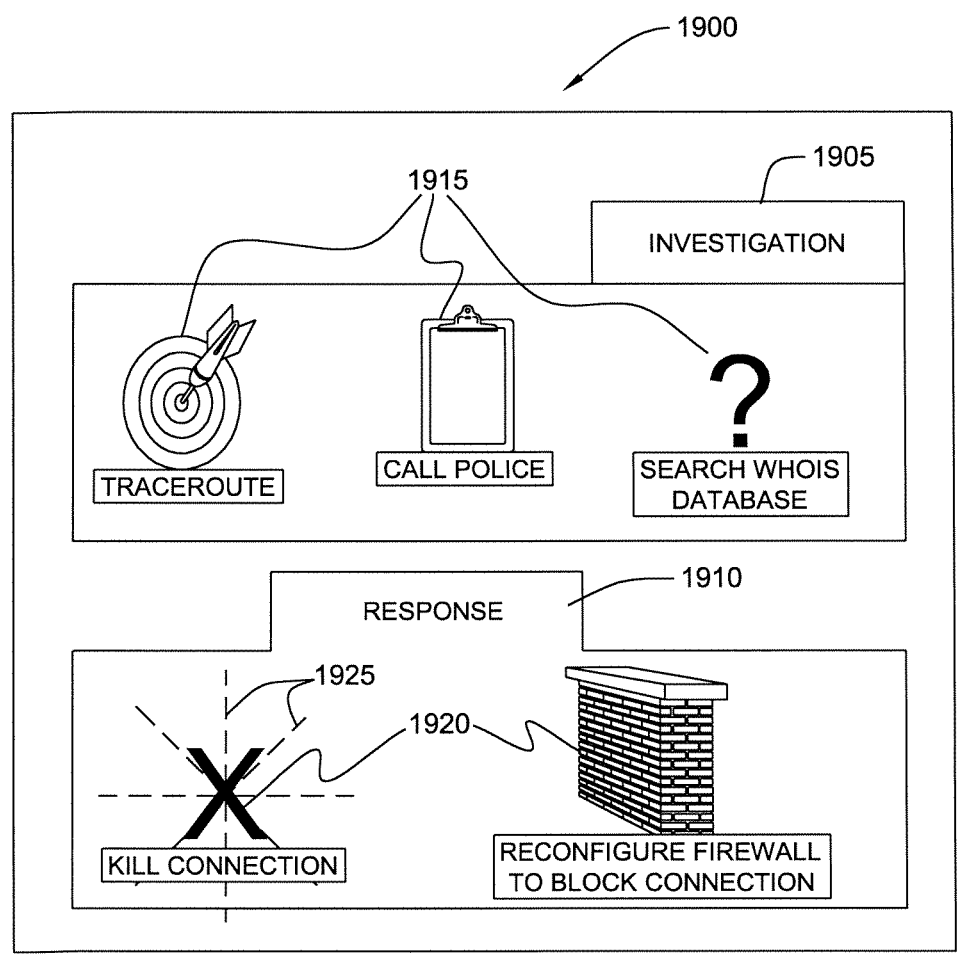
FIG. 19 is an exemplary display screen of a software program for executing tools, shown as icons, without following a procedure.

Referring now to FIG. 19, an exemplary display screen 1900 can be generated for executing tools that can be activated by icons listed on the display screen 1900. That is, the security management system 20 can display investigation in response steps or tools in a non-procedural manner. The icons can be displayed randomly or they can be grouped according to predefined categories. For example, a group of icons 1915 can be grouped as investigation tools or steps of an investigation category 1905.

Similarly, a response group 1910 can include a plurality of response steps or tools 1920. In order to facilitate rapid detection, response, and appropriate action to be taken with a particular computer security incident, the security management system 20 can suggest or indicate the next or most appropriate step to execute after a previous step has been executed. For example, when a first step is executed (not shown), the security management system 20 could flash the icon of a step that is more appropriate to take as a second step as denoted by the flash indicating lines 1925. The security management system 20 can also display warnings or cautions in response to mouse-over activity upon an icon or step text as will be discussed in further detail with respect to FIG. 20.

FIG. 20 illustrates an exemplary display screen 2000 for displaying cautions or warnings prior to the execution of a step of a procedure. That is, each step of a procedure can include a warning, a caution, or signal that may be outputted as a screen pop-up message 2005 or text 2010, an audio alert, or any combination thereof. For example, if the execution of a certain step is desired, such as step 2, "reconfigure firewall" step, the security management system 20 can generate a screen pop-up message 2005 indicating how execution of this particular step could affect the network or tracking of a particular computer security incident. The security management system 20 could indicate that a certain step may inform the source of the computer incident that he or she is being tracked by the security management system 20. Similarly, text 2010 can be placed adjacent to a step such as the "kill connection" step 1 in order to indicate any potential results of the execution of the particular step. The pre-execution step warnings or cautions 2005, 2010 permit less experienced or novice security personnel to conduct investigations and responses to computer security incidents.

Referring now to FIG. 21A, an exemplary strategic machine table 2100A can be generated to locate an appropriate computer, usually a tool server 24, 390 (See FIGS. 2 and 3, respectively) to execute steps of a procedure. That is, the strategic machine table can be designed to locate tool servers 24, 390 that can interrogate sources of one or more computer incidents. Typically, computers located deep inside an organization's network may not be permitted to perform certain functions to computers outside of a network because of a firewall. Firewalls typically do not permit computers to interrogate other computers outside of the network protected by the one or more respective firewalls. It is noted that some security incidents can originate within a network and therefore, a respective firewall may not block actions taken by one or more computers within the network.

The strategic machine table may comprise a data base of information related to computers on a network or computers outside a network or both. For example, the strategic machine table 2100A can include columns of information such as a first column 2105 that pertains to steps to be performed, Internet address ranges 2110, and a strategic machine or tool server column 2115. The Internet address ranges 2110 can correspond to sources or originators of computer security incidents, accomplices to computer security incidents, witnesses to computer security incidents, computers that are subject to an attack, or any combination thereof, in addition to other similar locations in a networked computer environment. The tool server column 2115 can list names of tool servers (shown) or it can list Internet addresses for tool servers (not shown).

The columns of information can be organized in order to create an association between data parameters such as steps to be performed, Internet address ranges, and the network location of tool servers 24, 390 within a network. Although not illustrated, tool servers or sensors 390 can be located outside of the sub-networks and large network 350 and beyond sensor 390A and external router 365. That is, the tool servers 390 or sensors can be located anywhere on the Internet outside of the large network 350 and beyond external router 365, as long as the tool server 390 is connected to the Internet 340. Therefore, the tool server column 2115 can include tool servers or sensors 390 located outside of and beyond a particular network such as large network 350. For example, a tool server or sensor 390 could exist on the other side of external router 365, opposite large network 350.

With this association, a computer can be located close to the perimeter or outer regions of a network to perform restricted behavior that may be part of a response or investigation procedure. In other words, in some response or investigation scenarios, it may be necessary to locate computers in a network that are not restricted to a limited number of "friendly commands or operations". With the strategic machine table 2100A, the security management system 20 can locate an appropriate computer, such as a tool server 24, 390 to execute steps of a procedure.

For example, referring back to FIG. 3, the security management system 20 can locate a sensor or tool server 390 that is located outside a network 350. Such a sensor 390 is disposed adjacent to external router 365. The security management system 20 would utilize the table 2100A to find the sensor 390 disposed adjacent to the external router 365.

In certain investigation or response scenarios, it may be necessary to identify sensors 390 that can perform functions that are not usually permitted by a firewall. Based upon the parameters listed in the strategic machine table 2100A, a sensor or tool server 390 can be identified to execute one or more steps of a procedure.

For example, if the source of a computer security incident or if the computer subject to an attack has an Internet address of 55.55.55.55 and the step to be performed is to "Block Connection", then based upon the data in the Strategic Machine Table 2100A, the most appropriate tool server 390 to execute this step would be tool server SC1 since the address of this computer incident source falls within the Internet address range of 00.00.00.00-100.100.100.100 listed in column 2110. The computer security management system 20 could recommend tool server SC1 and any close or proximate tool servers. If the computer security management system 20 is operating in an automatic mode, then the step "Block Connection" could then be automatically performed by tool server SC1.

If a matching tool server or sensor 390 does not exist for a certain step, then the computer security management system 20 can recommend sensors 390 or computers that are close to or approximate to an exact match in the strategic machine table.

In one exemplary embodiment, if a tool server 390 is located within a user workstation 380, the local tool server 390 could be the most appropriate server for certain steps to be performed by the computer security management system 20. For example, for a local step, such as finding files with set user id (SUID) permission in a UNIX computer environment, the most appropriate machine to perform such a step would be a local tool server 390 (or local server module 30) that could check specific computer files of a user workstation 380 that are typically unavailable to remote tool servers 390 (not installed on the user workstation 380).

Figure 21B:
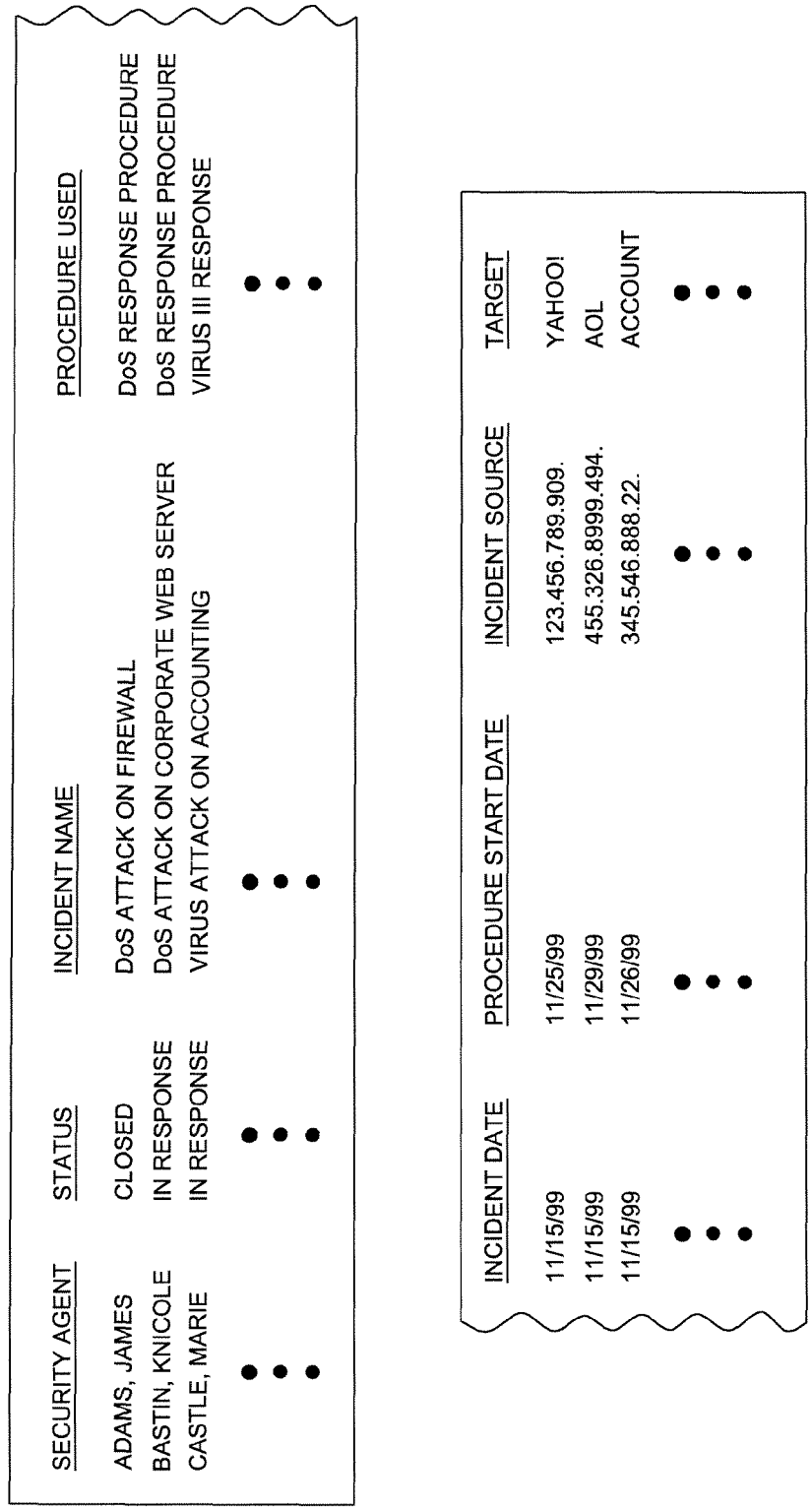
FIG. 21B illustrates an exemplary report that can be generated by the security management system.

FIG. 21B illustrates an exemplary report 2100B that can be generated by the security management system 20. That is, the security management system 20 can generate reports of computer security incidents that are selected by a user. The report 2100B can be organized according to various different data fields, such as the attributes discussed above. For example, a report can be generated according to the alphabetical order of the last names of the security agents who are using the security management system 20 of the present invention. However, the report capability is not limited to the listing shown in FIG. 21B. The report can be generated based upon other data fields or any combination of data fields. Other data fields can include, but are not limited to, the status of the computer security incident, the name of a computer security incident, procedures used in response to a computer security incident, the date of the computer security incident, the procedure start date for a computer security incident, a computer security incident source Internet protocol address, a target of a computer security incident, and any of the attributes discussed above.

Figure 21C:
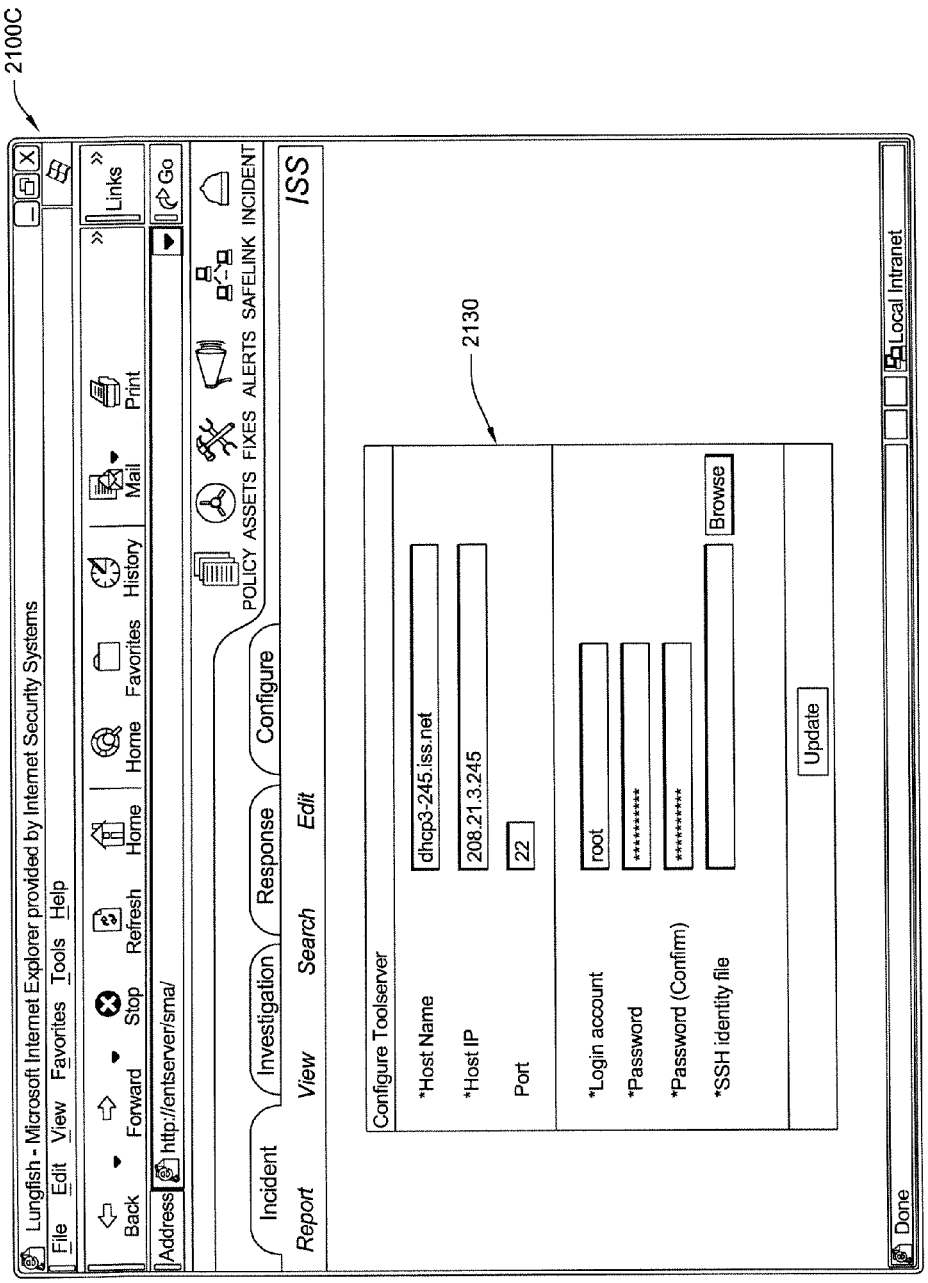
FIG. 21C illustrates an exemplary display screen of a software program for identifying tool servers within the security management system.

In FIG. 21C, an exemplary display screen 2100C of a software program for identifying tool servers within the security management system 20 is illustrated. A configure tool server block 2130 defines the tool servers 24 that are present within the security management system 20. More specifically, tool server block 2130 can acquire parameters about the tool servers 24. The tool server parameters may comprise the following: Host name; Host IP; Port number; Login account; password; and SSH Identity file, to name just a few. The Host name and Host IP parameters can define the name and IP address of a respective tool server 24. The Port number can define the port number on the tool server 24 to which the main server 22 connects. The Login account and password parameters can be the account name and password the main server 22 will use to login to the tool server 24. The SSH (Secured Shell) identity file can be the filename on the main server 22 that is used for identification purposes with the tool server 24. The file can contain a private RSA key (a key for a cryptographic algorithm) for the main server 22. The public key can be located in the file with the same filename as the private key with the ".pub" appended. The present invention is not limited the tool server parameters shown. Fewer or more tool server parameters can be utilized to properly identify the tool servers 24 present within the security management system 20.

Figure 22A:
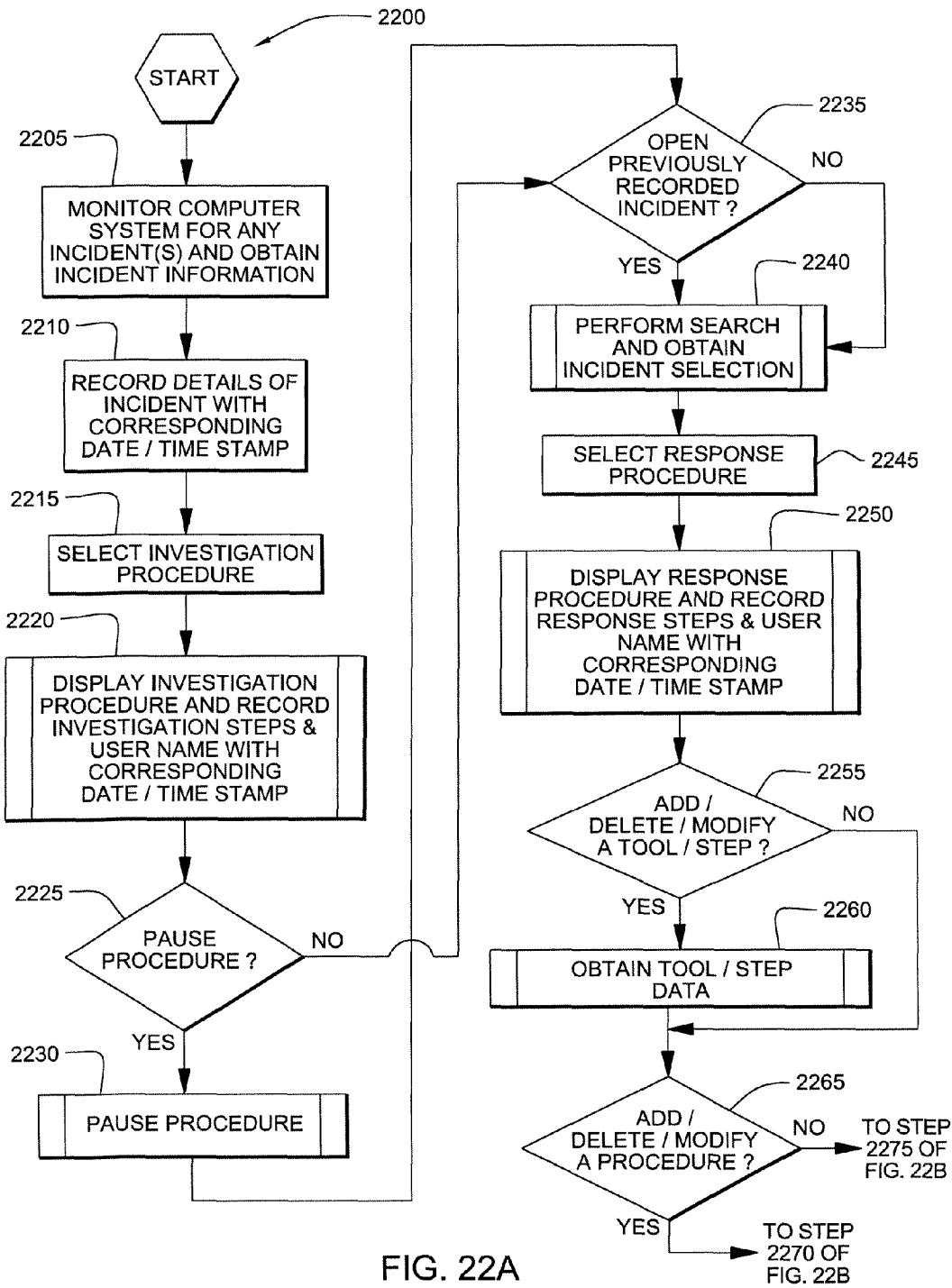
FIG. 22 is a logic flow diagram illustrating an exemplary embodiment of a method for managing and creating a record for one or more security incidents and reactions thereto.
Figure 22B:
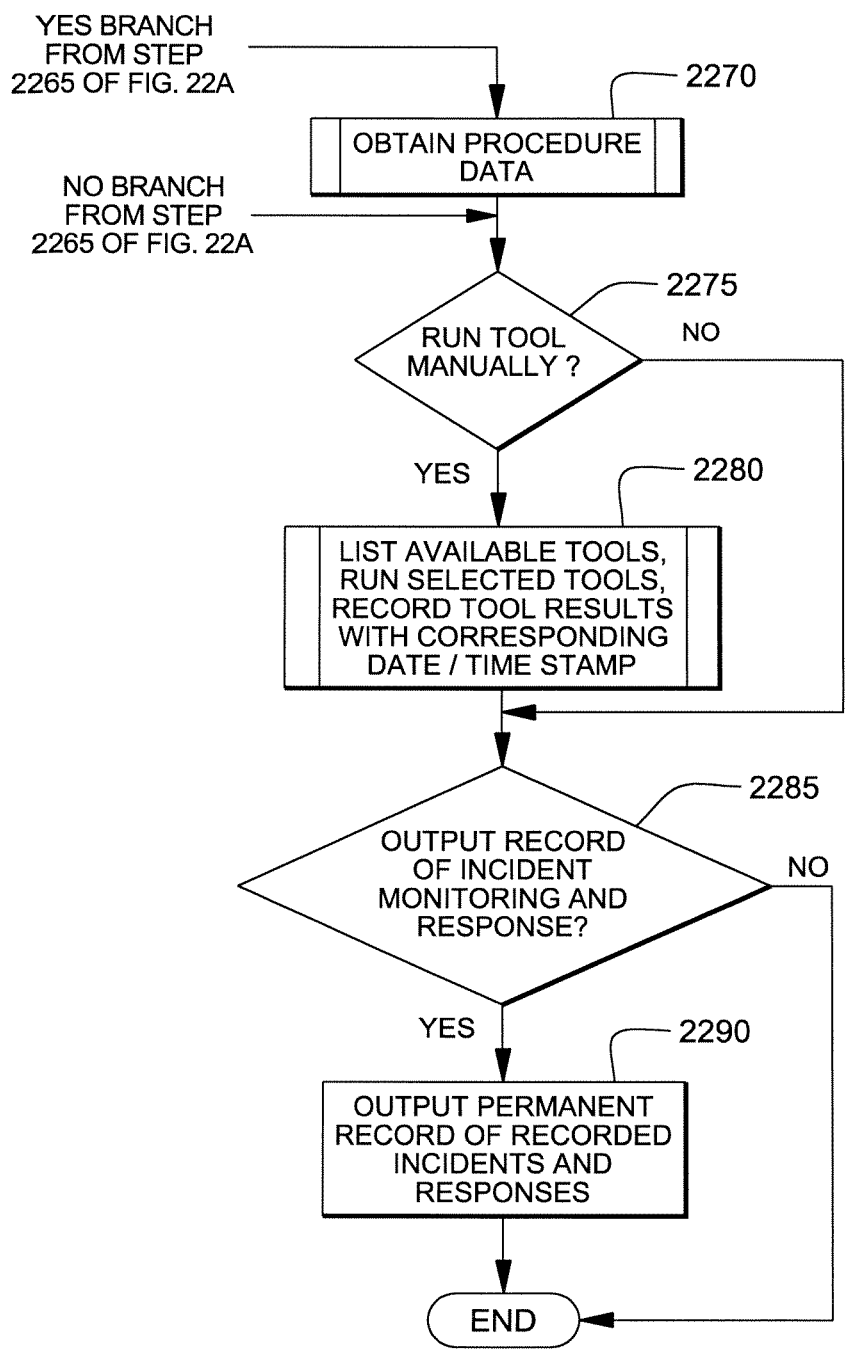

FIG. 22 is an exemplary logic flow diagram of a computer-implemented process for managing and creating a record for one or more security incidents and reactions thereto. FIG. 22 provides an overview of the entire process where step 2205 is the first step of the process 2200. In step 2205, a computer system or network can be monitored for any computer security incidents and incident information can be obtained. For example, form 405 of FIG. 4 can be generated in response to a user or security personnel activating the report command 430. Alternatively, as noted above, since the security management system 20 can be integrated with other security monitoring and alert systems such as alert system 455, form 405 can be generated in response to a system other than the security management system 20 detecting a computer security incident. Also noted above, when a system other than the security management system 20 detects a computer security incident, the other system can prepopulate the fields of form 405.

In step 2210, details of the computer's security incident can be recorded with a corresponding date or time stamp or both after the data within the form 405 of FIG. 4 are saved. That is, the data contained within form 405 of FIG. 4 can be stored in the permanent record of the local data base 26. Next, in step 2215, an investigation procedure can be selected for a particular computer security incident. That is, the investigation tab 705 as illustrated in FIG. 7 can be activated and a procedure can be selected from the procedure drop-down list 730. Alternatively, a procedure could automatically be selected by the security management system 20 based upon rules or other logic. That is, the system 20 could review an incoming security incident and automatically select the most appropriate procedure to use to investigate or respond (or both) to a particular incident based upon rules or logic or both.

While an investigation procedure can be automatically selected by the security management system 20, it is not beyond the scope of the present invention for the security management system 20 to suggest a particular procedure based upon the type of computer security incident detected. In other words, the security management system 20 could automatically recommend the most appropriate procedure for a computer security incident. This recommendation can be reviewed by a user and if accepted, either the security management system 20 or the user could execute the procedure. It is noted that the aforementioned discussion for the select investigation procedure step 2215 is equally applicable to the select response procedure step 2245, which will be discussed in detail below. The present invention is not limited to automatically selecting or automatically executing investigation procedures. That is, the security management system 20 can also automatically select, execute, or suggest response procedures or any types of procedures supported by the system.

In routine 2220, the selected investigation procedure can be displayed and the investigation steps as well as the name of the user can be recorded with a corresponding date or time stamp or both after execution of each respective step. Further details of routine 2220 will be discussed with reference to FIG. 23.

Following routine 2220, in decision step 2225, it is to determined whether a current active procedure should be paused. If the inquiry to decision step 2225 is positive, then the "yes" branch is followed to routine 2230 in which the active or current procedure is paused. If the inquiry to decision step 2225 is negative, then the "no" branch is followed to decision step 2235.

In decision step 2235, it is determined whether a previously recorded computer security incident should be opened. If the inquiry to decision step 2235 is positive, then the "yes" branch is followed to routine 2240 in which a search is performed and a computer security incident listed is selected. Further details of routine 2240 will be discussed with respect to FIG. 26. If the inquiry to decision step 2235 is negative, then the "no" branch is followed to step 2245 in which a response procedure is selected. For example, upon activating the response tab 1105 and procedure command 1110 as illustrated in FIG. 11, a response procedure drop-down list 1135 can be displayed in frame 1130 such that a response procedure can be selected. Next in routine 2250, the selected response procedure can be displayed and the response steps as well as security management system user can be recorded with corresponding date or time stamps or both in the permanent record of the local data base 26 after each execution of a respective step. Further details of routine 2250 will be discussed with respect to FIG. 23.

Steps 2205, 2210, 2215, 2220, 2245, and 2250 can be executed automatically by the security management system 20. That is, the security management system 20 can be configured or programmed to respond to security incidents automatically, without any manual intervention. The security management system 20 can execute these procedures without requiring any user input, depending upon the type of computer security incident detected. The security management system 20 can automatically respond to computer security incidents in accordance with rules or logic that may be changed or updated by a user or the system itself 20. Further, the security management system 20 may be designed for partial automation. That is the security management system 20 may be granted the authority to execute some procedures automatically without consulting the user or the security management system 20 may execute some procedures after receiving permission from the user. As noted above, some procedures could have potentially severe consequences, so such procedures may be designed to be only implemented by a user. Other procedures can be innocuous, so such procedures could be run by the system 20 automatically and without user intervention.

Following routine 2250, in decision step 2255, it is determined whether a step or tool needs to be added, deleted, or modified. If the inquiry to decision step 2255 is positive, then the "yes" branch is followed to routine 2260 in which the relevant tool or step data is obtained. Further details of routine 2260 will be discussed with respect to FIG. 27.

If the inquiry to decision step 2255 is negative, then the "no" branch is followed to decision step 2265 in which it is determined whether a procedure needs to be added, deleted, or modified. If the inquiry to decision step 2265 is positive, then the "yes" branch is followed to routine 2270 in which procedure data is obtained. Further details of routine 2270 will be discussed with respect to FIG. 28 below.

If the inquiry to decision step 2265 is negative, then the "no" branch is followed to decision step 2275 in which it is determined whether a tool will be run manually. If the inquiry to decision step 2275 is positive, then the "yes" branch is followed to routine 2280. In routine 2280 available tools are listed and any selected tools are then run and recorded with a corresponding date or time stamp or both in the permanent record of the local data base 26. Further details of routine 2280 will be discussed with respect to FIG. 29 below.

If the inquiry to decision step 2275 is negative, then the "no" branch is followed to decision step 2285 in which it is determined whether the permanent record of the local data base 26 should be outputted to an output device, such as a printer or screen display, in a particular format. That is, in this step is determined whether the stored, raw data of the permanent record within the local data base 26 should be outputted to an output device.

If the inquiry to decision step 2285 is positive, then the "yes" branch is followed to step 2290 in which the permanent record of the recorded incidents and responses are outputted to a particular output device. For example, an output device could comprise a printer where the permanent record of local data base 26 could be printed out. If the inquiry to decision step 2285 is negative, then the "no" branch is followed to where the process ends.

Figure 23:
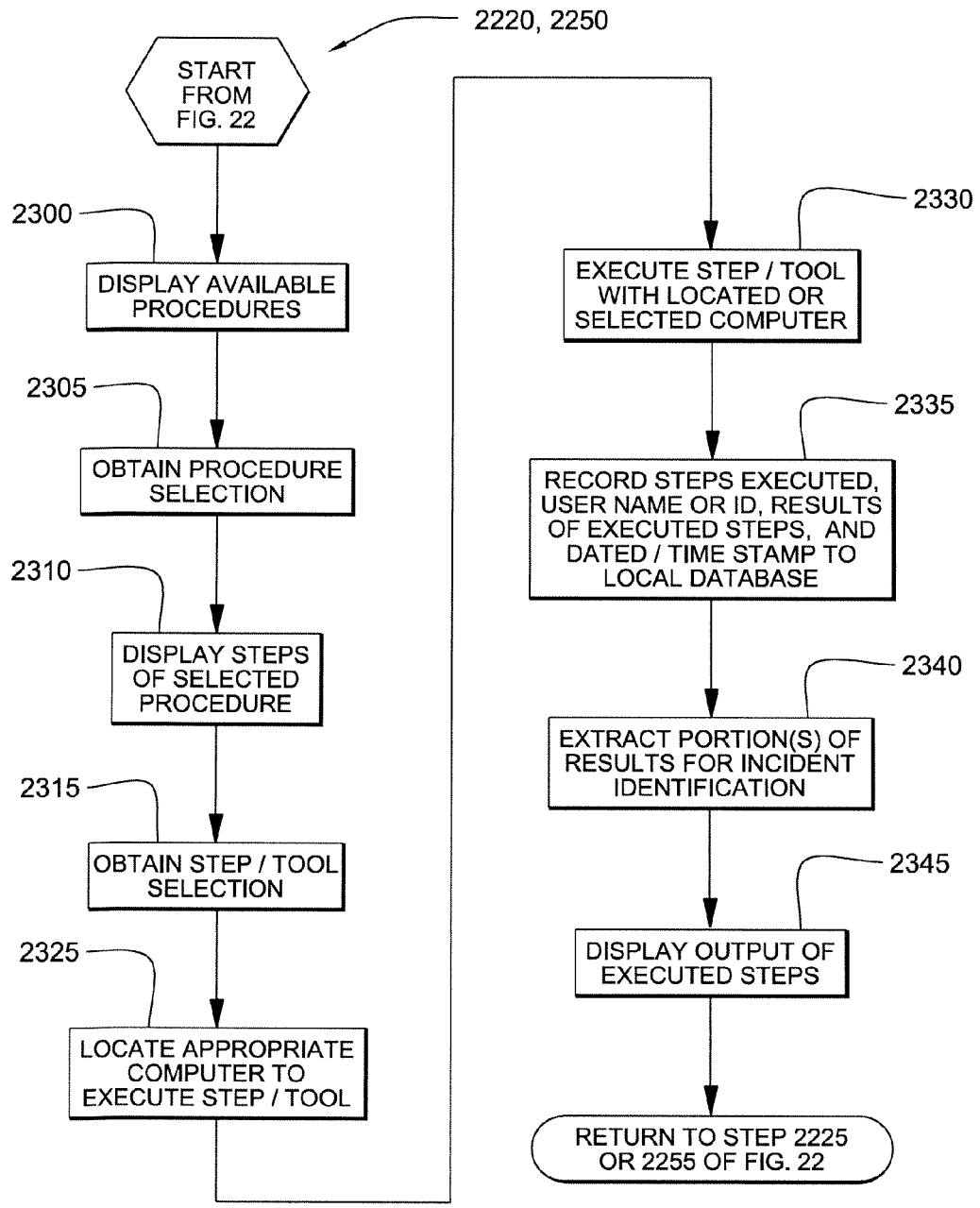
FIG. 23 is a logic flow diagram illustrating an exemplary subprocess of FIG. 22 for displaying and recording executed steps of a procedure.

FIG. 23 illustrates the computer-implemented process for routines 2220, 2250 of FIG. 22 which can display an investigation or response procedure and record the steps of a procedure as they are executed. Routine 2220 begins with step 2300, in which a list of available procedures can be displayed. That is, after activation of the investigation tab 705 and the procedure command 710, a drop-down investigation procedure list 730 can be displayed. Next, in step 2305, a particular procedure can be selected from the investigation procedure drop-down list 730. Further, a particular incident can also be selected from the incident drop-down list 735.

Following step 2305, in step 2310, the steps of the selected procedure can be displayed. For example, frame 740 of FIG. 7 can be generated so that the steps of the selected investigation procedure are enumerated. Subsequently, in step 2315, the step or tools listed can then be selected.

Next, in routine 2325, an appropriate computer to execute the step or tool is located. Further details of routine 2325 will be discussed with respect to FIG. 24 below. Following routine 2325, in step 2330, the selected step or tool is executed with the located or recommended computer. Next, in step 2335, a brief description or name of the step, the result of the executed step, the name of the computer security system user or an id of the user, and a date or time stamp or both are stored or saved within the permanent record of the local data base 26.

In step 2340, portions or parts of the results of the executed steps can be extracted by the security management system 20 to describe a computer security incident. For example, the security management system 20 can extract information from the results and make this information available for invocations of other tools or steps. The extracted information can also be made part of a database or incident log that is separate from the local database 26 that contains the permanent security record. This automatic extraction of information increases accuracy of stored information while reducing the amount of work for a user. That is, automatic extraction eliminates the need for the user to select and key-in pertinent information about a security incident. Subsequently, in step 2345, the output (data) of the executed steps (that were recorded in step 2335) can be formatted and forwarded to an appropriate output device (such as a screen display or printer) to be displayed. The process then returns to either step 2225 or 2255 of FIG. 22.

The output of the security management system 20 can comprise data other than unformatted text or numbers. For example, the execution of a particular tool could return a GIF or JPEG image, or a XML document, etc. The textual output could be string pattern matched to retrieve the information stored by the security management system 20. Special purpose algorithms could be written to extract information from binary files.

Figures 24, 25:
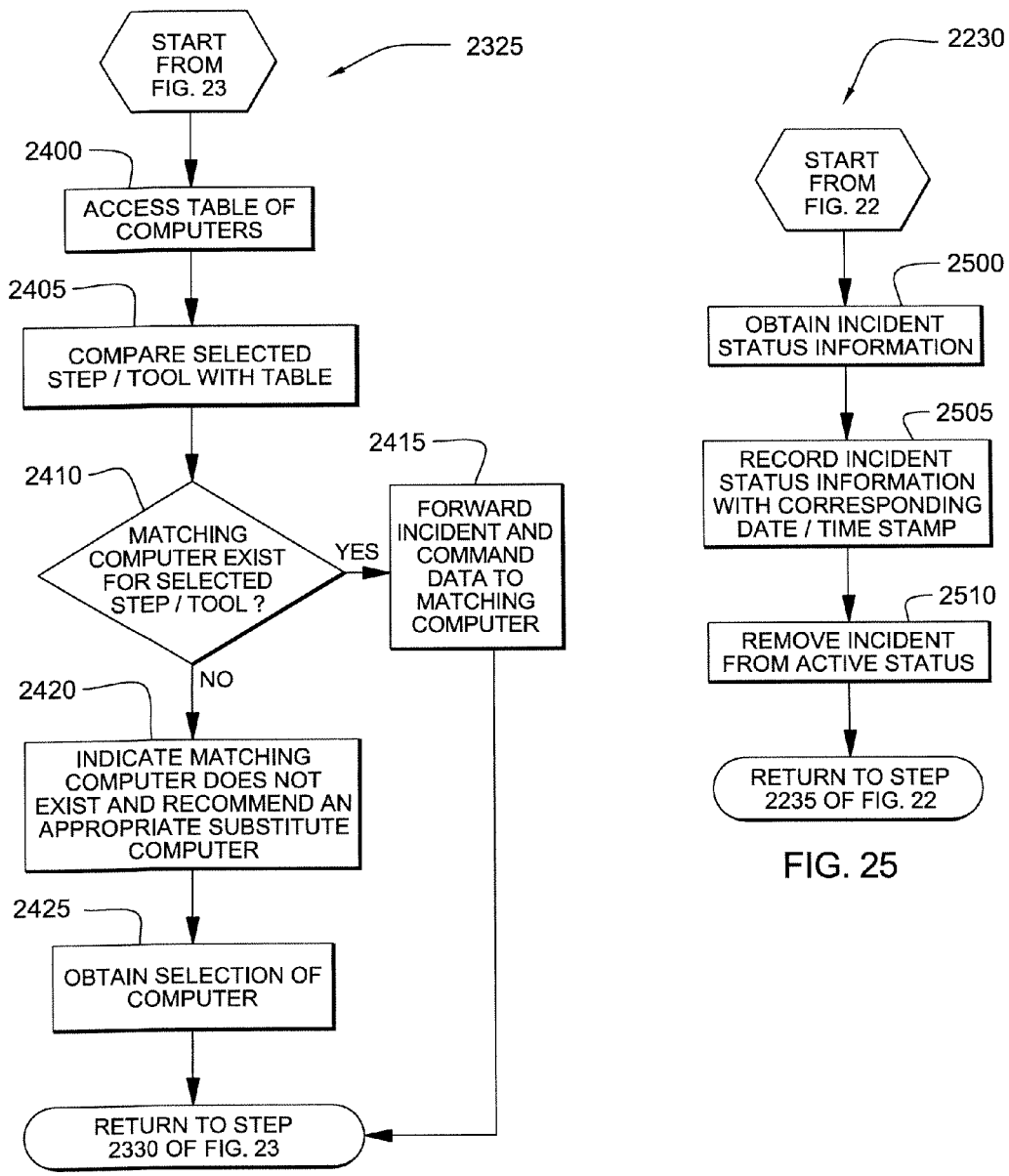
FIG. 24 is a logic flow diagram illustrating an exemplary subprocess of FIG. 23 for locating a strategically located tool server or security computer to execute a tool.
FIG. 25 is a logic flow diagram illustrating an exemplary subprocess of FIG. 22 for pausing a procedure.

FIG. 24 illustrates the computer-implemented process for routine 2325 of FIG. 23 which can locate the appropriate computer to execute a step or a tool. Routine 2325 begins with step 2400 in which a table of computers, such as the strategic machine table illustrated in FIG. 21A, is accessed. Next, in step 2405, the selected step or tool is compared with the table. For example, the step that is to be performed or executed is located within the step to be performed in column 2105 as illustrated in FIG. 21A.

After step 2405, in step 2410, it is determined whether a matching computer or sensor 390 exists for the selected step or tool. That is, in step 2410, the step to be performed is compared as well as the computer incident Internet address range of the activity that is to be performed is compared with the target Internet address range 2110 column. If the inquiry to decision step 2410 is positive, then the "yes" branch is followed to step 2415. In step 2415, the incident and command data is forwarded to the matching computer or sensor 390 for execution.

If the inquiry to decision step 2410 is negative, then the "no" branch is followed to step 2420 in which it is indicated that a matching computer does not exist and an appropriate substitute computer is recommended by the security management system 20. Next, in step 2425, selection of a computer to execute the step or tool is obtained. The process then returns to step 2330 of FIG. 23.

FIG. 25 illustrates the computer-implemented process for routine 2230 of FIG. 22 in which an active procedure is paused. Routine 2230 begins with step 2500 in which the status of a computer security incident is obtained. Next, in step 2505, the incident status information along with a corresponding date or time stamp or both is recorded in the permanent record of the local data base 26. Then, in step 2510, the incident is removed from the active status. Subsequently, the process returns to step 2235 of FIG. 22.

Referring now to FIG. 26, the computer implemented process for routine 2240 of FIG. 22 is illustrated. Routine 2240 begins with step 2600 in which selection criteria for stored computer security incidents is displayed. For example, search criteria block 505 can be displayed so that one or more fields of information, such as attributes, about a particular computer security incident can be obtained. In step 2605, information relating to a particular computer security incident is obtained from the fields of the search criteria form block 505 as illustrated in FIG. 5. Next, in 2610, the computer security incidents corresponding to the selection criteria entered into the search criteria block 505 are displayed. For example, the search results block or window 605 can be displayed as illustrated in FIG. 6. Next, the process returns to step 2245 of FIG. 22.

FIG. 27 illustrates the computer-implemented process for routine 2260 of FIG. 22 which can acquire additions, deletions, or modifications to a tool or step. Routine 2260 begins with step 2700 in which tool or step names to be added, modified, or deleted are obtained. For example, display screen 1300 of FIG. 13 can be generated if a new procedure step is desired to be created. Display screen 1400 can be generated if a modification to a pre-existing step is desired. Furthermore, display screen 1500 of FIG. 15 can be generated if a new tool is desired to be added to the security management system 20. Display screen 1600 can be generated if updates to a particular tool are desired.

In step 2705, corresponding tool or step information fields which are filled or unfilled, depending upon the tool status, are displayed. In step 2710, the tool or step information is obtained. Next, in step 2215, the tool or step information is saved. Subsequently, the process returns to step 2265 of FIG. 22.

Figure 28:
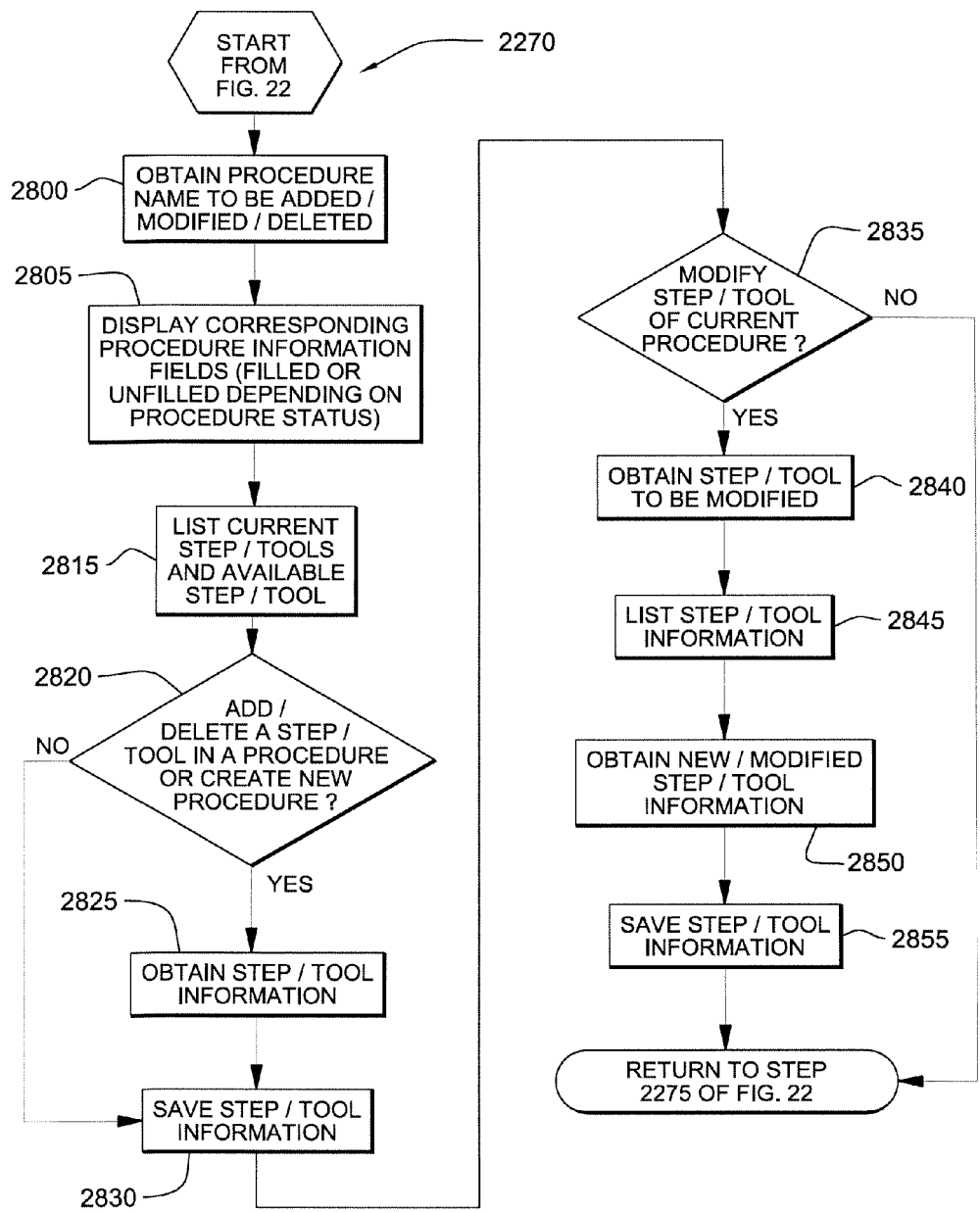
FIG. 28 is a logic flow diagram illustrating an exemplary subprocess of FIG. 22 for creating or modifying a procedure.

FIG. 28 illustrates the computer-implemented process for routine 2270 of FIG. 22 in which a procedure can be added, deleted, or modified. Routine 2270 begins with step 2800 in which the procedure name to be added, modified, or deleted is obtained. For example, display screen 1700 can be generated in order to acquire update information for a pre-existing procedure. Alternatively, display screen 1200 can be generated in order to acquire information about a new procedure. Next, in step 2805, the corresponding procedure information fields which can be filled or unfilled depending on the procedure status can be displayed. Subsequently, in step 2815, the current steps or tools and available steps or tools are listed or displayed. For example, available step list 1230 of FIG. 12 or available step list 1710 of FIG. 17 can be generated. In step 2820 it is determined whether a step or tool will be added or deleted to a procedure or if a new procedure is created. If the inquiry to decision step 2820 is positive, then the "yes" branch is followed to step 2825 in which the step or tool information is obtained. If the inquiry to decision step 2820 is negative, then the "no" branch is followed to step 2830 in which the step or tool information is saved.

In decision step 2835, it is determined whether a step or tool of the current procedure is desired to be modified. If the inquiry to decision step 2835 is positive, then the "yes" branch is followed to step 2840 in which the step or tool named to be modified is obtained. Next, in step 2845, the step or tool information selected or obtained is displayed or listed. In step 2850, the new or modified step or tool information is obtained. In step 2855, the step or tool information is saved. If the inquiry to decision step 2835 is negative, then the "no" branch is followed. The process then returns to decision step 2275 of FIG. 22.

Figure 29:
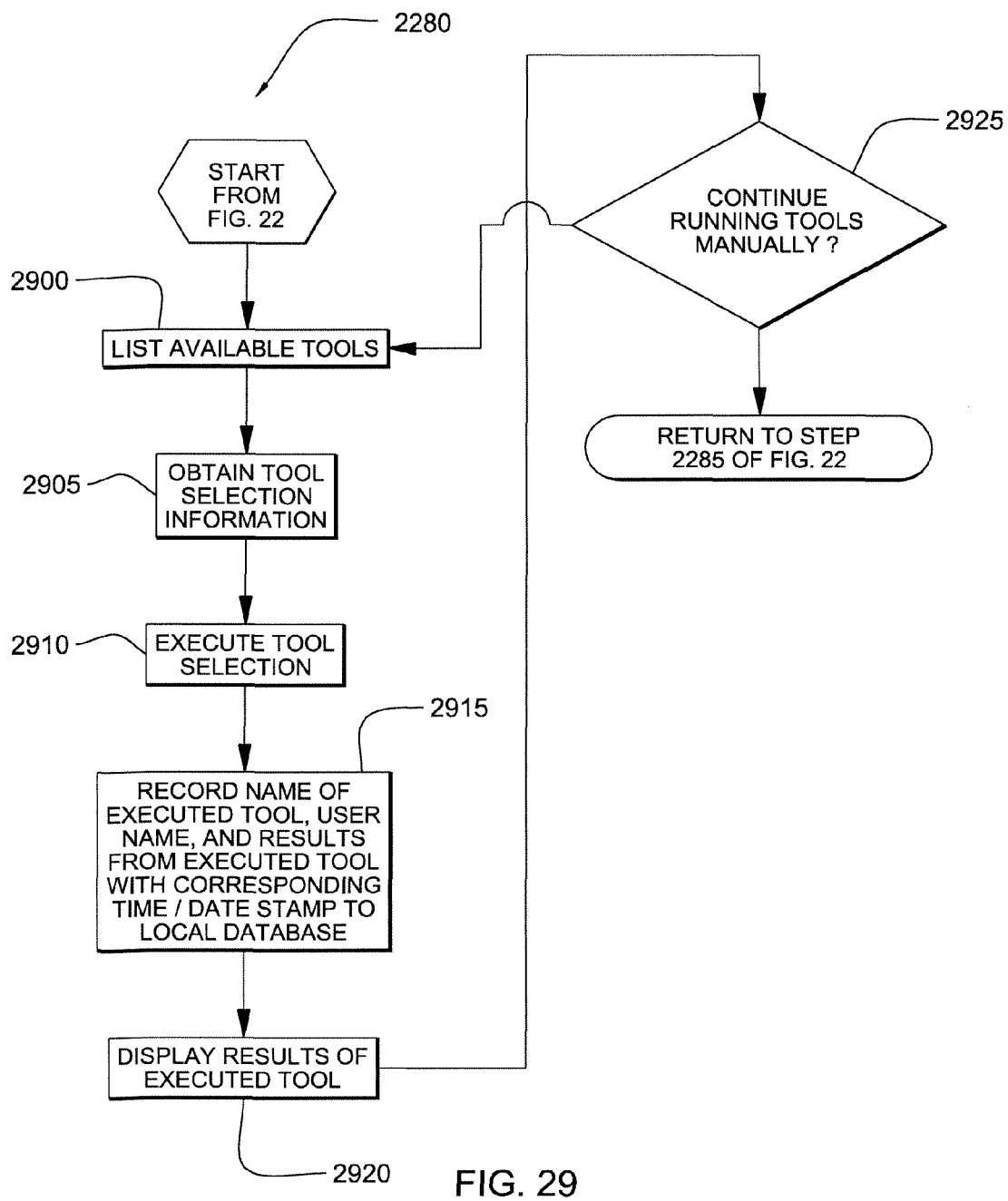
FIG. 29 is a logic flow diagram illustrating an exemplary subprocess of FIG. 22 for running tools or steps without a formal procedure.

FIG. 29 illustrates the computer-implemented process for routine 2280 in which tools can be ran or executed manually without a preset or predetermined procedure. Routine 2280 begins with step 2900 in which available tools are listed. For example, display screen 1800 can be generated where various tools can be listed according to predefined categories. As noted above, tools can be ran or executed manually for both investigation and response procedures. In step 2905, tool selection information is obtained.

After step 2905, in step 2910 the tool selection is executed. However, it is noted that at this point (while not shown) routine 2325 could be inserted at this point so that an appropriate computer can be located to execute the selected tool.

In step 2915, the name or a summary of the executed tool, name of the security management system user or an id thereof, and results from the executed tool with a corresponding date or time stamp or both is recorded in the permanent record of the local data base 26. Next, in step 2920, the results of the executed tool are displayed. In decision step 2925, it is determined whether the tools are desired to be run manually. If the inquiry to decision step 2925 is positive, then the "yes" branch is followed to step 2900. If the inquiry to decision step 2925 is negative, then the "no" branch is followed where the process returns to step 2285 of FIG. 22.

Once the security management system 20 accumulates a sequence of actions taken by a source of a computer security incident, the security management system 20 can profile the source of the computer security incident. The profiling subsystem of the security management system 20 could match the accumulated sequence to prototypical sequences. This profiling could be used to predict future actions that a source of a computer incident could take or help to identify the source behind a computer security incident. Identification of a computer security incident source can include any one or more of the following parameters: an ISP user id; an ISP provider; an internet protocol (IP) address of the computer security incident source; and the name, address, phone number, social security number and other like personal identification information corresponding to the authorized user of the internet protocol (IP) address of the computer security incident source.

To prevent identification, a source of a computer security incident could attempt to overwhelm the security management system 20 by creating a large number of decoy incidents. An attacker might do this to mask a real attack. To cope with this situation, the security management system 20 could have a mechanism or algorithm for separating important incidents from decoy incidents. The sorting mechanism could be open and user definable.

While the security management system 20 may have a series or group of steps linked together to form a procedure, procedures can also be linked together to form a procedure chaining protocol. That is, procedures may also invoke other procedures such as sub-procedures. After a sub-procedure is completed, the process may return to a calling procedure.

Another feature of the security management system 20 is that any action taken by a user may be subject to an authorization check. In other words, the security system 20 may provide restricted access to certain functions. For example, the following actions may require a search for the authorization or security or security level of a user: executing a procedure, changing an attribute on an incident. and configuring or editing procedures, steps, or tools.

While the present invention can be employed to detect computer security incidents that occur across a distributed network such as the Internet, the invention is not limited to this application and can be used in other technology areas that require the detection and reaction to computer security incidents. For example, the present invention could be used for detecting security breaches for financial institutions, governmental data bases such as military data bases, and other like institutions. Moreover, as noted above, the present invention is not limited to detecting computer security incidents across the Internet. That is, the present invention can detect computer security incidents within a network, such as a local area network, of a particular organization.

It should be understood that the foregoing relates only to illustrative embodiments of the present invention, and that numerous changes may be made therein without the parting from the spirit and scope of the invention as defined by the following claims.

What is claimed is:

1. A computer program product for creating a record of one or more computer security incidents, said computer program product comprising:
   a computer-readable, tangible storage device;
   first program instructions to record information about a computer security incident and a date stamp or time stamp for the computer security incident, the computer security incident information identifying one or more attacks received from a network computer that occur prior to an actual computer security threat;
   second program instructions, responsive to the computer security incident information, to classify the computer security incident and identify one or more computer security procedures corresponding to the classification, each of said computer security procedures comprising one or more steps for investigating or mitigating the computer security incident;
   third program instructions to generate a display of said one or more computer security procedures;
   fourth program instructions to receive a selection from a user of one of said computer security procedures and one or more steps of the selected computer security procedure to mitigate the one or more attacks; and
   fifth program instructions to generate and output a record comprising the computer security incident information, results of execution of the selected one or more steps of the selected computer security procedure, an identity of the user who selected the computer security procedure, and the date stamp and time stamp for the computer security incident,
      wherein the fifth program instructions record the results of the executed computer security procedure with a digital signature to enable detection of any attempted modification of the record, whereby integrity of the record can be monitored, and
      wherein said first, second, third, fourth and fifth program instructions are stored on said computer-readable, tangible storage device.

2. The computer program product of claim 1, further comprising sixth program instructions to execute the selected one or more steps of the selected computer security, and wherein the sixth program instructions are stored on said computer-readable, tangible storage device.

3. The computer program product of claim 1, further comprising sixth program instructions to automatically select a default computer security procedure, and wherein the sixth program instructions are stored on said computer-readable, tangible storage device.

4. The computer program product of claim 2, wherein the results of execution of the selected one or more steps of the selected executed computer security procedure identify the executed one or more steps.

5. The computer program product of claim 3, further comprising sixth program instructions to predict future actions of a source of the computer security incident based on a sequence of actions taken by the source, and wherein the sixth program instructions are stored on said computer-readable, tangible storage device.

6. The computer program product of claim 5, wherein the sixth program instructions predict future actions of the source by determining whether the sequence of actions taken by the source matches a known sequence.

7. The computer program product of claim 4, further comprising sixth program instructions to identify a computer capable of executing a step in the selected computer security procedure, and wherein the sixth program instructions are stored on said computer-readable, tangible storage device.

8. A computer program product for creating a record of one or more computer security incidents, said computer program product comprising:
 a computer-readable, tangible storage device;
 first program instructions to record information about a computer security incident and a date stamp or time stamp for the computer security incident, the computer security incident information identifying one or more attacks received from a network computer that occur prior to an actual computer security threat;
 second program instructions, responsive to the computer security incident information, to classify the computer security incident and identify one or more computer security procedures corresponding to the classification, each of said computer security procedures comprising one or more steps for investigating or mitigating the computer security incident;
 third program instructions to generate a display of said one or more computer security procedures;
 fourth program instructions to receive a selection from a user of one of said computer security procedures and one or more steps of the selected computer security procedure to mitigate the one or more attacks;
 fifth program instructions to identify a computer capable of executing a step in the selected computer security procedure; and
 sixth program instructions to generate and output a record comprising the computer security incident information, results of execution of the selected one or more steps of the selected computer security procedure, an identity of the user who selected the computer security procedure, and the date stamp and time stamp for the computer security incident,
  wherein the sixth program instructions record the results of the executed computer security procedure with a digital signature to enable detection of any attempted modification of the record, whereby integrity of the record can be monitored, and
  wherein said first, second, third, fourth, fifth, and sixth program instructions are stored on said computer-readable, tangible storage device.

9. The computer program product of claim 8, further comprising seventh program instructions to access a table comprising computer locations and step information; and compare a step to be executed in a computer security procedure with computer locations listed in the table, and wherein the seventh program instructions are stored on said computer-readable, tangible storage device.

10. The computer program product of claim 9, further comprising eighth program instructions to determine if a match exists between the step to be executed and the computer locations; and if one or more matches exist, displaying the matching information or automatically selecting an appropriate location, and wherein the eighth program instructions are stored on said computer-readable, tangible storage device.

11. The computer program product of claim 10, further comprising ninth program instructions to display a substitute computer location if a match does not exist, and wherein the ninth program instructions are stored on said computer-readable, tangible storage device.

12. The computer program product of claim 9, wherein the table further comprises Internet address ranges, the program product further comprising eighth program instructions to compare an Internet address of a source of a computer security incident with the Internet address ranges of the table, and wherein the eighth program instructions are stored on said computer-readable, tangible storage device.

13. The computer program product of claim 8, wherein the identified computer is strategically located relative to a source of a computer security incident.

14. A computer system for creating a record of one or more computer security incidents, said computer system comprising:
 a CPU, computer-readable memory, and a computer-readable, tangible storage device;
 first program instructions to record information about a computer security incident and a date stamp or time stamp for the computer security incident, the computer security incident information identifying one or more attacks received from a network computer that occur prior to an actual computer security threat;
 second program instructions, responsive to the computer security incident information, to classify the computer security incident and identify one or more computer security procedures corresponding to the classification, each of said computer security procedures comprising one or more steps for investigating or mitigating the computer security incident;
 third program instructions to generate a display of said one or more computer security procedures;
 fourth program instructions to receive a selection from a user of one of said computer security procedures and one or more steps of the selected computer security procedure to mitigate the one or more attacks; and
 fifth program instructions to generate and output a record comprising the computer security incident information, results of execution of the selected one or more steps of the selected computer security procedure, and the date stamp and time stamp for the computer security incident
  wherein the fifth program instructions record the results of the executed computer security procedure with a digital signature to enable detection of any attempted modification of the record, whereby integrity of the record can be monitored, and
  wherein said first, second, third, fourth and fifth program instructions are stored on said computer-readable, tangible storage device for execution by the CPU via the computer-readable memory.

15. The computer system of claim 14, further comprising sixth program instructions to identify a computer capable of executing a step in the selected computer security procedure, wherein the identified computer is strategically located relative to a source of a computer security incident, and wherein the sixth program instructions are stored on said computer-readable, tangible storage device.

16. The computer system of claim 14, further comprising sixth program instructions to predict future actions of a source of the computer security incident based on a sequence of actions taken by the source, and wherein the sixth program instructions are stored on said computer-readable, tangible storage device.

17. The computer system of claim 16, wherein the sixth program instructions predict future actions of the source by determining whether the sequence of actions taken by the source matches a known sequence.

18. A computer program product for creating a record of one or more computer security incidents, said computer program product comprising:
- a computer-readable, tangible storage device;
- first program instructions to record information about a computer security incident and a date stamp or time stamp for the computer security incident, the computer security incident information identifying one or more attacks received from a network computer that occur prior to an actual computer security threat;
- second program instructions, responsive to the computer security incident information, to classify the computer security incident and identify one or more computer security procedures corresponding to the classification, each of said computer security procedures comprising one or more steps for investigating or mitigating the computer security incident;
- third program instructions to generate a display of said one or more computer security procedures;
- fourth program instructions to receive a selection from a user of one of said computer security procedures and one or more steps of the selected computer security procedure to mitigate the one or more attacks;
- fifth program instructions to generate and output a record comprising the computer security incident information, results of execution of the selected one or more steps of the selected computer security procedure, an identity of the user who selected the computer security procedure, and the date stamp and time stamp for the computer security incident; and
- sixth program instructions to predict future actions of a source of the computer security incident based on a sequence of actions taken by the source, and wherein the sixth program instructions are stored on said computer-readable, tangible storage device,
- wherein said first, second, third, fourth, fifth, and sixth program instructions are stored on said computer-readable, tangible storage device.

19. A computer system for creating a record of one or more computer security incidents, said computer system comprising:
- a CPU, computer-readable memory, and a computer-readable, tangible storage device;
- first program instructions to record information about a computer security incident and a date stamp or time stamp for the computer security incident, the computer security incident information identifying one or more attacks received from a network computer that occur prior to an actual computer security threat;
- second program instructions, responsive to the computer security incident information, to classify the computer security incident and identify one or more computer security procedures corresponding to the classification, each of said computer security procedures comprising one or more steps for investigating or mitigating the computer security incident;
- third program instructions to generate a display of said one or more computer security procedures;
- fourth program instructions to receive a selection from a user of one of said computer security procedures and one or more steps of the selected computer security procedure to mitigate the one or more attacks;
- fifth program instructions to generate and output a record comprising the computer security incident information, results of execution of the selected one or more steps of the selected computer security procedure, and the date stamp and time stamp for the computer security incident; and
- sixth program instructions to predict future actions of a source of the computer security incident based on a sequence of actions taken by the source, and wherein the sixth program instructions are stored on said computer-readable, tangible storage device,
- wherein said first, second, third, fourth, fifth, and sixth program instructions are stored on said computer-readable, tangible storage device for execution by the CPU via the computer-readable memory.

* * * * *